(12) United States Patent  (10) Patent No.: US 7,574,063 B2
Kajiwara et al. (45) Date of Patent: Aug. 11, 2009

(54) IMAGE CODING METHOD AND APPARATUS

(75) Inventors: Hiroshi Kajiwara, Tokyo (JP); Hiroki Kishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 688 days.

(21) Appl. No.: 10/895,385

(22) Filed: Jul. 21, 2004

(65) Prior Publication Data

US 2005/0100226 A1    May 12, 2005

(30) Foreign Application Priority Data

Jul. 23, 2003 (JP) ............................ 2003-200478
Sep. 24, 2003 (JP) ............................ 2003-332392

(51) Int. Cl.
*G06K 9/36* (2006.01)
*G06K 9/46* (2006.01)

(52) U.S. Cl. ...................... 382/239; 382/238; 382/232; 382/236

(58) Field of Classification Search ................ 382/232, 382/233, 235, 236, 238, 239, 244–247; 375/E7.049
See application file for complete search history.

(56) References Cited

U.S. PATENT DOCUMENTS

| | | | | | |
|---|---|---|---|---|---|
| 5,745,179 | A | * | 4/1998 | Senda | 375/240.03 |
| 5,915,038 | A | * | 6/1999 | Abdel-Mottaleb et al. | 382/209 |
| 5,945,930 | A | | 8/1999 | Kajiwara | 341/50 |
| 5,991,447 | A | * | 11/1999 | Eifrig et al. | 382/236 |
| 6,028,963 | A | | 2/2000 | Kajiwara | 382/239 |
| 6,031,938 | A | * | 2/2000 | Kajiwara | 382/239 |
| 6,101,282 | A | | 8/2000 | Hirabayashi et al. | 382/246 |
| 6,134,348 | A | * | 10/2000 | Nakaya et al. | 382/224 |
| 6,154,571 | A | * | 11/2000 | Cox et al. | 382/250 |
| 6,160,913 | A | * | 12/2000 | Lee et al. | 382/176 |
| 6,233,355 | B1 | | 5/2001 | Kajiwara | 382/238 |
| 6,310,980 | B1 | | 10/2001 | Kajiwara | 382/238 |
| 6,501,859 | B1 | | 12/2002 | Kajiwara | 382/239 |

(Continued)

OTHER PUBLICATIONS

"JPEG2000 Image Coding System", JPEG2000 Committee Draft Version 1.0, Annex J ISO/IEC CD 15444-1:1999, v1.0, Dec. 9, 1999, pp. 131-150, URL=www.cis.udel.edu/~amer/CISC651/JPEG2000_draft_std_cd15444-1.pdf.

(Continued)

*Primary Examiner*—Andrew W Johns
*Assistant Examiner*—Mia M Thomas
(74) *Attorney, Agent, or Firm*—Fitzpatrick, Cella, Harper & Scinto

(57) ABSTRACT

To reduce the computation cost of rate/distortion optimization in image compression, the rate/distortion gradient of a frame of interest is classified to m categories. A category information creating unit acquires a threshold $\lambda$ for a preceding frame as a predictive value $\lambda'$ for the frame of interest that is to be coded, and further finely segments a category in which the predictive value $\lambda'$ is included. A code amount is then calculated for each of n categories that include the predictive value $\lambda'$. A code sequence forming unit selects a category having a target rate, and searches for a threshold between an upper and a lower limit value of the category. A value (S) at the end of the processing is selected as the threshold $\lambda$, and a code sequence is formed by using the threshold $\lambda$.

6 Claims, 36 Drawing Sheets

U.S. PATENT DOCUMENTS

| | | | |
|---|---|---|---|
| 6,549,676 B1 | 4/2003 | Nakayama et al. | 382/246 |
| 6,560,365 B1 | 5/2003 | Nakayama et al. | 382/233 |
| 6,665,442 B2 * | 12/2003 | Sekiguchi et al. | 382/224 |
| 6,665,444 B1 | 12/2003 | Kajiwara | 382/240 |
| 6,711,295 B2 | 3/2004 | Nakayama et al. | 382/232 |
| 6,768,819 B2 | 7/2004 | Yamazaki et al. | 382/240 |
| 6,836,564 B2 * | 12/2004 | Katayama et al. | 382/166 |
| 6,853,755 B2 * | 2/2005 | Li | 382/239 |
| 6,879,726 B2 | 4/2005 | Sato et al. | 382/239 |
| 6,879,727 B2 * | 4/2005 | Sato et al. | 382/239 |
| 6,925,250 B1 * | 8/2005 | Oshima et al. | 386/111 |
| 6,947,600 B1 | 9/2005 | Sato et al. | 382/233 |
| 6,950,471 B2 | 9/2005 | Kishi | 375/240.19 |
| 6,985,630 B2 | 1/2006 | Kajiwara | 382/233 |
| 6,993,198 B2 | 1/2006 | Kishi | 382/240 |
| 7,013,050 B2 * | 3/2006 | Kajiwara | 382/240 |
| 7,031,536 B2 | 4/2006 | Kajiwara | 382/240 |
| 7,184,600 B2 * | 2/2007 | Yamaguchi et al. | 382/233 |
| 7,194,140 B2 * | 3/2007 | Ito et al. | 382/251 |
| 2002/0044691 A1 * | 4/2002 | Matsugu | 382/218 |
| 2002/0064313 A1 * | 5/2002 | Cheng | 382/239 |
| 2003/0007561 A1 * | 1/2003 | Kajiwara | 375/240.11 |
| 2003/0086597 A1 * | 5/2003 | Ohta et al. | 382/131 |
| 2004/0013312 A1 * | 1/2004 | Kajiwara | 382/240 |
| 2004/0109608 A1 * | 6/2004 | Love et al. | 382/224 |
| 2004/0161157 A1 * | 8/2004 | Sato et al. | 382/236 |
| 2004/0213347 A1 | 10/2004 | Kajiwara | 375/240.11 |
| 2004/0240742 A1 * | 12/2004 | Takahashi et al. | 382/232 |
| 2005/0100219 A1 * | 5/2005 | Berkner et al. | 382/190 |
| 2005/0100229 A1 * | 5/2005 | Becker et al. | 382/232 |
| 2005/0129320 A1 * | 6/2005 | Koto | 382/239 |
| 2005/0271281 A1 * | 12/2005 | Simard et al. | 382/225 |
| 2006/0023957 A1 * | 2/2006 | Ito | 382/232 |
| 2006/0050975 A1 * | 3/2006 | Ito et al. | 382/232 |
| 2007/0036215 A1 * | 2/2007 | Pan et al. | 375/240.12 |
| 2007/0242882 A1 * | 10/2007 | Chiba et al. | 382/173 |

OTHER PUBLICATIONS

Hugh Everett III, "Generalized Lagrange Multiplier Method for Solving Problems of Optimum Allocation of Resources", Operation Research, vol. II, pp. 399-417, 1963.

* cited by examiner

CODING TARGET IMAGE

FIG. 8

| PASS NUMBER k | CODE AMOUNT $\Delta Ri(k)$ | DISTORTION INDEX VALUE DECREASE $\Delta Di(k)$ |
|---|---|---|
| 0 | $\Delta Ri(0)$ | $\Delta Di(0)$ |
| 1 | $\Delta Ri(1)$ | $\Delta Di(1)$ |
| 2 | $\Delta Ri(2)$ | $\Delta Di(2)$ |
| 3 | $\Delta Ri(3)$ | $\Delta Di(3)$ |
| ... | ... | ... |
| ki_max | $\Delta Ri(ki\_max)$ | $\Delta Di(ki\_max)$ |

FIG. 12

| CATEGORY | THRESHOLD (MINIMUM VALUE) | CUMULATIVE CODE AMOUNT |
|---|---|---|
| C(1) | T(1) | RC(1) |
| C(2) | T(2) | RC(2) |
| C(3) | T(3) | RC(3) |
| ... | ... | ... |
| C(m−1) | T(m−1) | RC(m−1) |
| C(m) | — | RC(m) |

F I G. 20

| SECTION | THRESHOLD (MINIMUM VALUE) | CUMULATIVE CODE AMOUNT |
|---|---|---|
| K(1) | T(1) | RK(1) |
| K(2) | T(2) | RK(2) |
| K(3) | T(3) | RK(3) |
| ... | ... | ... |
| K(n−1) | T(n−1) | RK(n−1) |
| K(n) | — | RK(n) |

IMAGE CODING METHOD AND APPARATUS

FIELD OF THE INVENTION

The present invention relates to an image coding method and apparatus which code still images or frame images of moving images.

BACKGROUND OF THE INVENTION

As a technique of improving image coding efficiency, a code amount (rate)/distortion optimization technique is available. The rate/distortion optimization technique is designed to obtain a generated code amount and an index value associated with image distortion for each of a plurality of sections constituting coded data and minimize the total distortion index value under the condition that the total code amount is equal to or less than a target value.

According to international standard JPEG2000 (ISO/IEC 15444) for still image coding established by standardization in ISO/IEC JTC1/SC29/WG1, the coefficient of each subband obtained by wavelet transform is segmented into rectangular regions called code blocks, and each rectangular region is independently coded. JPEG2000 codes each code block upon segmenting it into a plurality of passes, and it is contemplated that a generated code amount and image distortion index value are obtained on a pass basis, and a rate/distortion optimization technique is applied to coding. As a reference for the implementation of JPEG2000, a method of applying the rate/distortion optimization technique is disclosed (see, for example, Annex J Examples and guidelines of standard recommendation (ISO/IEC 15444-1) which will be referred to as non-patent reference 1 hereinafter).

Letting ni be a code truncatable point of a code block Bi, Ri(ni) be the code amount of the code block Bi when code truncation is performed at ni, and Di(ni) be a distortion index value, a total distortion index value D and total code amount R of an overall image can be represented by $$D = \sum_i Di(ni)$$

$$R = \sum_i Ri(ni)$$

The object of rate/distortion optimization is to obtain a set of truncation points ni which minimize the total distortion index value D under the condition of a target total code amount Rmax or less, i.e., $R \leq Rmax$.

This optimization problem can be solved by using a generalized Lagrange multiplier method (see, for example, "Generalized Lagrange Multiplier Method for Solving Problems of Optimum Allocation of Resources", Operation Research, vol. 11, pp. 399-417, 1963 which will be referred to as non-patent reference 2 hereinafter).

That is, the problem reduces to minimization of the following expression with respect to a given value $\lambda$. Note that the value $\lambda$ is adjusted to make the total code amount R become equal to or less than Rmax.

$$\Sigma(Di(ni)+\lambda \times ri(ni))$$

The minimization of the above expression reduces to the problem of the minimization of each code block. A simple algorithm for obtaining the code truncation point ni where $Di(ni)+\lambda Ri(ni)$ is minimized with respect to the code block Bi will be described below.

FIG. 4 is a flowchart for explaining a sequence for the processing of determining the code truncation point ni with respect to the code block Bi whose effective coding pass count is ki_max. As shown in FIG. 4, first of all, the code truncation point ni is initialized to 0 (step S401). A variable k representing a code truncatable point of interest is set to 1 (step S402). With regard to the code truncatable point k of interest, a code amount increase $\Delta Ri(k)$ and distortion index value decrease $\Delta Di(k)$ are obtained when the code truncation point of the code block Bi is moved from ni to k (step S403).

As the code amount of codes between the code truncation point ni and the code truncatable point k of interest versus a distortion index value, $\Delta Di(k)/\Delta Ri(k)$ is calculated and compared with $1/\lambda$ (step S404). If $\Delta Di(k)/\Delta Ri(k)$ is larger than $1/\lambda$ (Yes), the value of ni is updated to k (step S405). Subsequently, k is incremented by one to lower the code truncation point of interest by one (step S406). If it is determined in step S404 that $\Delta Di(k)/\Delta Ri(k)$ is equal to or smaller than $1/\lambda$ (No), the flow advance to step S406 without updating ni. The updated value of k is then compared with the coding pass count ki_max of this code block (step S407).

If $k \leq ki\_max$ (No), the processing from step S403 is repeatedly performed for the updated value of k. If $k > ki\_max$ (Yes), the processing is terminated, and the code truncation point of the code block Bi of interest with provided $\lambda$ is set to ni at the end time.

Considering that the above algorithm is executed for various values of $\lambda$, the efficiency can be improved by setting code truncation point candidates for a code block in advance. Code truncation for a code block is performed on a coding pass basis. Basically, therefore, code truncation can be done at all coding pass boundaries. When, however, the above code truncation point ni determination algorithm is to be used, truncation candidate points are determined such that $Si(k) = \Delta Di(k)/\Delta Ri(k)$ representing a rate/distortion gradient between the code truncation points monotonously reduces in accordance with k, and no coding pass boundary that does not satisfy the condition is selected as a code truncation point.

Consider, for example, a code block coded by four coding passes as shown in FIG. 10. FIG. 10 is a graph showing an example of the relationship between the rate of each pass and distortion of a code block. Basically, code truncation can be done at four pass boundaries indicated by code truncatable points 0 to 4 in FIG. 10. At truncatable point 2, the rate/distortion gradient does not monotonously reduce, and hence it is not efficient to truncate a code of the code block. According to the above algorithm, therefore, this point is not selected as a code truncation point.

Algorithm for selecting code truncation candidate points from the boundaries between all coding passes will be described below. FIG. 5 is a flowchart for explaining the flow of the processing of selecting code truncation candidate points. In this case, a set of code truncation candidate points is represented by Ni.

First of all, as the initial state of the set Ni of code truncation candidate points, a set of boundaries between all the coding passes of a code block of interest is obtained (step S501). If, for example, the coding pass count of the code block Bi is represented by ki_max, Ni={1, 2, 3, . . . , ki_max}. A code truncation point p as a candidate determination target is set to 0 (step S502). In addition, as the next code truncation candidate point as a candidate determination target, k is set to 1 (step S503).

It is then checked whether the set value k belongs to the set Ni (step S504). If k belongs to Ni (Yes), the code amount increase $\Delta Ri(k)$ and distortion index value decrease $\Delta Di(k)$ in a case wherein the truncation candidate point is moved from p to k are obtained, together with the rate/distortion gradient Si(k) in this section (step S505). If k does not belong to Ni (No), the flow shifts to step S508 (to be described later).

After the processing in step S505, it is checked whether p≠0 and Si(k)>Si(p) (step S506). If p≠0 and Si(k)>Si(p) (Yes), p is removed from the set Ni (step S510), and the flow returns to step S502. Otherwise (e.g., p=0 and Si(k)≦Si(p)), p is set to k (step S507), and the value of k is updated by being incremented by one (step S508).

Subsequently, k is compared with ki_max (step S509). If k≦ki_max (No), processing is performed for updated k from step S504. If k>ki_max (Yes), the processing is terminated, and the set Ni is set as a set of code truncation candidate points at this point of time. For example, in the case of the code block shown in FIG. 10 described above, code truncation candidate point set Ni={1, 3, 4}. At these truncation candidate points, the rate/distortion gradient monotonously reduces in accordance with k, as shown in FIG. 11. That is, FIG. 11 shows how passes are integrated by the above monotonous reduction processing.

The values of the rate/distortion gradient Si(k) and code amount Ri(k) are held in correspondence with k belonging to the code truncation candidate point set Ni obtained in the above manner, and the maximum value k satisfying Si(k)>λ is selected. As the value of λ decreases, the code truncation point lowers, and the number of codes to be truncated decreases. In contrast to this, as the value of λ increases, the code truncation point rises, and the number of codes to be truncated increases. The multiplier λ can be regarded as an image quality parameter. A search is then made for λ satisfying total code amount R=Rmax or R≈Rmax while decreasing the value of λ. Code truncation points of each code block are determined on the basis of λ, thereby realizing rate/distortion optimization.

A case wherein the rate/distortion optimization technique is applied to JPEG2000 will be described below. Since a specific coding method by JPEG2000 has been described in detail in the recommendation, only the flow of processing in a simple case will be roughly described below.

For the sake of simplicity, a coding target image is 512×512 monochrome image data with each pixel consisting of eight bits (0 to 255). Letting x be the pixel position (coordinate) of each pixel of the coding target image in the horizontal direction, and y be the pixel position of each pixel in the vertical direction, the pixel value at a pixel position (x, y) is represented by P(x, y). As JPEG2000 coding conditions, no tiling, two times of discrete wavelet transform, the use of a 9×7 lossy filter (9-7 irreversible filter), a code block size of 64×64, and the formation of a code sequence on one layer will be described. In addition, various conditions such as an option for entropy coding are required. However, no mention will be made of such conditions, in particular.

FIG. 2 is a block diagram showing the arrangement of an image coding apparatus which performs general JPEG2000 coding. Referring to FIG. 2, reference numeral 200 denotes an image data input unit; 201, a discrete wavelet transform unit; 202, a coefficient quantization unit; 203, a code block segmenting unit; 204, a code block coding unit; 205, a code sequence forming unit; 206, a code sequence storage unit; 207, a code block information storage unit 207; and 208, a code output unit.

First of all, pixel values P(x, y) constituting coding target image data are sequentially input from the image data input unit 200. The image data input unit 200 performs DC level shifting of the input data from 0 to 255 into data P'(x, y) from −128 to 127 by subtracting the intermediate value 128 from each input pixel value P(x, y), and outputs the resultant data to the discrete wavelet transform unit 201.

The wavelet transform unit 201 stores the input data P'(x, y) after DC level shifting in an internal buffer, as needed, and executes two-dimensional discrete wavelet transform. Two-dimensional discrete wavelet transform is performed by applying one-dimensional discrete wavelet transform in the horizontal and vertical directions. The wavelet transform unit 201 uses a 9×7 lossy filter for one-dimensional wavelet transform.

FIGS. 3A to 3C are views for explaining the subbands of a coding target image to be processed by two-dimensional discrete wavelet transform. First of all, the discrete wavelet transform unit 201 applies one-dimensional discrete wavelet transform to a coding target image like the one shown in FIG. 3A in the vertical direction to decompose the image into a low-frequency subband L and high-frequency subband H. One-dimensional discrete wavelet transform is then applied to each subband in the horizontal direction to decompose the respective subbands into four subbands LL, HL, LH, and HH, as shown in FIG. 3C.

The discrete wavelet transform unit 201 repeatedly applies two-dimensional discrete wavelet transform to the subband LL obtained by the above two-dimensional discrete wavelet transform. This makes it possible to decompose the coding target image into seven subbands LL, HL1, LH1, HH1, HL2, LH2, and HH2.

FIG. 6 is a view for explaining the seven subbands obtained by performing two-dimensional discrete wavelet transform twice. As shown in FIG. 6, on the decoding side, an image can be reconstructed in ¼ size in both the horizontal and vertical directions by decoding the coefficient of the subband LL. In addition, an image can be reconstructed in ½ size in the horizontal and vertical directions by decoding the coefficients of the subbands HL1, LH1, and HH1. An image equal in size to the original image can played back by decoding the subbands HL2, LH2, and HH2. The subband LL will be referred to as resolution level 0; LH1, HL1, and HH1, resolution level 1; and LH2, HL2, and HH2, resolution level 2.

In the following description, a coefficient in each subband is represented by C(Sb, x, y) where Sb represents the type of subband, i.e., one of LL, LH1, HL1, HH1, LH2, HL2, and HH2, and (x, y) represents a coefficient position (coordinates) in the horizontal and vertical directions when the coefficient position at the upper left corner in each subband is represented by (0, 0).

The coefficient quantization unit 202 quantizes the coefficient C(Sb, x, y) of each subband, generated by the discrete wavelet transform unit 201, by using a quantization step delta(Sb) determined for each subband. Letting Q(Sb, x, y) be a quantized coefficient value, the quantization processing performed by the coefficient quantization unit 203 can be represented by:

$$Q(Sb, x, y) = \text{sign}\{C(Sb, x, y)\} \times \text{floor}\{|C(Sb, x, y)|/\text{delta}(Sb)\}$$

where sign{I} is a function representing the sign of an integer I, which returns 1 when I is positive, and −1 when I is negative, and floor{R} is the maximum integral value that does not exceed a real number R.

The code block segmenting unit 203 stores the coefficient C(Sb, x, y) of each subband, quantized by the coefficient quantization unit 202, in an internal buffer (not shown), as needed, and segments and extracts each subband into rectangles called code blocks each having a predetermined size. Code block segmentation is performed by segmenting each subband into 64×64-bit blocks with reference to the upper left corner of the subband. With this operation, each of the subbands LL, HL1, LH1, and HH1 is segmented into four code blocks, and each of the subbands HL2, LH2, and HH2 is segmented into 16 code blocks.

Note that the respective code blocks are assigned non-redundant identification numbers i (0 to 63) to be specified in the form of Bi like B0, B1, B2, . . . , B63. In addition, the identification numbers i are assigned to the code blocks in order of resolution level, assigned in order of the subbands HL, LH, and HH within the same solution level, and assigned in raster scan order within the same subband. FIG. 7 is a view showing how code block segmentation is performed by the code block segmenting unit 203. Referring to FIG. 7, the solid lines indicate the boundaries between the subbands, and the dotted lines indicate the boundaries between the code blocks. Each rectangle defined by the dotted lines or solid lines is a code block.

The code block coding unit 204 expresses the absolute value of the quantized coefficient value Q(Sb, x, y) (to be simply referred to as a "coefficient value" hereinafter) in a code block Bi extracted by the code block segmenting unit 203 in natural binary notation, performs binary arithmetic coding preferentially in the bit plane direction from the most significant bit to the least significant bit, and stores the coded data of the code block in the code sequence storage unit 206. Each bit plane is coded in three passes, except for the most significant bit plane. Note that segmentation to passes and a specific coding method in each pass should comply with the recommendation.

The code block coding unit 204 obtains the code amount increase ΔRi(k) and distortion index value decrease ΔDi(k) of a pass of interest for each pass coding operation, forms the table shown in FIG. 8, and stores it an internal buffer (not shown). FIG. 8 is a view showing an example of the information of the code block Bi formed inside the code block coding unit 204. Note that as distortion index values, mean square errors, weighted mean square errors derived by assigning a weight for each subband, or the like are used. A scheme of deriving a distortion index value decrease for each coefficient for each of the three types of passes is described in patent reference 1 (Annex J of the recommendation) or the like.

When coding of all the passes is completed for the code block Bi of interest and a table like the one shown in FIG. 8 is completed, the algorithm for selecting code truncation candidate points, shown in FIG. 5 descried above, is executed to obtain a code truncation candidate point set Ni exhibiting a monotonous reduction in Si(k) from the set of all coding pass boundaries. Subsequently, as shown in FIG. 9, the element count NP of the candidate set Ni, the pass number k at each code truncation candidate point, the rate/distortion gradient Si(k), and the code amount Ri(k) are stored in the code block information storage unit 207. That is, FIG. 9 is a view showing an example of the information of code truncation candidate points stored in the code block information storage unit 207.

When the code block coding unit 204 completes coding all the code blocks, the code sequence forming unit 205 searches for λ with which total code amount R=Rmax or R≈Rmax by referring to the truncation candidate point information of each code block which is stored in the code block information storage unit 207, forms a final code sequence by collecting codes of a portion that satisfies Si(k)>λ, and outputs it.

FIG. 14 is a flowchart for explaining the flow of the processing of determining λ in the code sequence forming unit 205. The processing of determining the threshold λ by the code sequence forming unit 205 will be described below with reference to FIG. 14. In the following description, S is introduced as a variable representing a threshold, and the value of the variable S at the end of the processing is set as λ.

First of all, the code sequence forming unit 205 obtains a minimum value Smin and maximum value Smax of Si(k) by referring to the truncation candidate point information of all the code blocks which is stored in the code block information storage unit 207 (step S1401). The variable S representing a threshold is then set to Smax obtained in step S1401 (step S1402). Subsequently, the value of the variable S is slightly decreased by subtracting a predetermined threshold change width ΔS from the variable S (step S1403).

A variable i representing a code block number is set to 0, and a cumulative code amount R is initialized to 0 (step S1404). A maximum value k satisfying si(k)>S is obtained by referring to the truncation candidate point information of the code block Bi which is stored in the code block information storage unit 207, and is set as a code truncation point ni of the code block Bi (step S1405). Since the value of Si(k) is monotonously reduced in order of the truncation candidate points of the code block Bi, ni can be obtained by sequentially comparing Si(k) in order of the candidate points.

A code amount Ri(ni) of the code block Bi at the truncation point ni obtained in step S1405 is added to the cumulative code amount R (step S1406). In addition, i is incremented by one (step S1407) and is compared with 64 (step S1408). If i is equal to 64 (Yes), the flow advances to step S1409. If i is not equal to 64 (No), the flow shifts to step S1405 to perform code amount addition with respect to the next code block.

If it is determined in step S1409 that i is equal to 64, i.e., cumulative code amounts are completely calculated from all the code blocks with the threshold S, the cumulative code amount R is compared with the target code amount Rmax. If R<Rmax (Yes), the flow advances to step S1410. Otherwise (No), the flow shifts to step S1411. If the flow shifts to step S1411, since the cumulative code amount exceeds the target code amount with the current threshold S, ΔS is added to the threshold to return it to the immediately preceding threshold S, and the processing is terminated (step S1411).

In step S1410, the threshold S is compared with the minimum value Smin obtain in step S1401. If S>Smin (Yes), the flow returns to step S1403 to slightly decrease the value of S. Thereafter, the processing up to step S1409 is performed again. If it is determined in step S1410 that S≦Smin (No), this processing is terminated. The threshold S at the end of the processing is then selected as the threshold λ.

The code sequence forming unit 205 reads out codes of a portion that satisfies Si(k)>λ from each code block from the code sequence storage unit 206 with respect to the threshold λ obtained by the above processing, and forms a JPEG2000 code sequence by adding information (main header, tile header, packet header, and the like) in accordance with the format of a JPEG2000 code sequence, and outputs the code sequence to the code output unit 208.

The code output unit 208 outputs the JPEG2000 coded data formed by the code sequence forming unit 205 to the outside of the apparatus. The code output unit 208 is implemented by a storage medium such as a hard disk, magnetooptic disk, or memory, an interface with a network, or the like.

In order to find the maximum value λ with which R≈Rmax by the above method, it is necessary to repeat the processing of obtaining the total code amounts R with various values of λ and comparing them with the target code amount Rmax. Therefore, for example, a high computation cost and long processing time are required to obtain the total code amount R because this processing is performed by, for example, accessing the memory storing the code truncation candidate point information Si(k) and Ri(k) many times and comparing si(k) with λ.

Furthermore, there is no known method of performing rate/distortion optimization processing for moving images at high speed.

SUMMARY OF THE INVENTION

The present invention has been proposed to solve the conventional problems, and has as its object to provide an image coding method and apparatus which can properly reduce the computation cost required for rate/distortion optimization processing in image coding at the time of image compression.

In order to achieve the above object, according to the present invention, the foregoing object is attained by providing an image coding apparatus which segments image data into a plurality of small regions and codes the small regions upon performing code amount/distortion optimization processing, comprising:

classification means for segmenting a code amount/distortion gradient in each small region into a plurality of small sections, and classifying the plurality of small section to categories;

calculation means for calculating a cumulative code amount for each of the classified categories on the basis of the code amount/distortion gradients;

holding means for holding the calculated cumulative code amount;

selection means for selecting a category corresponding to a cumulative code amount not less than a target code amount as a boundary category;

search means for searching for a threshold for the code amount/distortion gradient, within the boundary category, when coded data of the small region becomes the target code amount; and code sequence forming means for forming a code sequence of the small region by using coded data of a code amount/distortion gradient not less than the searched-out threshold.

Furthermore, according to the present invention, the foregoing object is attained by providing an image coding apparatus which segments image data into a plurality of small regions and codes the small regions upon performing code amount/distortion optimization processing, comprising:

classification means for segmenting a code amount/distortion gradient in each small region into a plurality of small sections, and classifying the plurality of small section to categories;

calculation means for calculating a cumulative code amount for each of the categories classified on the basis of the code amount/distortion gradients;

holding means for holding the calculated cumulative code amount;

selection means for selecting a category corresponding to a cumulative code amount not less than a target code amount as a boundary category; and code sequence forming means for forming a code sequence by using all coded data included in a category higher in priority than the boundary category and part or all of coded data included in the boundary category, the code sequence forming means comprising code sequence forming means for forming the code sequence by using coded data, of the coded data included in the boundary category, which is obtained until a code amount of the code sequence reaches the target code amount.

Furthermore, according to the present invention, the foregoing object is attained by providing an image coding apparatus which segments image data into a plurality of small regions and codes the small regions upon performing code amount/distortion optimization processing, comprising:

segmentation means for segmenting a code amount/distortion gradient in each small region into a plurality of small sections, calculating a maximum value and a minimum value of code amount/distortion gradient of the small region, and segmenting a section between the maximum value and the minimum value into a plurality of sections;

calculation means for calculating a cumulative code amount for each of the segmented sections on the basis of the code amount/distortion gradients;

holding means for holding the calculated cumulative code amount;

selection means for selecting a section corresponding to a cumulative code amount not less than a target code amount as a boundary section;

search means for searching for a threshold for the code amount/distortion gradient, within the boundary section, when coded data of the small region becomes the target code amount; and code sequence forming means for forming a code sequence of the small region by using coded data of a code amount/distortion gradient not less than the searched-out threshold.

Furthermore, according to the present invention, the foregoing object is attained by providing an image coding apparatus which segments image data into a plurality of small regions and codes the small regions upon performing code amount/distortion optimization processing, comprising:

segmentation means for segmenting a code amount/distortion gradient in each small region into a plurality of small sections, calculating a maximum value and a minimum value of code amount/distortion gradient of the small region, and segmenting a section between the maximum value and the minimum value into a plurality of sections;

calculation means for calculating a cumulative code amount for each of the segmented sections on the basis of the code amount/distortion gradients;

holding means for holding the calculated cumulative code amount;

selection means for selecting a section corresponding to a cumulative code amount not less than a target code amount as a boundary section; and code sequence forming means for forming a code sequence by using all coded data included in a section higher in order than the boundary section and part or all of coded data included in the boundary section, the code sequence forming means comprising code sequence forming means for forming the code sequence by using coded data, of the coded data included in the boundary section, which is obtained until a code amount of the code sequence reaches the target code amount.

Furthermore, according to the present invention, the foregoing object is attained by providing an image coding method which segments image data into a plurality of small regions and codes the small regions upon performing code amount/distortion optimization processing, comprising:

a classification step of segmenting a code amount/distortion gradient in each small region into a plurality of small sections, and classifying the plurality of small section to categories;

a calculation step of calculating a cumulative code amount for each of the classified categories on the basis of the code amount/distortion gradients;

a holding step of holding the calculated cumulative code amount in holding means;

a selection step of selecting a category corresponding to a cumulative code amount not less than a target code amount as a boundary category;

a search step of searching for a threshold for the code amount/distortion gradient, within the boundary category, when coded data of the small region becomes the target code amount; and a code sequence forming step of forming a code sequence of the small region by using coded data of a code amount/distortion gradient not less than the searched-out threshold.

Furthermore, according to the present invention, the foregoing object is attained by providing an image coding apparatus which segments a frame image forming a moving image into a plurality of regions, and performs coding for each of the regions by performing code amount/distortion optimization within the small region, comprising:

acquisition means for acquiring a predictive value of a threshold used when the small region in a frame image of interest is coded;

search means for searching for a threshold, with which coded data of the small region becomes a predetermined code amount, from a code amount/distortion gradient in the small region by using the predictive value of the threshold; and code sequence forming means for forming a code sequence of the small region by using coded data not less than the threshold searched out by the search means.

Furthermore, according to the present invention, the foregoing object is attained by providing the apparatus, wherein the search means comprises first classification means for classifying the code amount/distortion gradient of the small region into a plurality of categories, second classification means for classifying a category, of the plurality of categories classified by the first classification means, which includes the threshold predicted by the prediction means into a plurality of small categories;

calculation means for calculating a code amount for each of the plurality of categories classified by the second classification means;

selection means for selecting a small category, of the plurality of small categories, which has a predetermined code amount, and threshold search means for searching for a threshold corresponding to the predetermined code amount between an upper limit value and a lower limit value of the code amount of the selected small category.

Furthermore, according to the present invention, the foregoing object is attained by providing the apparatus, wherein the search means comprises calculation means for calculating a maximum value and a minimum value of code amount/distortion gradient of the small region, first segmentation means for segmenting a section between the maximum value and the minimum value into a plurality of sections, second segmentation means for segmenting a section, of the plurality of sections segmented by the first segmentation means, which includes the threshold predicted by the prediction means into a plurality of small sections, section code amount calculation means for calculating a code amount with respect to each of the plurality of segmented small sections, selection means for selecting a small section, of the plurality of small sections, which has a predetermined code amount, and threshold search means for searching for a threshold corresponding to the predetermined code amount between an upper limit value and a lower limit value of a code amount of the selected small section.

Furthermore, according to the present invention, the foregoing object is attained by providing an image coding apparatus which segments a frame image forming a moving image into a plurality of regions, and performs coding for each of the regions upon performing code amount/distortion optimization within the small region, comprising:

acquisition means for acquiring a code amount/distortion gradient $\lambda$ used when the small region in a frame image of interest is to be coded;

selection means for selecting a predetermined code amount/distortion gradient S on the basis of the code amount/distortion gradient $\lambda$;

assuming means for assuming a function $R=f(S)$ of a code amount with respect to a code amount/distortion gradient by using the code amount/distortion gradient S selected by the selection means and the code amount/distortion gradient $\lambda$ acquired by the acquisition means;

search means for searching for a threshold with which the small region becomes a predetermined code amount by using the function $R=f(S)$ assumed by the assuming means; and code sequence forming means for forming a code sequence of the small region by using coded data not less than the threshold searched out by the search means.

Furthermore, according to the present invention, the foregoing object is attained by providing an image coding method which segments a frame image forming a moving image into a plurality of regions, and performs coding for each of the regions upon performing code amount/distortion optimization within the small region, comprising:

an acquisition step of acquiring a predictive value of a threshold used when the small region in a frame image of interest is coded;

a search step of searching for a threshold, with which coded data of the small region becomes a predetermined code amount, from a code amount/distortion gradient in the small region by using the predictive value of the threshold; and a code sequence forming step of forming a code sequence of the small region by using coded data not less than the threshold searched out in the search step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a view showing an example of the information of the code block Bi formed in a code block coding unit 204;

FIG. 12 is a view showing the category information held in a category information storage unit 102;

FIG. 20 is a view showing the section information held in the section segmenting unit 2101;

DETAILED DESCRIPTION OF THE PREFERRED EMBODIMENTS

The preferred embodiments of the present invention will be described below. In the embodiments described below, the processing speed of image coding processing is increased by using a category segmentation method, N segmentation method, and function interpolation approximation method for coding moving images.

First Embodiment

Figure 1:
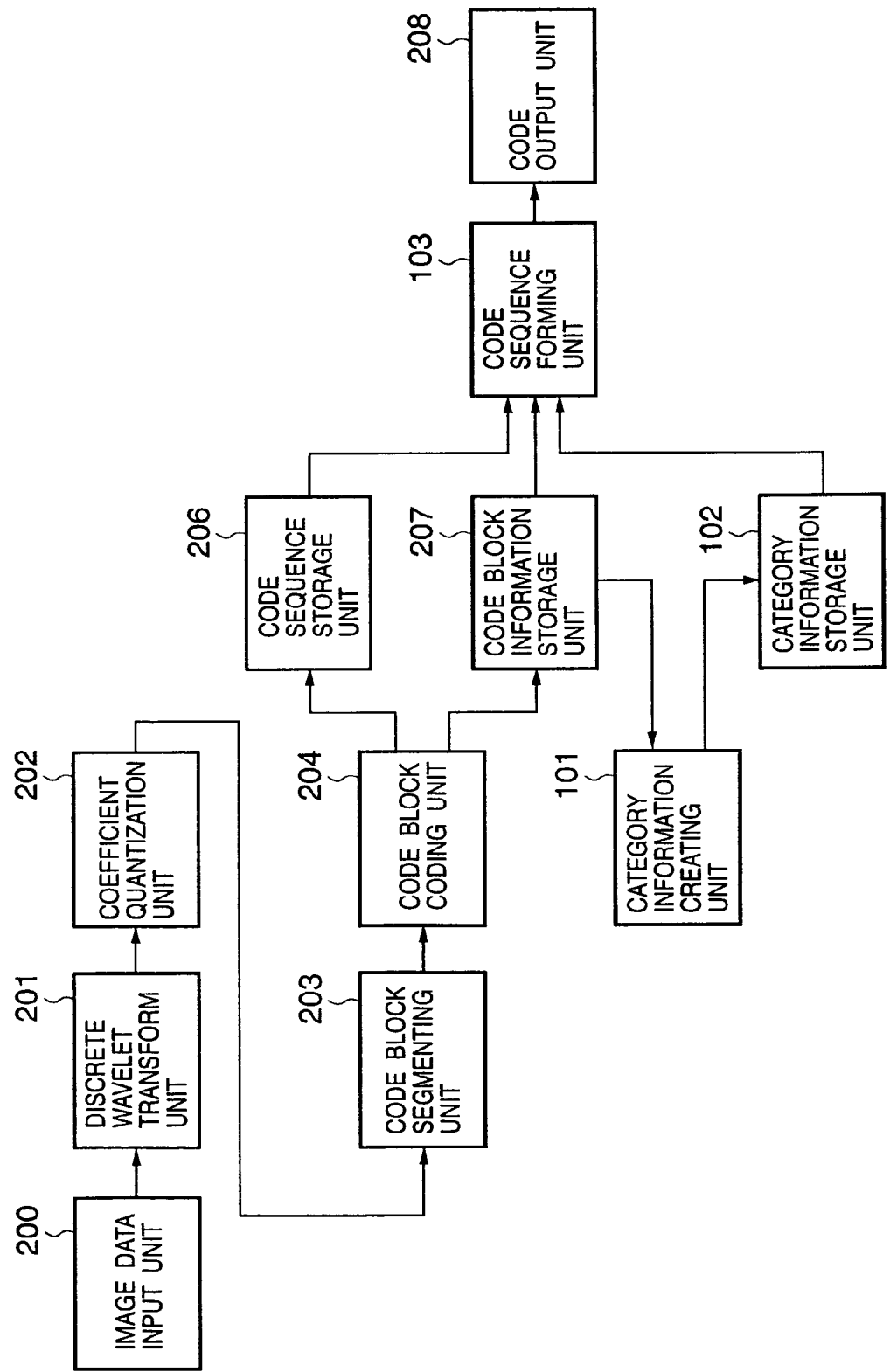
FIG. 1 is a block diagram showing the arrangement of an image coding apparatus according to the first embodiment of the present invention.
Figure 2:
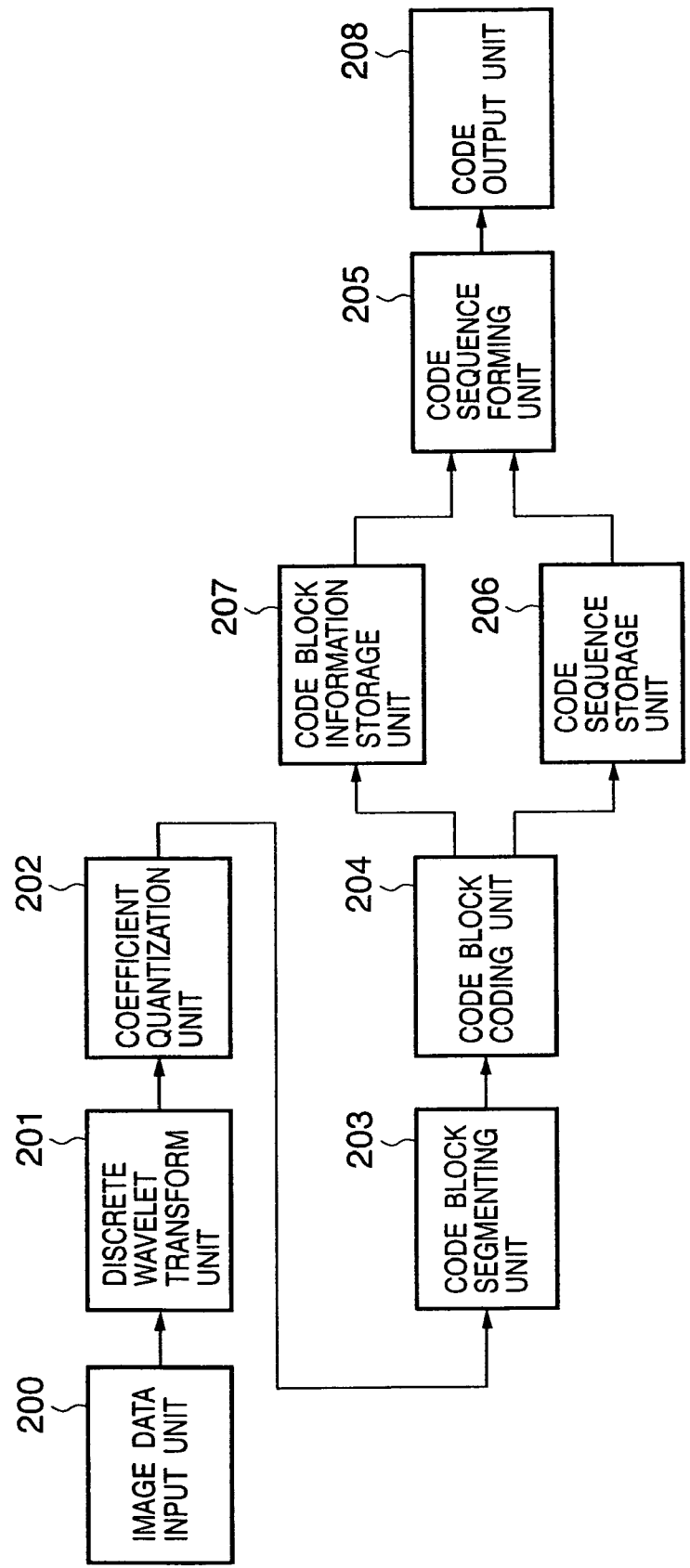
FIG. 2 is a block diagram showing the arrangement of an image coding apparatus which performs general JPEG2000 coding.
Figure 3C:
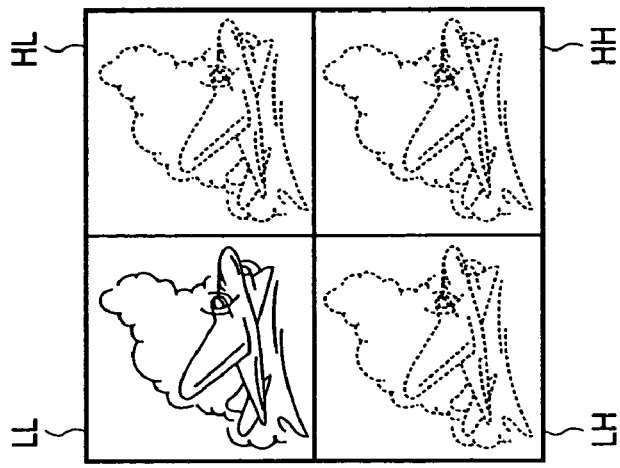
FIGS. 3A to 3C are views for explaining the subbands of a coding target image to be processed by two-dimensional discrete wavelet transform.
Figure 3B:
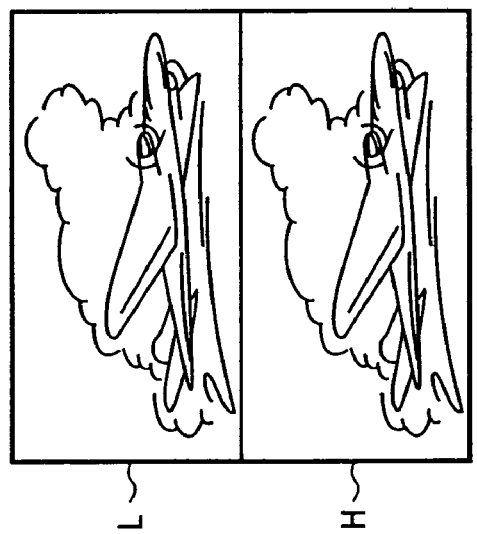
Figure 3A:
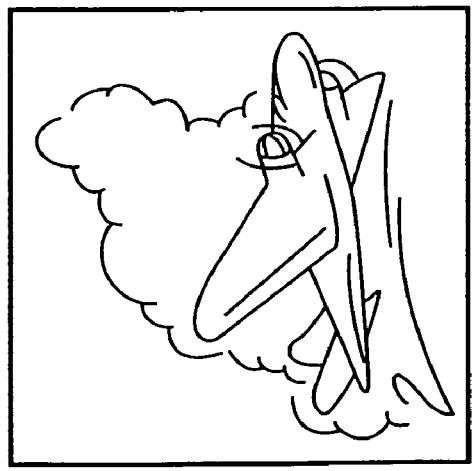
Figure 4:
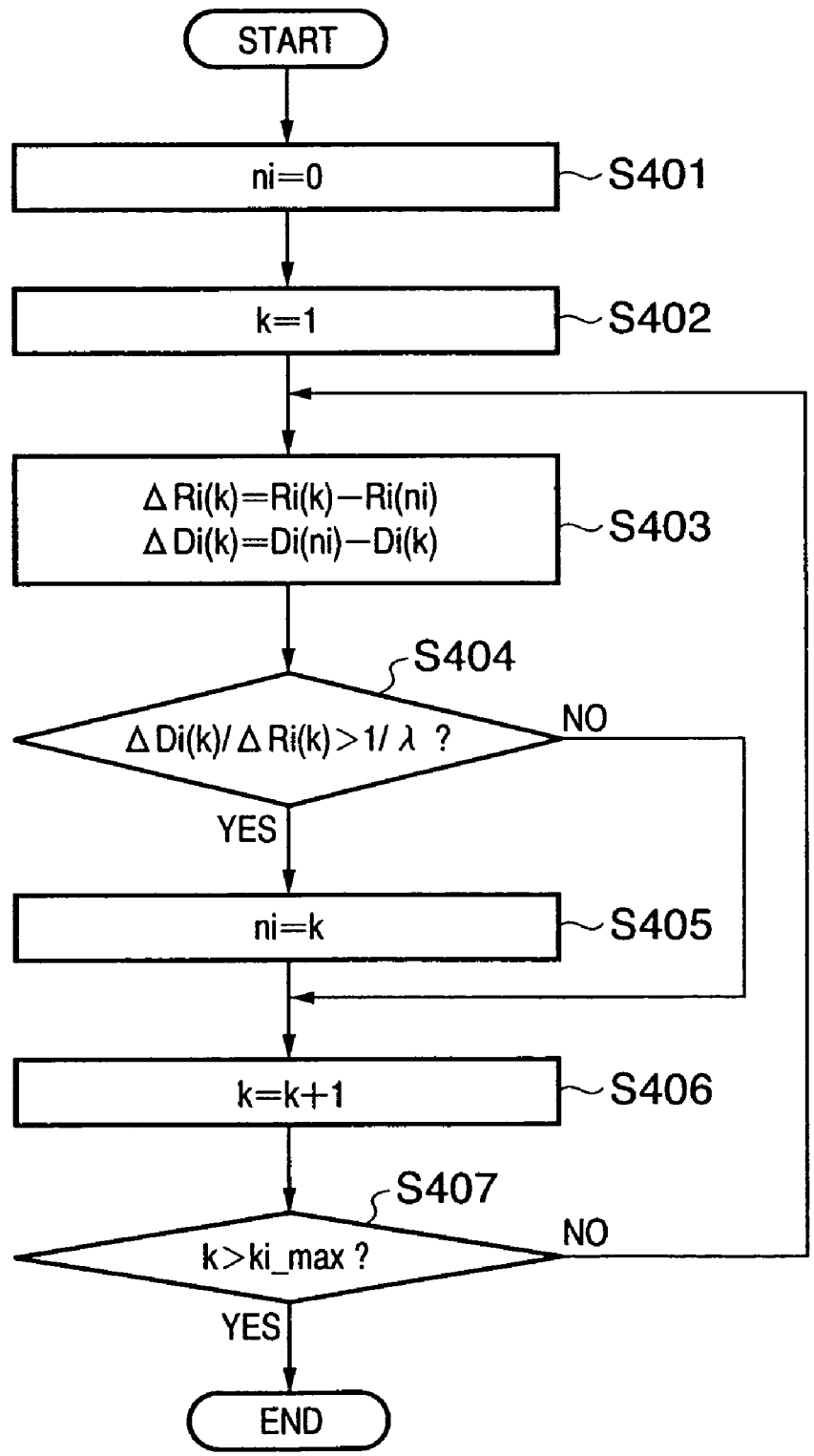
FIG. 4 is a flowchart for explaining a sequence for the processing of determining a code truncation point ni with respect to a code block Bi with an effective coding pass count of ki_max.
Figure 5:
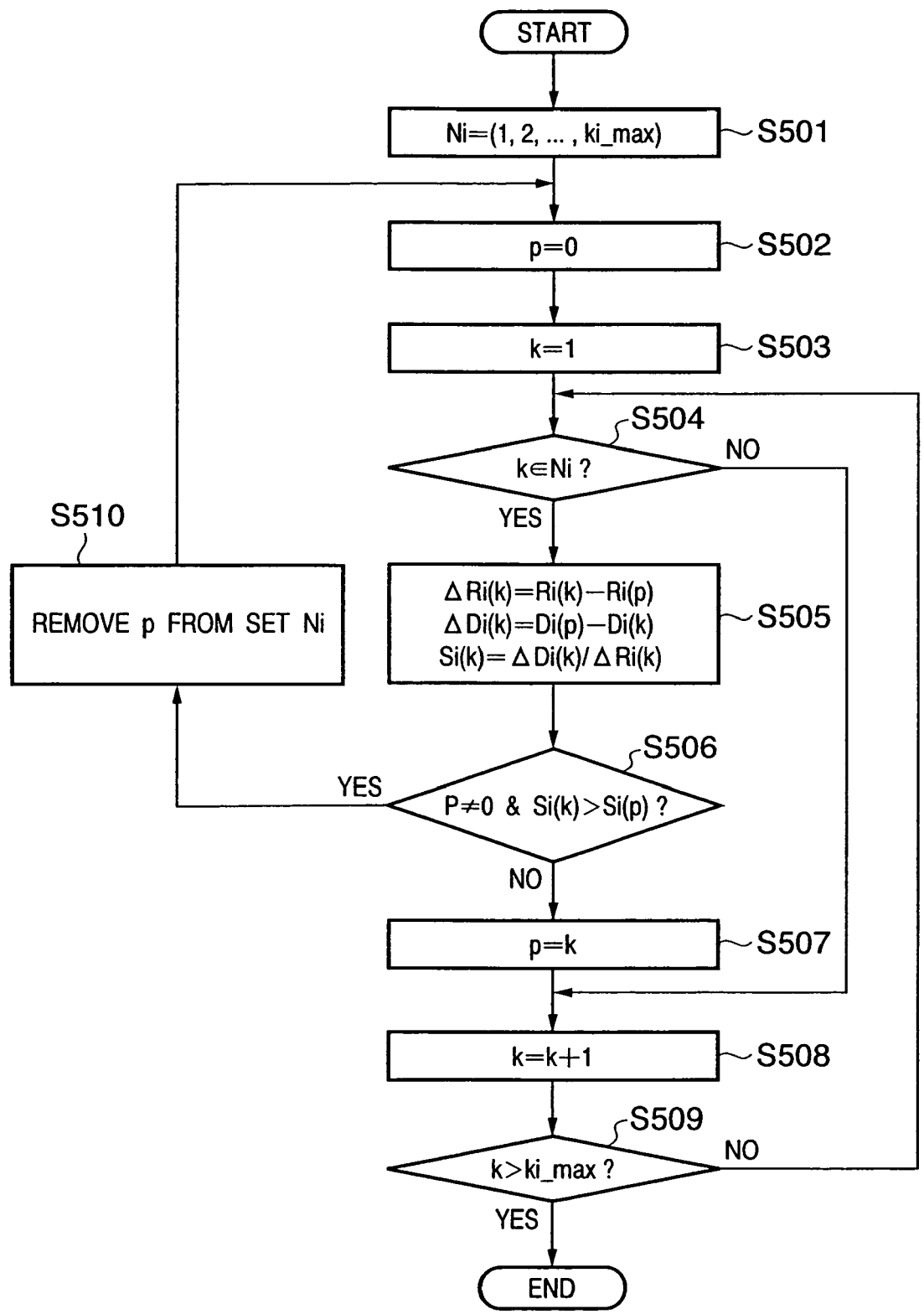
FIG. 5 is a flowchart for explaining the flow of the processing of selecting a truncation candidate point.
Figure 6:
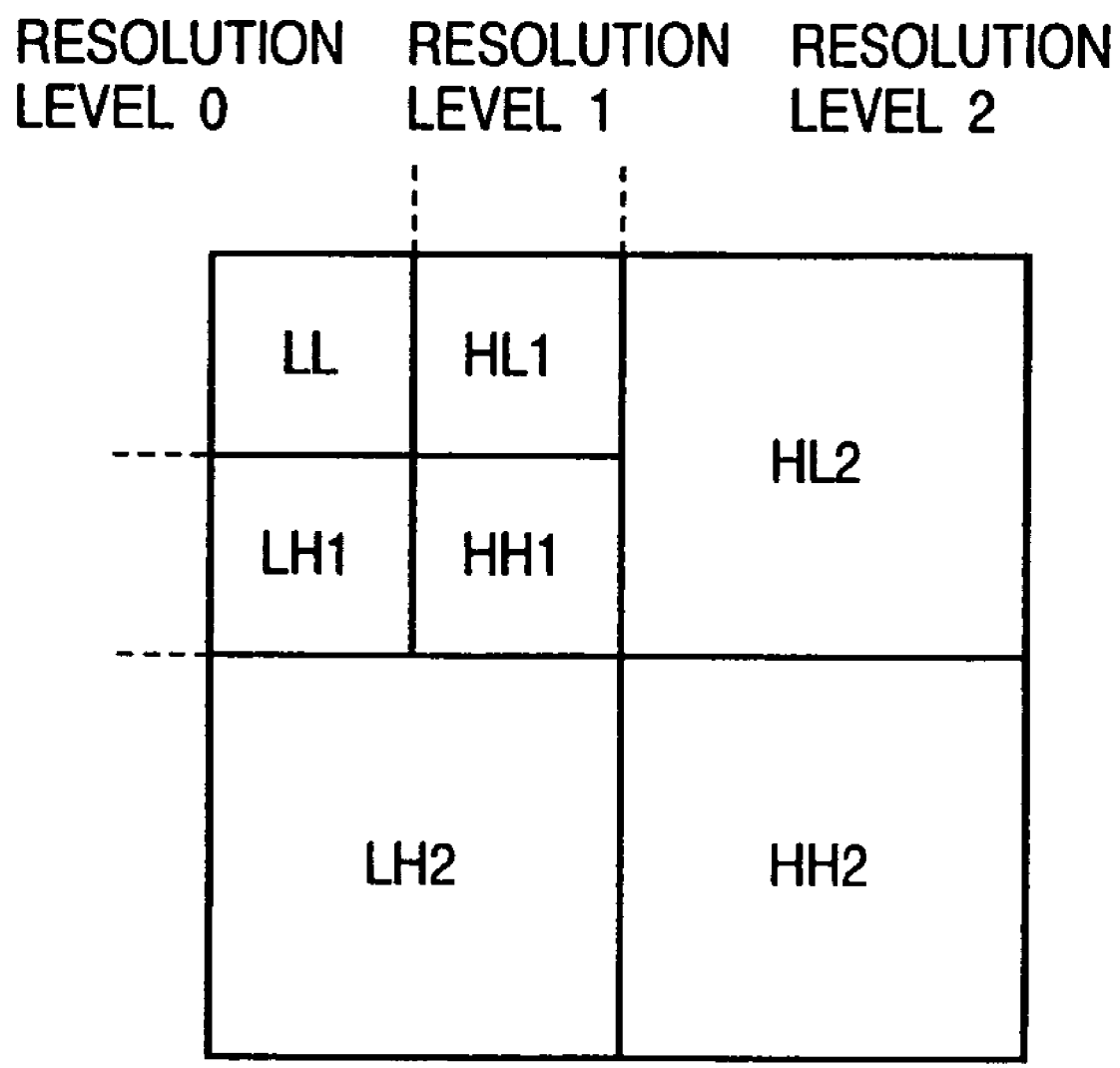
FIG. 6 is a view for explaining seven subbands obtained by two times of two-dimensional discrete wavelet transform.
Figure 7:
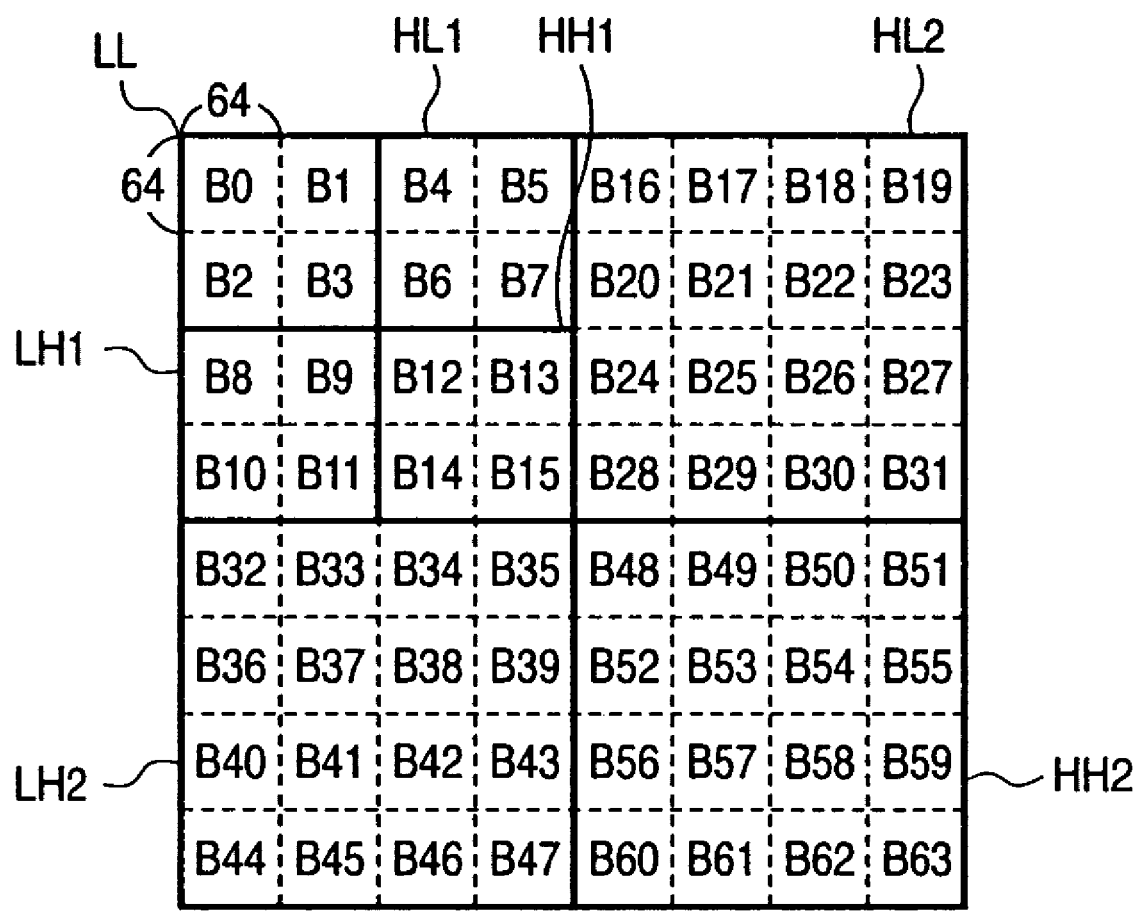
FIG. 7 is a view showing how code block segmentation is performed by a code block segmenting unit 203.

FIG. 1 is a block diagram showing the arrangement of an image coding apparatus according to the first embodiment of the present invention. The same reference numerals as in FIG. 1 denote blocks common to the conventional image coding apparatus shown in FIG. 2 described above, and a description thereof will be omitted. As shown in FIG. 1, the image coding apparatus according to the first embodiment includes an image data input unit 200, discrete wavelet transform unit 201, coefficient quantization unit 202, code block segmenting unit 203, code block coding unit 204, code sequence forming unit 103, code block information storage unit 207, code sequence storage unit 206, category information creating unit 101, category information storage unit 102, and code output unit 208.

An example of the operation of the image coding apparatus according to the first embodiment will be described below with reference to FIG. 1. Note that image coding data to be coded by the image coding apparatus shown in FIG. 1 is 512×512 monochrome image data with each pixel consisting of eight bits as in the case of the above image coding apparatus shown in FIG. 2 which is designed to perform general JPEG2000 coding. In addition, coding conditions such as execution/non-execution of tiling, the size of a code block, and selection of a wavelet transform filter are the same as those in the prior art.

In the image coding apparatus shown in FIG. 1, in order to facilitate code amount (rate)/distortion optimization processing, m categories are provided for rate/distortion gradients, the respective coding passes (or passes integrated by monotonous reduction; to be simply referred to as "coding passes" hereinafter) are classified to categories concurrently with coding processing, and a cumulative code amount is calculated and counted for each category. The m categories are ranked in order of decreasing rate/distortion gradient, and are identified by the numbers 1 to m like C(1) to C(m). Note that a rate/distortion gradient threshold serving as a boundary condition for a category C(c) corresponding to a given number c and a category C(c+1) is represented by T(c). In this case, T(c) and T(c+1) have a relationship of T(c)>T(c+1).

In this case, a coding pass that satisfies $Si(k) \geq T(1)$ is classified to the category C(1); a coding pass that satisfies $T(c-1) > Si(k) \geq T(c)$, the category C(c); and a coding pass that satisfies $T(m-1) > Si(k)$, the category C(m).

A table like the one shown in FIG. 12 is prepared in the code sequence forming unit 103 to hold a cumulative code amount RC(c) for each category. FIG. 12 is a view showing the information of the categories held in the category information storage unit 102. Note that all the cumulative code amounts RC(c) corresponding to the respective categories are initialized to 0 at the start of coding processing.

Referring to FIG. 1, as in the image coding apparatus according to the first embodiment, a coding target image is input from the image data input unit 200. This image is then segmented into code blocks and coded on a code block basis by the processing up to the code block coding unit 204 in the same manner as in the case of JPEG2000 coding in a general image coding apparatus.

When one code block Bi is coded by the code block coding unit 204 and monotonous reduction processing of rate/distortion gradients is performed, the category information creating unit 101 updates the total code amount corresponding to each category held in the category information storage unit 102 by referring to the truncation candidate point information of the code block Bi which is stored in the code block information storage unit 207.

Figure 13:
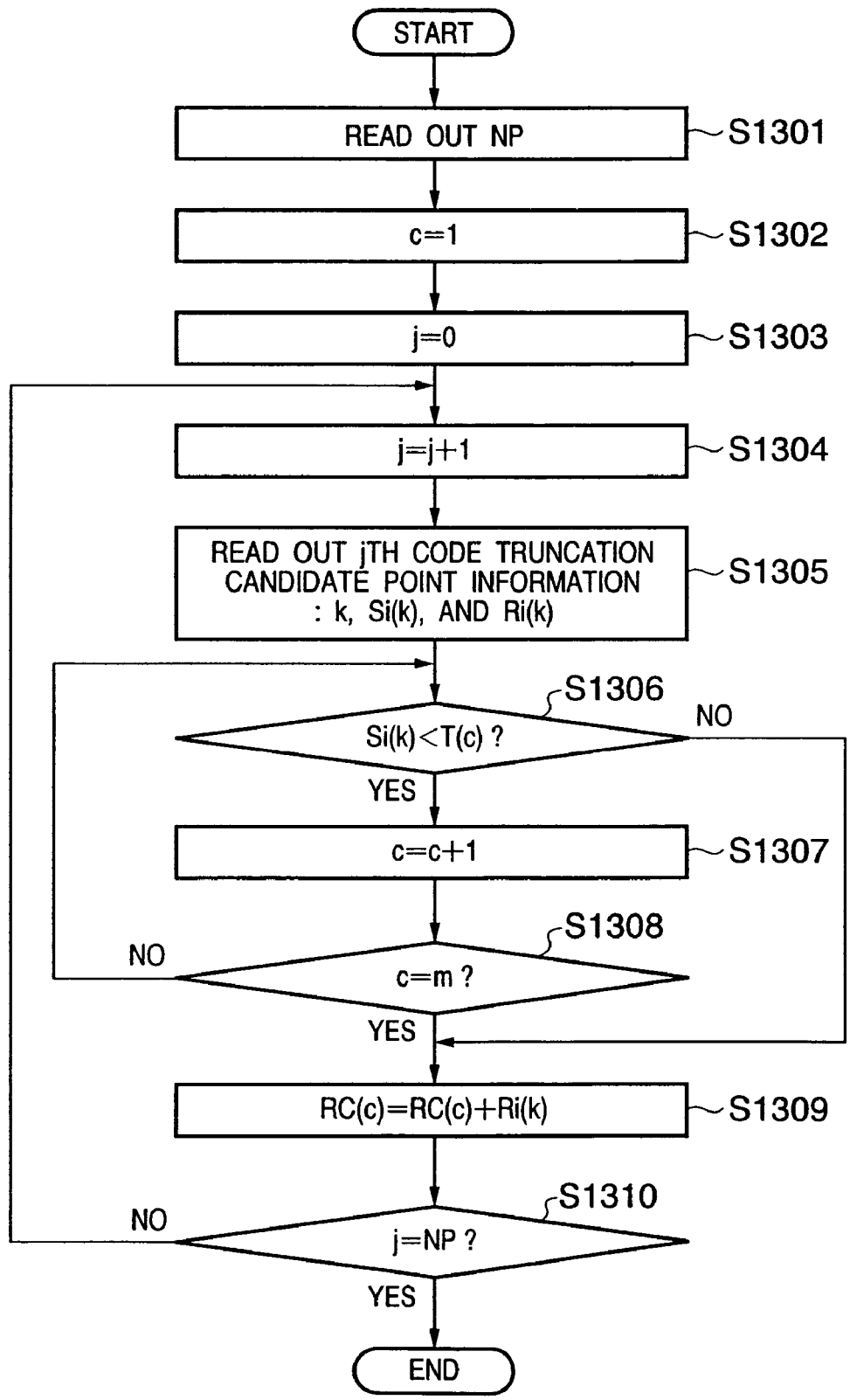
FIG. 13 is a flowchart showing the flow of code amount update processing for each category in a category information creating unit 101.

FIG. 13 is a flowchart showing the flow of code amount update processing for each category in the category information creating unit 101. The flow of the processing performed by the category information creating unit 101 will be described below with reference to FIG. 13.

Figure 9:
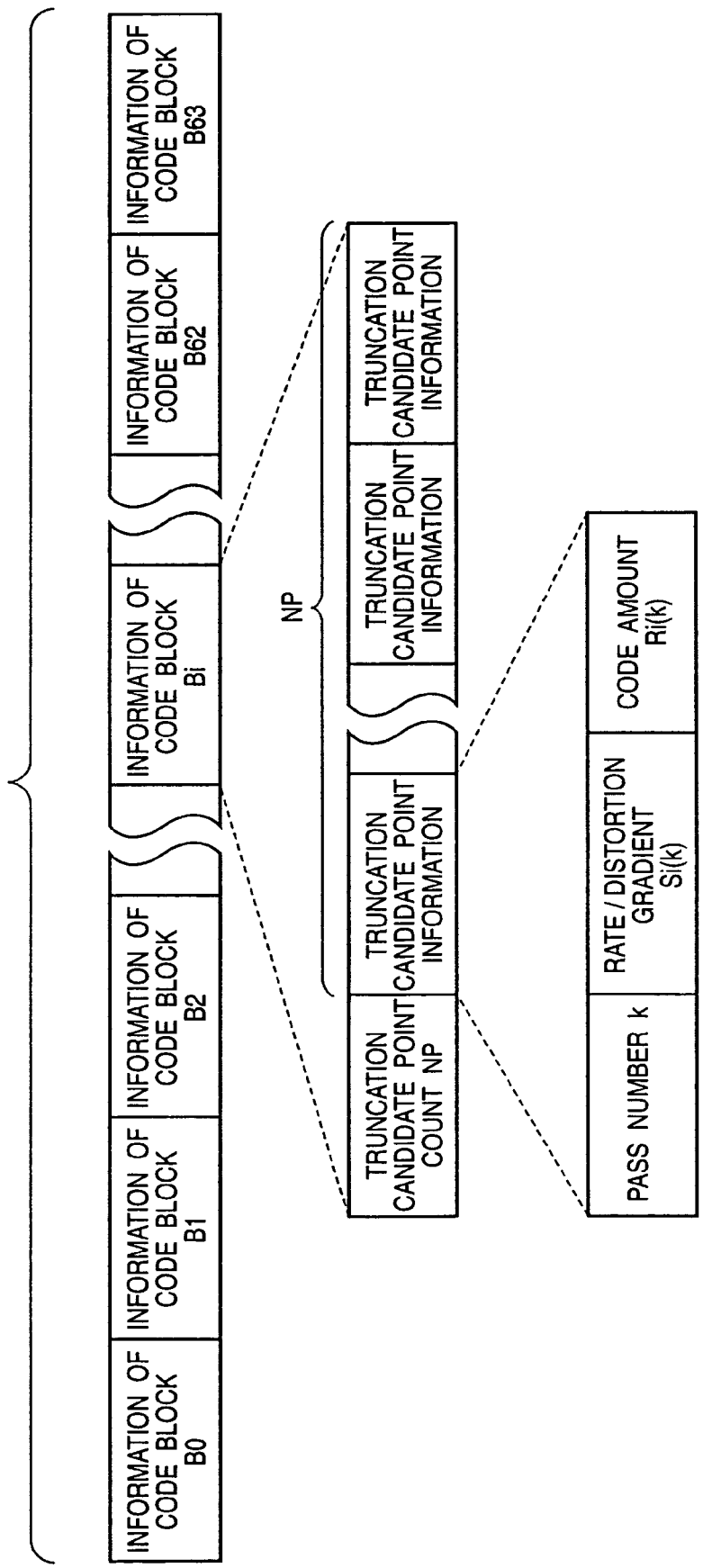
FIG. 9 is a view showing an example of the code truncation candidate point information stored in a code block information storage unit 207.
Figure 10:
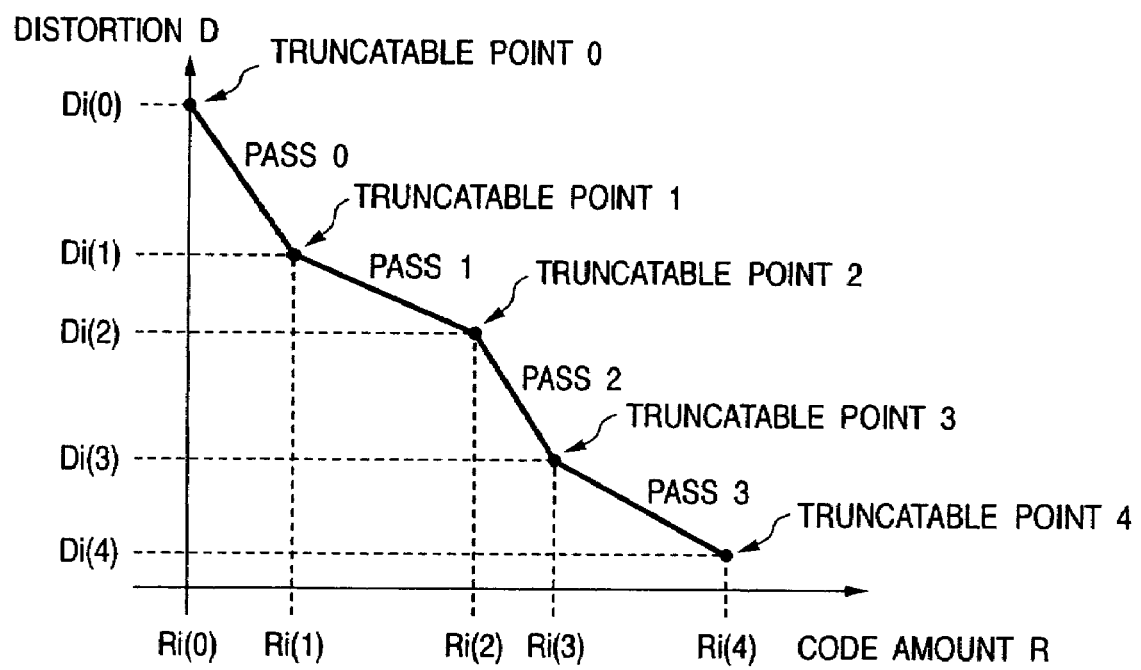
FIG. 10 is a graph showing an example of the relationship between the rate and distortion of each pass of a code block.
Figure 11:
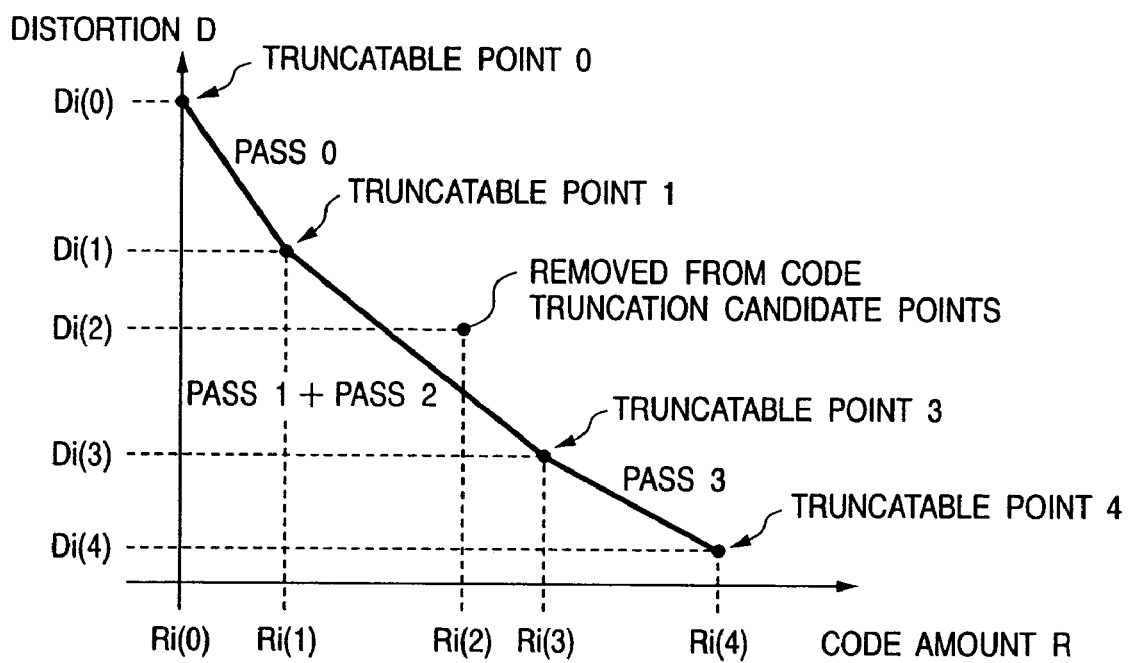
FIG. 11 is a graph showing how passes are integrated by monotonous reduction processing.

When the code block coding unit 204 completes coding processing of the code block Bi of interest, the category information creating unit 101 reads out an element count NP of a set Ni of code truncation candidate points from the information of the code block Bi which is stored in the format shown in FIG. 9 (step S1301). A variable c representing a category is set to 1 (step S1302). A variable j representing a truncation candidate point number is set to 0 (step S1303), the variable j is then incremented by one (step S1034).

The category information creating unit 101 then reads out the information of the jth truncation candidate point from the code block information storage unit 207 (step S1305). In this case, the truncation candidate point information includes a truncation coding pass number k, rate/distortion gradient Si(k), and code amount Ri(k). The rate/distortion gradient Si(k) is then compared with the category threshold T(c) (step S1306). If $Si(k) \geq T(c)$ (No), the coding pass of interest is classified to the category C(c), and the flow shifts to step S1309. If $Si(k) < T(c)$ (Yes), the variable c representing a category number is incremented by one to change the comparison target to the next category (step S1307).

The variable c is compared with a category count m (step S1308). If c=m (Yes), the coding pass of interest is classified to the category C(m), and the flow shifts to step S1309. If c≠m (No), the flow shifts to step S1306. In step S1309, the cumulative code amount RC(c) corresponding to the category is updated by adding the code amount Ri(k) corresponding to the pass of interest to the cumulative code amount RC(c). The variable j representing a truncation candidate point number is compared with NP (step S1310). If j≠NP (No), the flow returns to step S1304 to perform the processing from step S1305 to step S1309 with respect to the next candidate point in the same manner as described above. If j=NP (Yes), the processing for the code block Bi of interest is terminated.

When the code block coding unit 204 completes coding all the code blocks and the category information creating unit 101 completes category information update processing for the final code block, the code sequence forming unit 103 searches for a maximum value λ with which total code amount R=Rmax or R≈Rmax by referring to the total code amount corresponding to each category which is stored in the category information storage unit 102 and the code truncation point information of each code block which is stored in the code block information storage unit 207, forms a code sequence (e.g., a JPEG2000 code sequence) by collecting codes of a portion satisfying Si(k)>λ from the code sequence storage unit 206, and outputs the code sequence to the code output unit 208.

Figure 28:
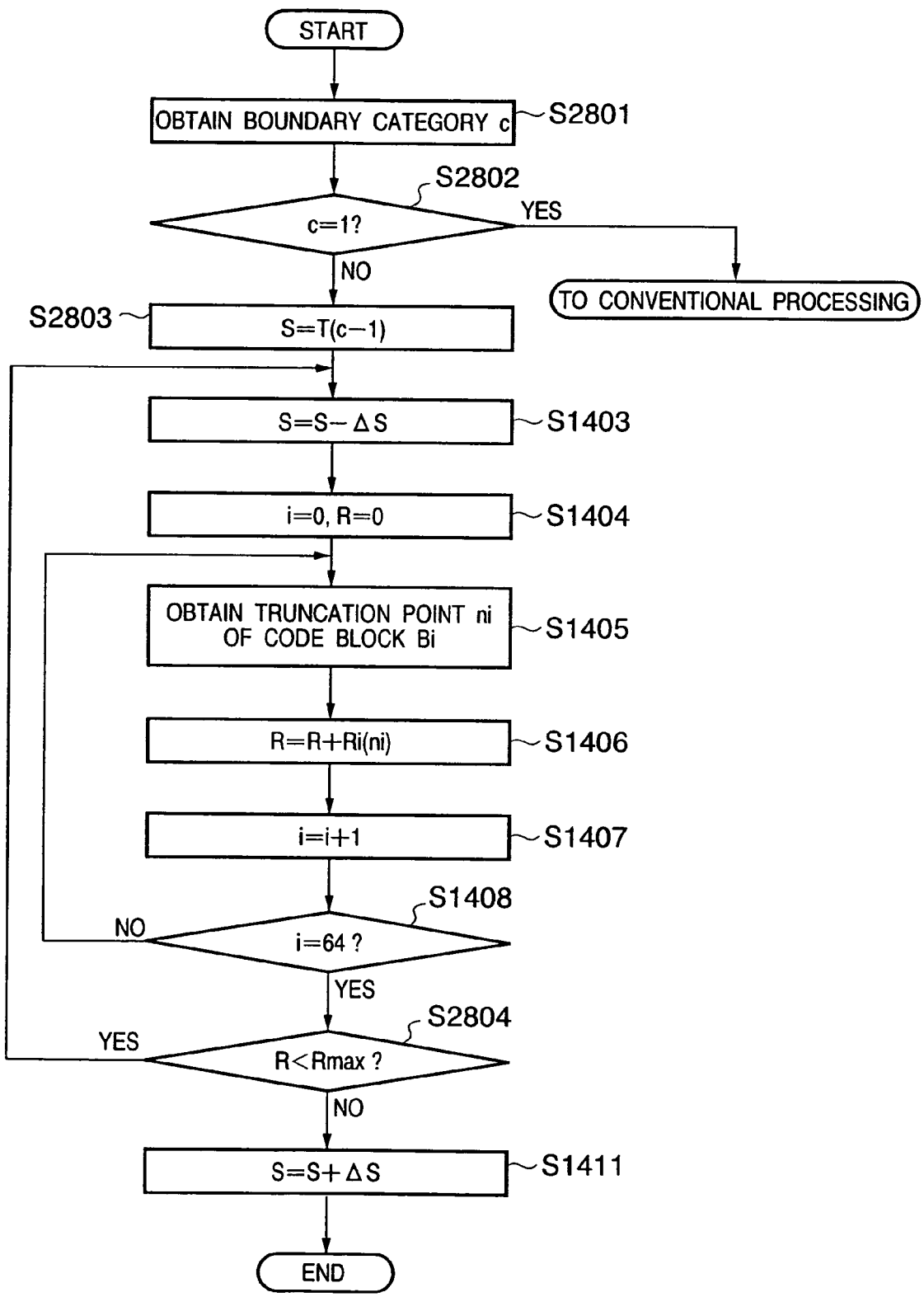
FIG. 28 is a flowchart for explaining the flow of threshold determination processing executed by a code sequence forming unit 103 of the image coding apparatus.

FIG. 28 is a flowchart for explaining the flow of threshold determination processing executed by the code sequence forming unit 103 of the image coding apparatus. Note that steps common to the threshold determination processing (FIG. 14) in the code sequence forming unit 205 described in the prior art are denoted by the same step numbers as in FIG. 28, and a description thereof will be omitted.

First of all, a boundary category c within which a target code amount Rmax falls is obtained (step S2801). More specifically, cumulative code amounts RC(c) are sequentially added from the category C(1) to the category C(m) to obtain a minimum value c which satisfies ΣRC(c)>Rmax. That is, a category corresponding to a cumulative code amount equal to or more than the target code amount is selected as a boundary category. It is then checked whether or not the boundary category c is 1 (step S2802). If the boundary category c is 1 (Yes), the flow shifts to the conventional threshold determination processing shown in FIG. 14. If the boundary category c is not 1 (No), the flow shifts to step S2803.

Figure 14:
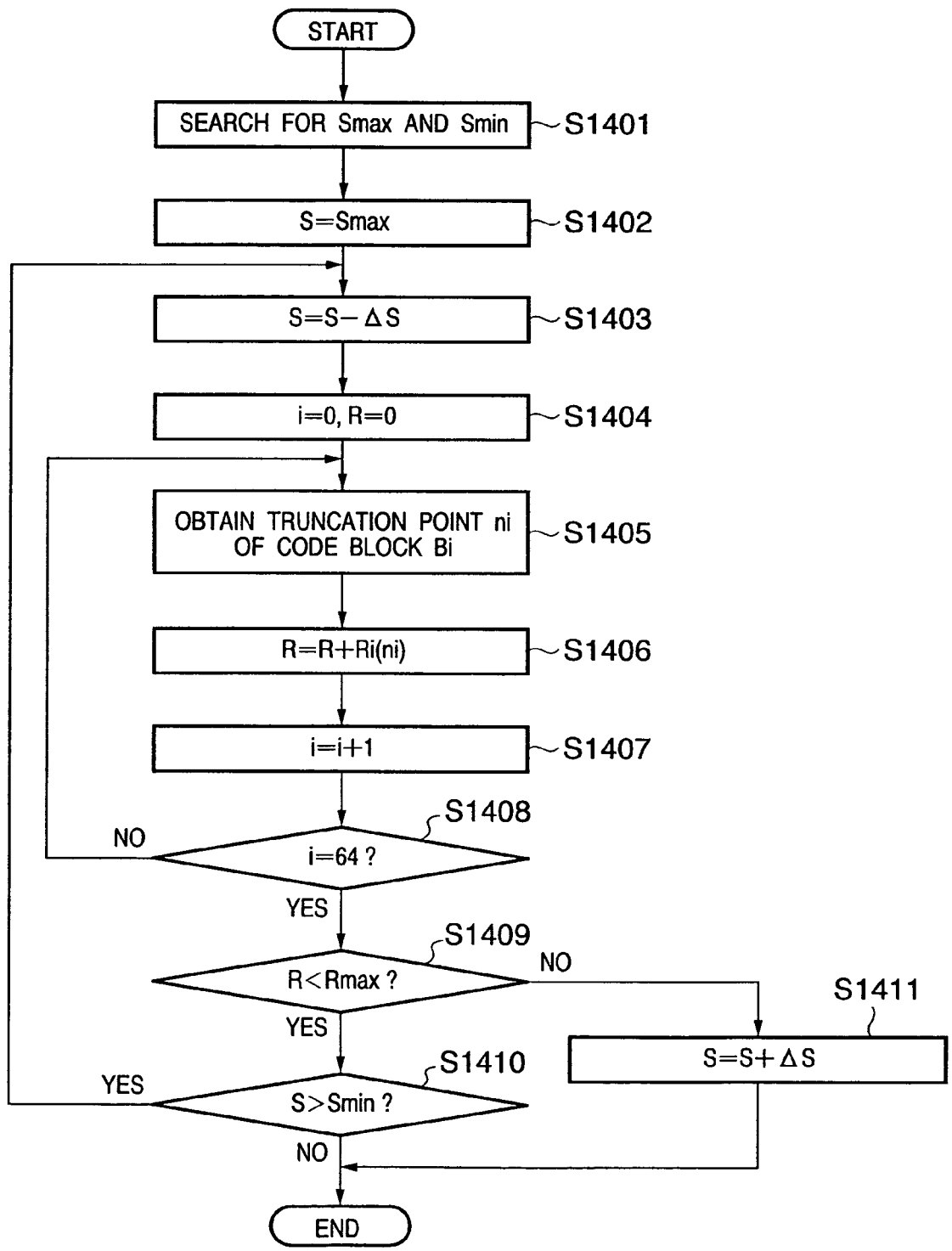
FIG. 14 is a flowchart for explaining the flow of $\lambda$ determination processing in a code sequence forming unit 205.

In step S2803, T(c−1) is set as the initial value of the threshold S. Thereafter, the processing from step S1403 to step S1408 in FIG. 14 is performed. If it is determined in step S1408 that i is 64, i.e., processing for all the code blocks is completed up to identification number i=0 to 63, the cumulative code amount R is compared with target code amount Rmax (step S2804). If R<Rmax (Yes), the flow returns to step S1403 to slightly decrease the threshold S by (ΔS) and then perform the above processing of calculating the cumulative code amount R again. If R≥Rmax (No), the flow shifts to step S1411. When the flow shifts to step S1411, since the cumulative code amount exceeds the target code amount with the current threshold S, ΔS is added to the threshold to return it to the immediately preceding threshold S, and the processing is terminated (step S1411).

As described above, according to the conventional threshold determination processing, a search for a threshold corresponding to the target code amount is made in the range of Smax to Smin. In contrast, in the image coding apparatus of this embodiment, a threshold search range can be limited to a boundary category by holding a cumulative code amount for each category. Classifying code truncation candidate points for the respective code blocks to categories and holding the total code amount for each category can limit the range in which the maximum value λ with which the cumulative code amount R becomes equal to or less than the target code amount Rmax. This makes it possible to properly reduce the computation cost required for code amount (rate)/distortion optimization processing in image coding at the time of image compression.

Second Embodiment

In the image coding apparatus according to the first embodiment described above, rate/distortion optimization processing is simplified by holding a cumulative code amount for each code amount (rate)/distortion gradient category, and searching for a threshold inside a category (boundary category) including a target code amount. In this case, if sufficiently fine classification is performed by increasing the category count or a slight deterioration in performance is permitted, threshold search processing inside a boundary category can be omitted. The second embodiment will exemplify the coding processing performed by the image coding apparatus designed to make no threshold search inside a boundary category.

The image coding apparatus according to this embodiment differs from the image coding apparatus described with reference to FIG. 1 in the first embodiment only in the processing by the code sequence forming unit 103, and the remaining arrangement is the same as that of the first embodiment. The processing performed by a code sequence forming unit 103 of the image coding apparatus according to this embodiment will be described below. Note that image coding data to be coded by the image coding apparatus according to this embodiment is 512×512 monochrome image data with each pixel consisting of eight bits as in the case of the prior art and fourth embodiment. In addition, coding conditions such as execution/non-execution of tiling, the size of a code block, and selection of a wavelet transform filter are the same as those in the prior art and fourth embodiment.

As shown in FIG. 1, when a code block coding unit 204 completes coding all the code blocks and the category information creating unit 101 completes category information update processing for the final code block, the code sequence forming unit 103 forms a JPEG2000 code sequence by collecting code sequences from a code sequence storage unit 206 upon referring to the total code amount for each category which is stored in a category information storage unit 102 and the code truncation point information of each code block which is stored in a code block information storage unit 207, and outputs the code sequence to a code output unit 208.

Note that in this embodiment, a JPEG2000 code sequence is formed by obtaining a boundary category number c, reading out codes up to a boundary category C(c) until a code block number ti-1, and also reading out codes up to a category C(c-1) until a code block number ti. That is, in this embodiment, a code sequence is formed by using all coded data included in a category higher in priority than a boundary category and part or all of coded data included in the boundary category. In this case, part or all of coded data included in a boundary category are data, of the coded data included in the boundary category, which make the code amount of a code sequence reach the target code amount.

Figure 29:
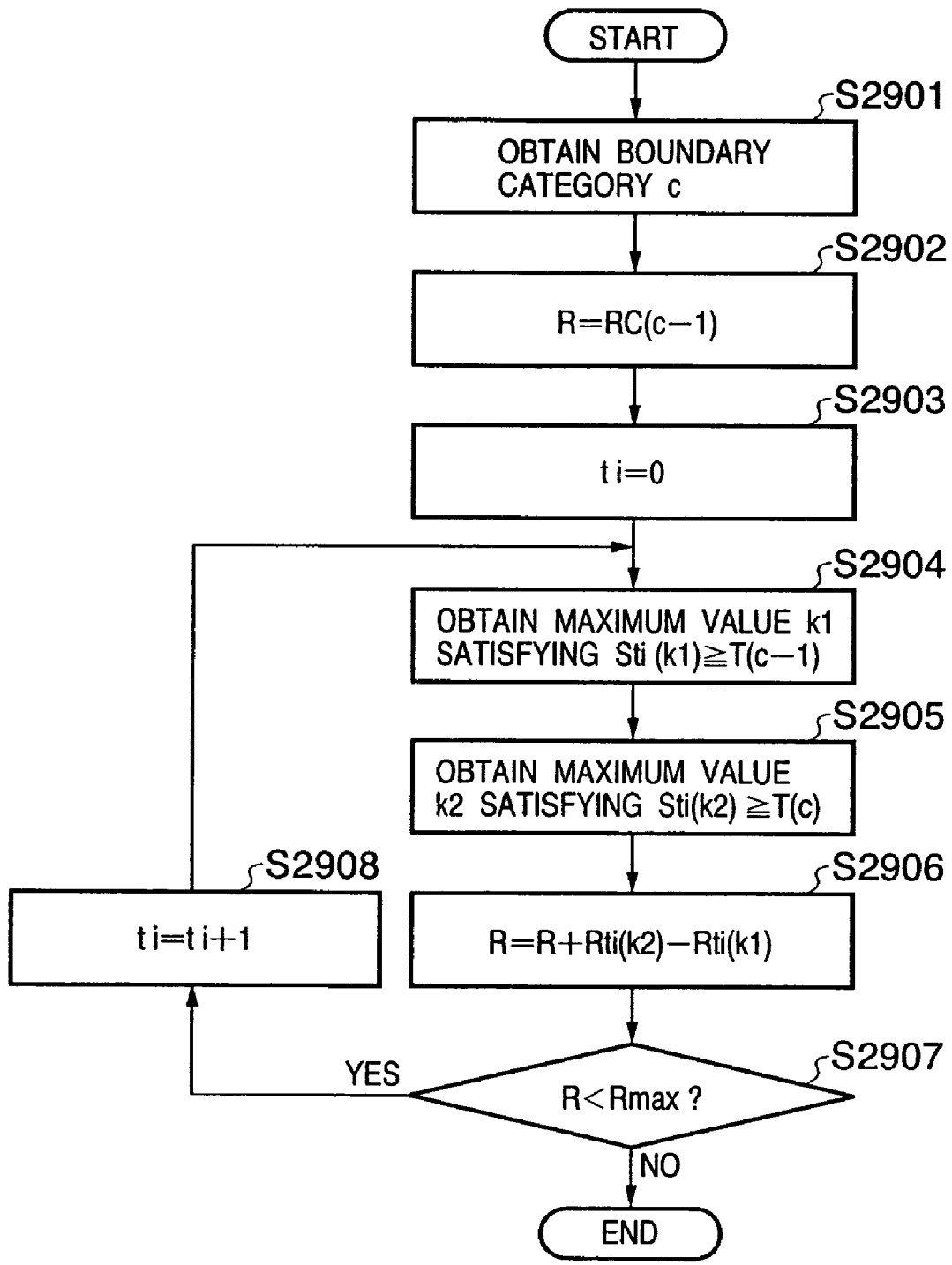
FIG. 29 is a flowchart for explaining the flow of determination processing for a code block number threshold ti which is executed by a code sequence forming unit 103 of an image coding apparatus according to the second embodiment of the present invention.

FIG. 29 is a flowchart for explaining the flow of determination processing for a code block number threshold ti which is executed by the code sequence forming unit 103 of the image coding apparatus according to the second embodiment of the present invention. First of all, a boundary category c is obtained (step S2901). Note that the processing in step S2901 is the same as that in step S2801 (FIG. 28) described with reference to the threshold determination processing by the code sequence forming unit 103 in the first embodiment.

A cumulative code amount R is set to RC(c−1) (step S2902), and the code block number threshold ti is initialized to 0 (step S2903). A maximum value k1 of code truncation candidate points included in a category c−1 is obtained with respect to a code block ti of interest (step S2904). The maximum value k1 is obtained by sequentially comparing a rate/distortion gradient Sti(k1) with T(c−1) in order of code truncation points and obtaining a maximum value k1 satisfying Sti(k1)≧T(c−1).

Likewise, a maximum value k2 of the code truncation points included in the category c is obtained (step S2905). Rti(k2)-Rti(k1) is then added to the cumulative code amount R (step S2906). The cumulative code amount R is compared with a target code amount Rmax (step S2907). If R<Rmax (Yes), the value of ti is incremented by one (step S2908), and the flow shifts to step S2904 to continue the above code amount accumulation. If R≧Rmax (No), the processing is terminated, and ti at the end of the processing is set as a code block number threshold.

As described above, the JPEG2000 code sequence obtained by the image coding apparatus according to this embodiment includes code sequences up to the category C(c−1) in all the code blocks and code sequences corresponding to the category C(c) in order of code blocks up to the target code amount. The image coding processing described in this embodiment is slightly lower in efficiency than the image coding processing in the first embodiment in terms of rate/distortion optimization, but need not estimate code amounts with various thresholds. This embodiment can therefore improve the rate/distortion characteristics more easily.

Third Embodiment

The image coding apparatus according to the first embodiment described above is designed to simplify rate/distortion optimization processing by holding a cumulative code amount for each rate/distortion category, and searching for a threshold inside a category (boundary category) including a target code amount. That is, in threshold search processing inside a boundary category, a search for a threshold corresponding to a target code amount is made while a threshold is changed little by little. In contrast to this, the third embodiment will exemplify a case wherein a threshold search is made more efficiently by estimating a threshold λ from the information of a boundary category and an immediately preceding category (one level higher in priority).

The image coding apparatus according to this embodiment differs from the image coding apparatus described with reference to FIG. 1 in the first embodiment only in the processing by the code sequence forming unit 103, and the remaining arrangement is the same as that of the first embodiment. The processing performed by a code sequence forming unit 103 of the image coding apparatus according to the third embodiment will be described below. Note that image coding data to be coded by the image coding apparatus according to this embodiment is 512×512 monochrome image data with each pixel consisting of eight bits as in the case of the prior art and first and second embodiments. In addition, coding conditions such as execution/non-execution of tiling, the size of a code block, and selection of a wavelet transform filter are the same as those in the prior art and first and second embodiments.

When a code block coding unit 204 completes coding all the code blocks and a category information creating unit 101 completes category information update processing for the final code block, the code sequence forming unit 103 searches for a maximum value λ with which total code amount R=Rmax or R≈Rmax by referring to the total code amount corresponding to each category which is stored in a category information storage unit 102 and the code truncation point information of each code block which is stored in a code block information storage unit 207, forms a JPEG2000 code sequence by collecting codes of a portion satisfying Si(k)>λ from a code sequence storage unit 206, and outputs the code sequence to a code output unit 208.

Figure 17:
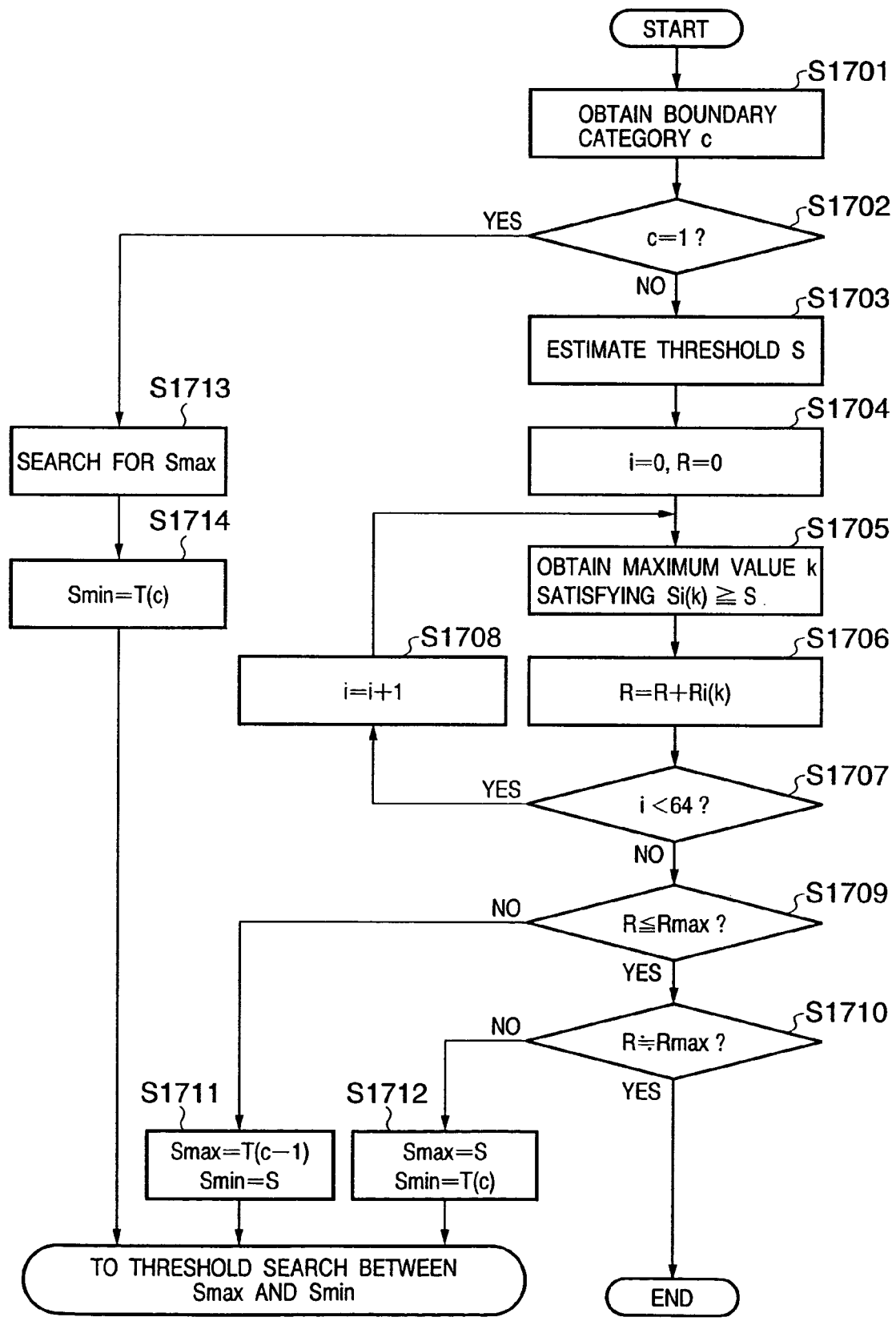
FIG. 17 is a flowchart for explaining the flow of threshold determination processing executed by a code sequence forming unit 103 of the image coding apparatus.

A sequence for threshold determination processing in the code sequence forming unit 103 of the image coding apparatus according to this embodiment is the same as that shown in the flowchart of FIG. 17. First of all, a boundary category c is obtained (step S1701). More specifically, cumulative code amounts RC(c) are sequentially added from a category C(1) to a category C(m) to obtain a minimum value c which satisfies ΣRC(c)>Rmax. It is then checked whether the value of c is 1 (step S1702).

If c is 1 (Yes), a maximum value Smax of Si(k) is obtained by referring to the truncation candidate point information of all the code blocks stored in the code block information storage unit 207 (step S1713). Subsequently, a minimum value Smin is set to T(c) (step S1714), and the flow shifts to the processing of searching for a threshold between Smax and Smin, which will be described later.

Figure 18:
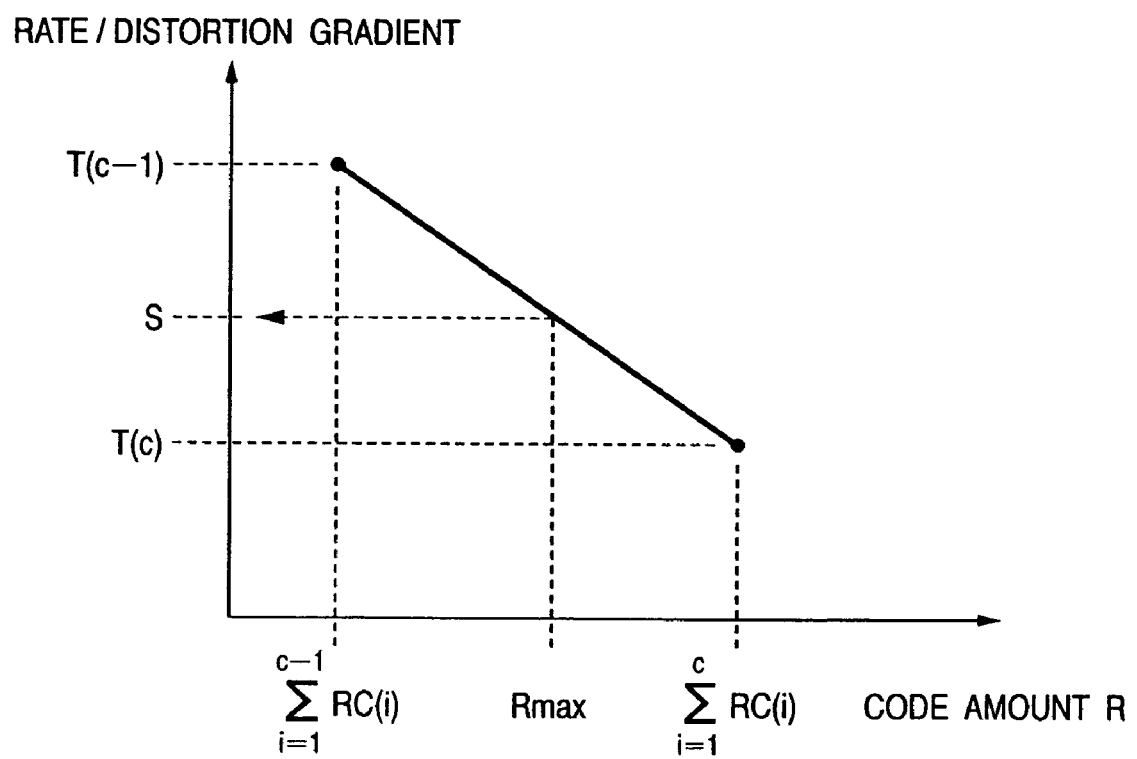
FIG. 18 is a graph showing how a threshold S corresponding to Rmax is estimated from the information of a boundary category c and category c−1.

If it is determined in step S1702 that the boundary category c is not 1 (No), a rate/distortion gradient S corresponding to the target code amount Rmax is calculated in consideration of a line segment connecting the cumulative code amount R up to the category C(c−1) immediately preceding the boundary category c (i.e., this category is one step higher in priority than the boundary category), a rate/distortion gradient threshold T(c−1), the cumulative code amount R up to a boundary category C(c), and rate/distortion gradient threshold T(c), as shown in FIG. 18 (step S1703). In this embodiment, the threshold S is calculated by $$S = \frac{T(c) - T(c-1)}{\sum_{i=1}^{c} RC(i) - \sum_{i=1}^{c-1} RC(i)} \left( R\max - \sum_{i=1}^{c-1} RC(i) \right) + T(c-1)$$

$$= \frac{T(c) - T(c-1)}{RC(c)} \left( R\max - \sum_{i=1}^{c-1} RC(i) \right) + T(c-1)$$

In step S1704, the variable i representing a code block number is set to 0, and the cumulative code amount R is set to 0. A maximum value k satisfying Si(k)≧S is obtained with respect to the code block i of interest (step S1705). Ri(k) is then added to the cumulative code amount R (step S1706). The code block number i is compared with 64 (step S1707). If i<64 (Yes), i is incremented by one (step S1708), and the flow returns to step S1705.

If it is determined in step S1707 that i≠64 (No), the cumulative code amount R is compared with Rmax (step S1709). If R≦Rmax (Yes), the flow advances to step S1710. If R>Rmax (No), the flow branches to step S1711.

If R>Rmax (No), the maximum value Smax of gradient is set to T(c−1), and the minimum value Smin is set to S (step S1711). The flow then shifts to the processing of searching for a threshold between Smax and Smin, which will be described later. If R≦Rmax (Yes), it is checked whether R is sufficiently near to Rmax (step S1709). If R≈Rmax (Yes), the processing is terminated. Otherwise (No), Smax is set to S, and Smin is set to T(c). The flow then shifts to the processing of searching for a threshold between Smax and Smin.

Note that the processing of searching for a threshold between Smax and Smin is equivalent to threshold search processing in the code sequence forming unit 205 described in the prior art (FIG. 14) from which the first search processing for Smax and Smin (step S1401) is omitted.

As described above, a threshold search within a boundary category can be performed more efficiently by performing rate/distortion gradient category segmentation and estimating a threshold corresponding to a target code amount from the information of cumulative code amounts corresponding to categories around a category (boundary category) including the target code amount and thresholds.

Fourth Embodiment

Figure 21:
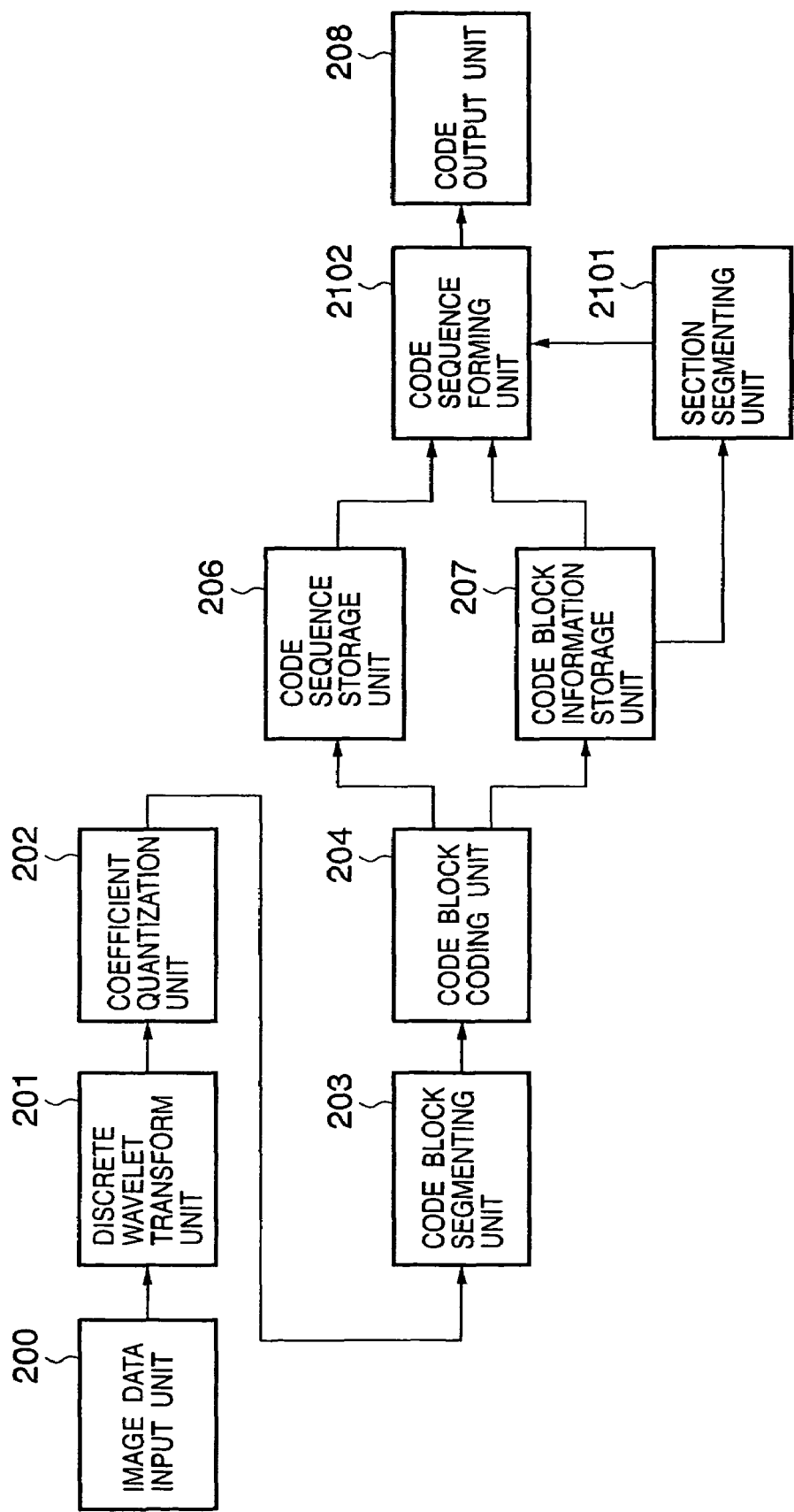
FIG. 21 is a block diagram showing the arrangement of a general image coding apparatus which executes an N segmentation method.

FIG. 21 is a block diagram showing the arrangement of an image coding apparatus according to the fourth embodiment of the present invention. The same reference numerals as in FIG. 21 denote the same blocks common to the image coding apparatuses according to the prior art and first embodiment and a description thereof will be omitted. As shown in FIG. 21, the image coding apparatus according to the fourth embodiment includes an image data input unit 200, discrete wavelet transform unit 201, coefficient quantization unit 202, code block segmenting unit 203, code block coding unit 204, code sequence forming unit 2102, code block information storage unit 207, code sequence storage unit 206, and section segmenting unit 2101.

The operation sequence of the image coding apparatus according to this embodiment will be described below with reference to FIG. 21.

Image coding data to be coded by the image coding apparatus according to this embodiment is 512×512 monochrome image data with each pixel consisting of eight bits as in the case of the prior art. In addition, coding conditions such as execution/non-execution of tiling, the size of a code block, and selection of a wavelet transform filter are the same as those in the prior art.

A coding target image is input from the image data input unit 200. This image is then segmented into code blocks and coded on a code block basis by the processing up to the code block coding unit 204 in the same manner as in prior art.

When the code block coding unit 204 codes all the code blocks, the section segmenting unit 2101 calculates the maximum and minimum values of rate/distortion gradient by referring to the truncation candidate point information of a code block Bi which is stored in the code block information storage unit 207 in the same manner as in the second embodiment, and segments the section into N sections (N segmentation). The section segmenting unit 2101 then forms a table like the one shown in FIG. 20 by obtaining code amounts at the respective section segmentation points, and stores the table in an internal buffer (not shown).

FIG. 20 is a view showing the section information held in the section segmenting unit 2101 in the fourth embodiment. In this embodiment, as shown in FIG. 20, the N sections are sequentially assigned numbers from 1 in order of decreasing rate/distortion gradient and expressed in the form of K(n) like K(1), K(2), . . . , K(N). In addition, a rate/distortion gradient threshold corresponding to a boundary between a section K(n) and a section K(n+1) is represented by T(n), and a cumulative code amount included in sections up to the section K(n) is represented by RK(n).

Figure 19:
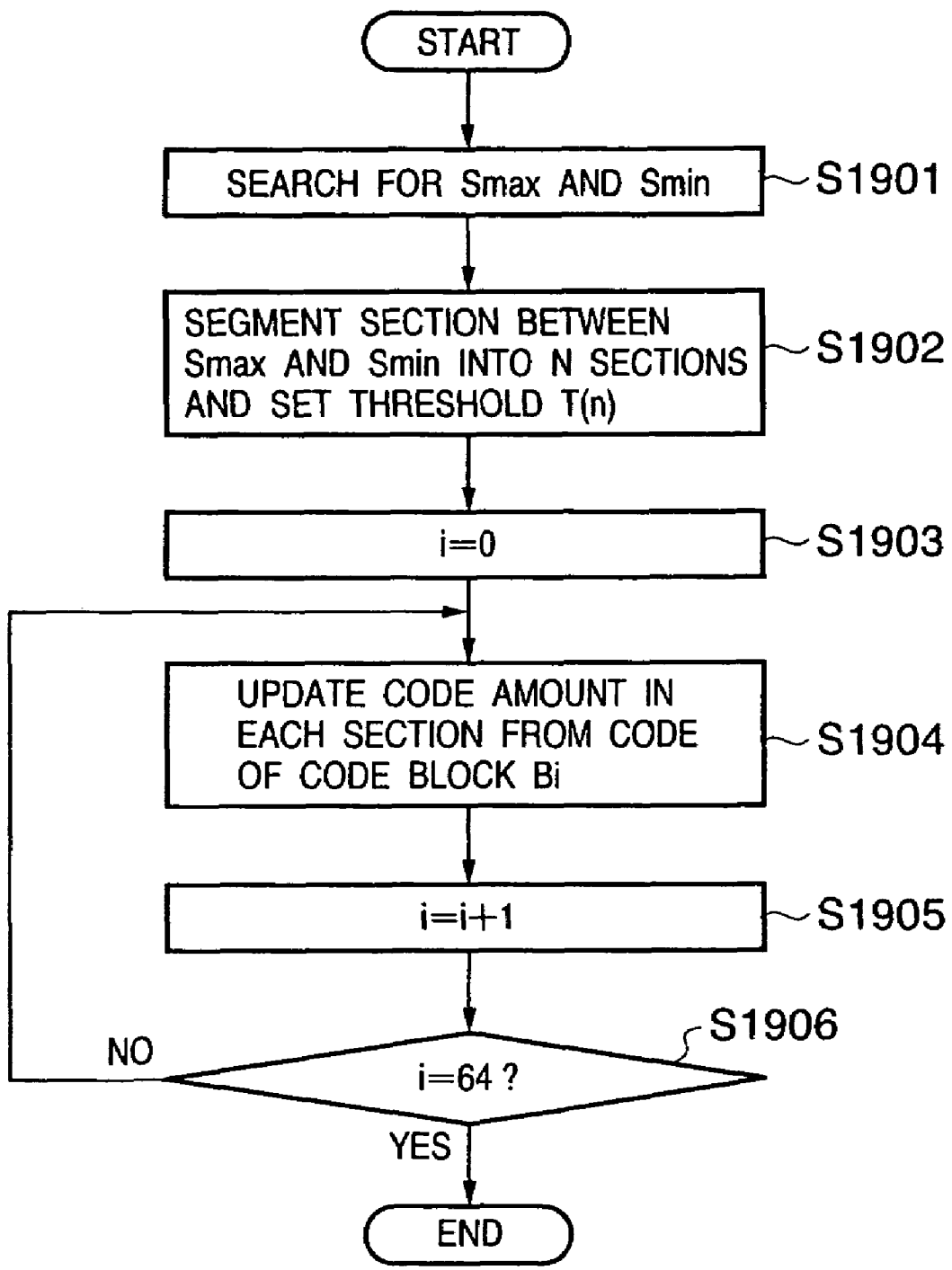
FIG. 19 is a flowchart for explaining the flow of section segmentation and section information creation processing in a section segmenting unit 2101.

FIG. 19 is a flowchart for explaining a sequence for section segmentation processing and section information creation processing in the section segmenting unit 2101 of the image coding apparatus according to the fourth embodiment of the present invention. The flow of processing in the section segmenting unit 2101 will be described below with reference to FIG. 19.

Figure 34:
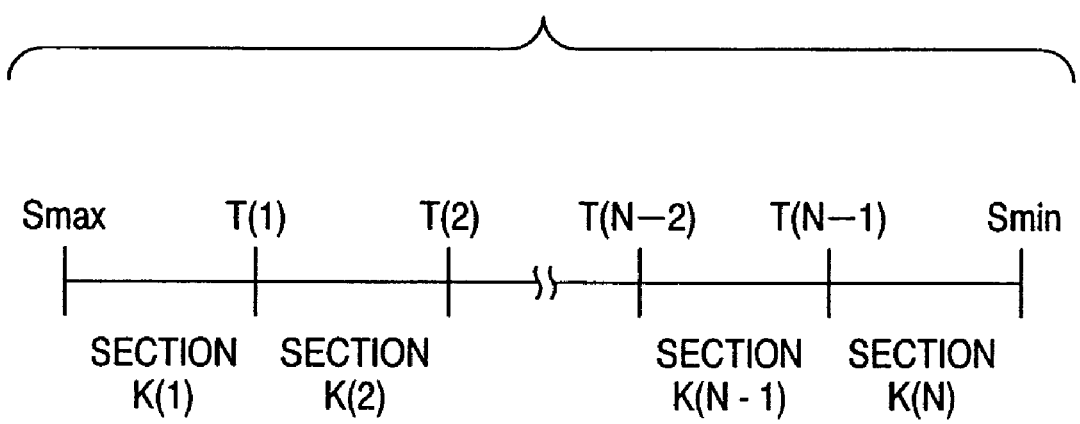
FIG. 34 is a view showing how the section between Smax and Smin is equally segmented into N sections by a section segmenting unit 2101.

When the code block coding unit 204 completes coding all the code blocks, the section segmenting unit 2101 obtains a maximum value Smax and minimum value Smin of rate/distortion gradient by referring to the truncation candidate point information of all the code blocks which is stored in the code block information storage unit 207 (step S1901). The section between Smax and Smin is then segmented into N sections, and a threshold T(n) for each section is set (step S1902). Assume that in this embodiment, as shown in FIG. 34, the section between Smax and Smin is equally segmented into sections. FIG. 34 is a graph showing how the section between Smax and Smin is equally segmented into N sections by the section segmenting unit 2101. The threshold T(n) can therefore be obtained by $$T(n) = S\max - \left(\frac{S\max - S\min}{N}\right) \times n$$

After the threshold T(n) for each section is set, the flow shifts to the processing of obtaining the code amount K(n) corresponding to each section from each code block. A variable i representing a code block number is initialized to 0 (step S1903). It is then determined to which section the code block Bi of interest belongs for each code truncation point, and the code amount RK(n) corresponding to the section to which the block belongs is updated (step S1904). The detailed processing in step S1904 will be described later. The variable i is incremented by one (step S1905), and i is compared with 64 (step S1906). If i=64 (Yes), the processing is terminated. Otherwise (No), the flow returns to step S1904 to continue the processing.

Figure 35:
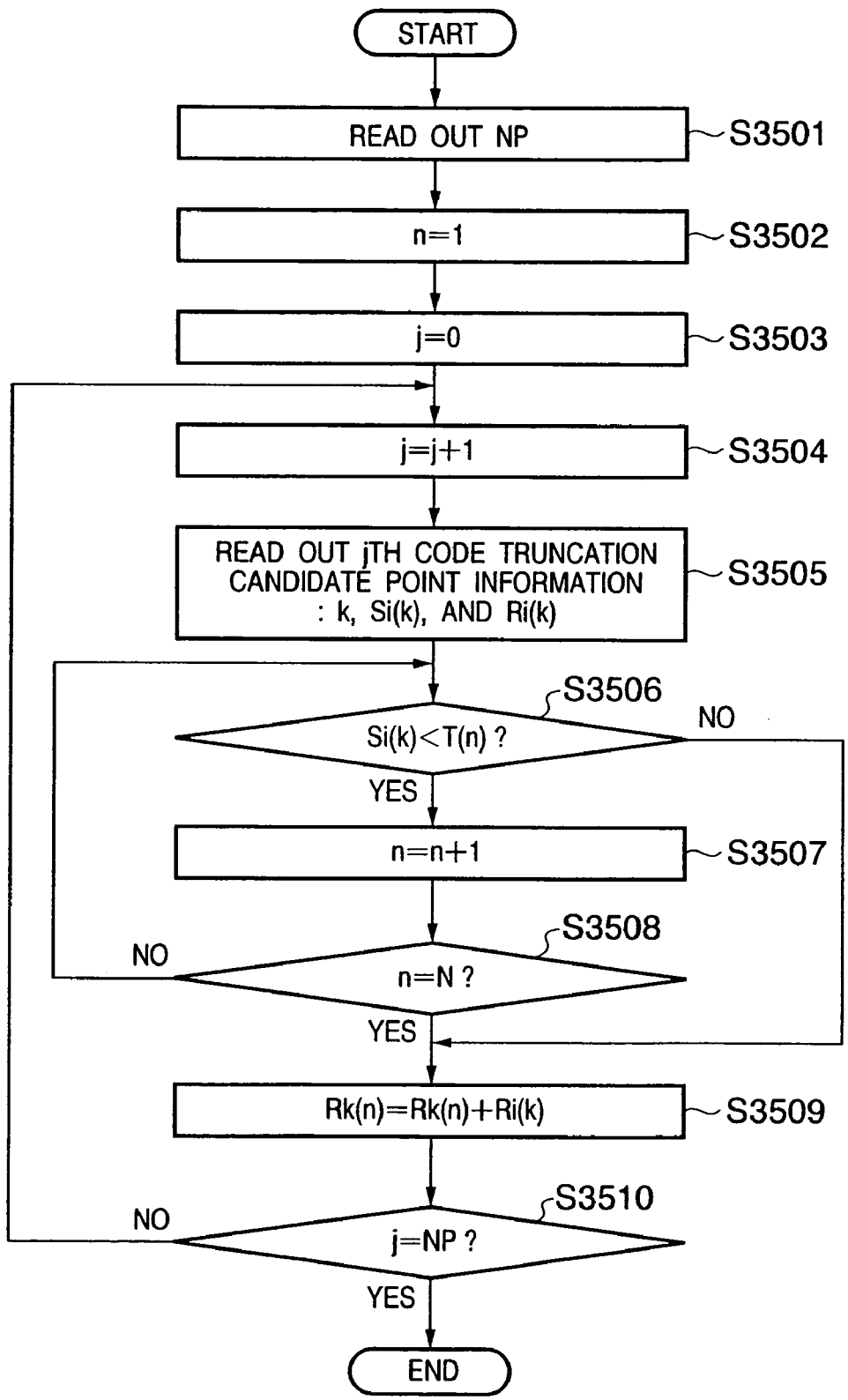
FIG. 35 is a flowchart for explaining a sequence for processing in step S1904 in which the code amount in each section is updated in a section segmenting unit 2101.

The processing in step S1904 will be described in detail below. FIG. 35 is a flowchart for explaining a sequence for the processing in step S1904 in the section segmenting unit 2101 in which the code amount corresponding to each section is updated. First of all, an element count NP of a set Ni of truncation candidate points is read out from the information of the code block Bi which is stored in the format shown in FIG. 9 described above in the code block information storage unit 207 (step S3501). A variable n representing a section number is set to 1 (step S3502), and a variable j representing a truncation candidate point number is set to 0 (step S3503). The variable is then incremented by one (step S3504).

The information of the jth truncation candidate point is read out from the code block information storage unit 207 (step S3505). In this case, the information of the truncation candidate point includes a truncation coding pass number k, rate/distortion gradient Si(k), and code amount Ri(k). Thereafter, the rate/distortion gradient Si(k) is compared with the threshold T(n) for the section K(n) (step S3506).

If Si(k)≧T(n) (No), it is determined that the coding pass of interest is included in the section K(n), and the flow shifts to step S3509. If Si(k)<T(n) (Yes), the variable n representing a section number is incremented by one to change the comparison target to the next section (step S3507). The variable n is then compared with the section count N (step S3508).

If n=N (Yes), it is determined that the coding pass of interest belongs to the section K(n), and the flow shifts to step S3509. If n≠N (No), the flow shifts to step S3506.

In step S3509, the cumulative code amount RK(n) corresponding to the section is updated by adding a code amount Ri(k) of the pass of interest thereto. Thereafter, the variable j representing a truncation candidate point number is compared with NP (step S3510). If j≠NP (No), the flow returns to step S3504 to perform the processing in steps S3505 to S3509 with respect to the next candidate point in the same manner as described above. If j=NP (Yes), the processing for the code block Bi of interest is terminated.

With the above processing, a table in the format shown in FIG. 20 can be formed in a buffer (not shown) in the section segmenting unit 2101.

When the code block coding unit 204 completes coding all the code blocks and section segmentation and the section segmenting unit 2101 completes section information creation processing, the code sequence forming unit 2102 searches for a maximum value λ with which total code amount R=Rmax or R≈Rmax by referring to the section information stored in the section segmenting unit 2101 and the code truncation point information of each code block which is stored in the code block information storage unit 207, forms a JPEG2000 code sequence by collecting codes of a portion satisfying Si(k)>λ from the code sequence storage unit 206, and outputs the code sequence to the code output unit 208.

Figure 30:
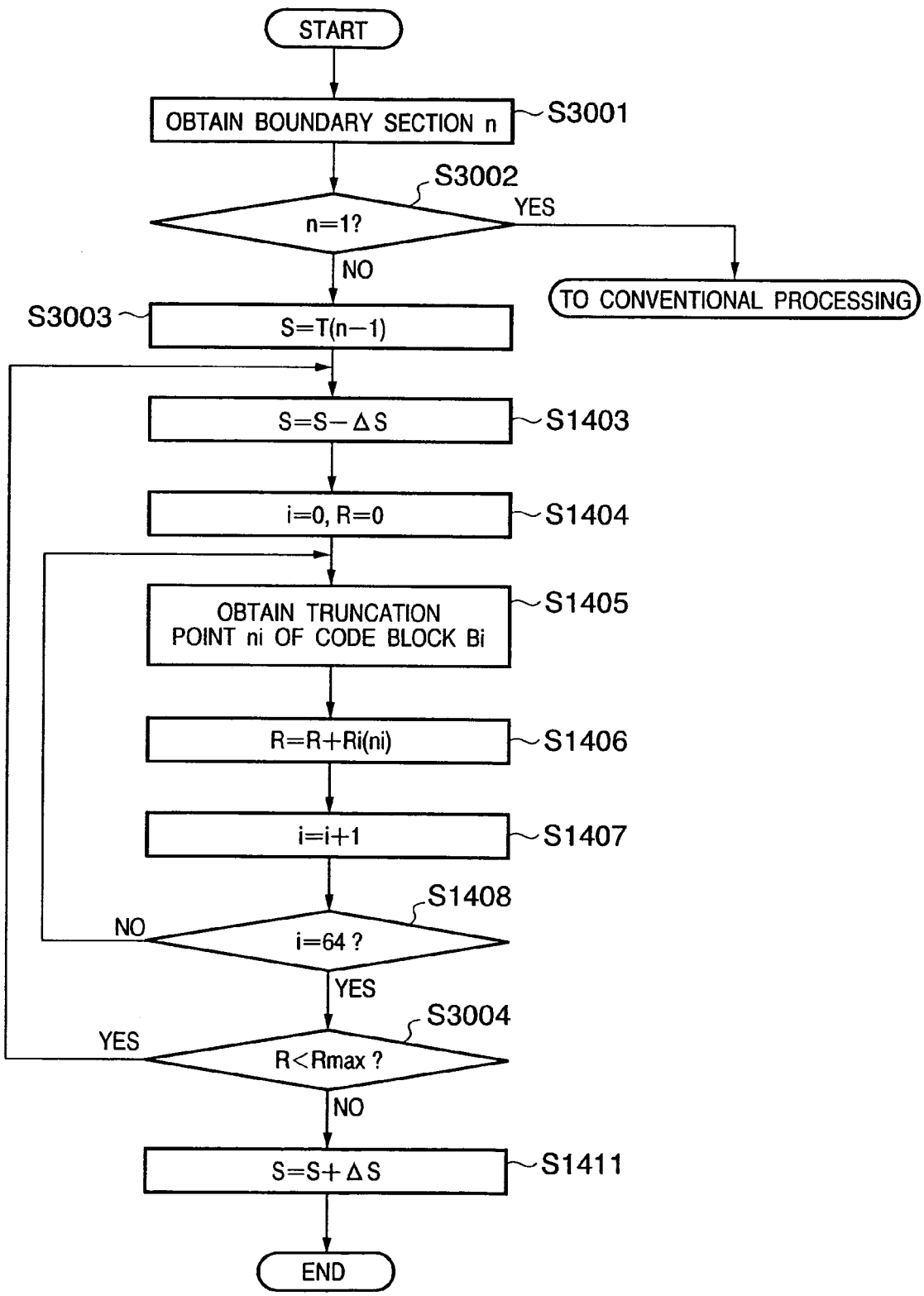
FIG. 30 is a flowchart for explaining a threshold determination processing sequence in a code sequence forming unit 2102 of an image coding apparatus according to the fourth embodiment.

FIG. 30 is a flowchart for explaining a threshold determination processing sequence in the code sequence forming unit 2102 of the image coding apparatus according to the fourth embodiment. Steps common to the threshold determination processing (FIG. 14) in the code sequence forming unit 205 described in the prior art and the like are denoted by the same step numbers in the flowchart of FIG. 30, and a description thereof will be omitted.

First of all, the code sequence forming unit 2102 selects a section (referred to as a "boundary section") including a target code amount Rmax (step S3001). More specifically, the cumulative code amounts RK(n) are sequentially added from the section K(1) to the section K(N) to obtain a minimum value n which satisfies ΣRK(n)>Rmax. It is then checked whether the value of n is 1 (step S3002). If n=1 (Yes), the flow shifts to the threshold determination processing in the prior art shown in FIG. 14. If n≠1 (No), the flow shifts to step S3003.

In step S3003, T(n—1) is set as the initial value of a threshold S. The cumulative code amount R is then compared with the target code amount Rmax (step S3004). If R<Rmax (Yes), the flow returns to step S1403 to slightly (ΔS) decrease the threshold S and calculate the cumulative code amount R again. If R≧Rmax (No), the flow shifts to step S1411. If the flow shifts to step S1411, since the current threshold S exceeds the target code amount, the immediately preceding threshold S is set by adding ΔS thereto, and the processing is terminated (step S1411).

As described above, in the conventional threshold determination processing, a search for a threshold corresponding to a target code amount is made in the range of Smax to Smin. In contrast, in the image coding apparatus according to this embodiment, the threshold search range can be limited to a boundary section by holding a cumulative code amount for each section.

That is, the range in which a search is made for the maximum value λ with which a cumulative code amount becomes equal to or less than the target code amount R can be limited to a boundary section by segmenting the section between Smax and Smin into N sections and obtaining a total code amount for each section. This makes it possible to simplify the processing.

Fifth Embodiment

In the image coding apparatus according to the fourth embodiment described above, rate/distortion optimization processing is simplified by segmenting the section between the maximum and minimum value of rate/distortion gradient into N sections and searching for a threshold within a section (boundary section) including a target code amount. In this case, if the section between the maximum and minimum values is segmented finely to a certain extent by increasing the section segmentation count N or a slight deterioration in performance is permitted, threshold search processing within a boundary section can be omitted. An embodiment in which no threshold search is made within a boundary section will be described below.

The image coding apparatus according to this embodiment is the same as the image coding apparatus shown in FIG. 21, which has been described in the seventh embodiment, except for the processing performed by the code sequence forming unit 2102. The processing performed by a code sequence forming unit 2102 of the image coding apparatus according to the fifth embodiment will be described below. Note that image coding data to be coded by the image coding apparatus according to this embodiment is 512×512 monochrome image data with each pixel consisting of eight bits as in the case of the prior art and fourth embodiment. In addition, coding conditions such as execution/non-execution of tiling, the size of a code block, and selection of a wavelet transform filter are the same as those in the above embodiments and the like.

When a code block coding unit 204 completes coding all the code blocks and a section segmenting unit 2101 completes section segmentation and section information creation processing, the code sequence forming unit 2102 forms a JPEG2000 code sequence by collecting code sequences from a code sequence storage unit 206 by referring to the information of each section which is stored in the section segmenting unit 2101 and the truncation candidate point information of each code block which is stored in a code block information storage unit 207, and outputs the code sequence to a code output unit 208. In this embodiment, a JPEG2000 code sequence is formed by obtaining a boundary section number n, reading out codes up to a $Si(k) \geq T(n)$ with a threshold $T(n)$ until a predetermined code block number ti-1, and also reading out codes up to $Si(k) > T(n-1)$ with a threshold $T(n-1)$ with respect to a code block number ti or more. That is, in this embodiment, a code sequence is formed by using all coded data included in sections higher in order than a boundary section and part or all of coded data included in the boundary section. In this case, part or all of coded data included in a boundary section are data, of the coded data included in the boundary section, which make the code amount of a code sequence reach the target code amount.

Figure 31:
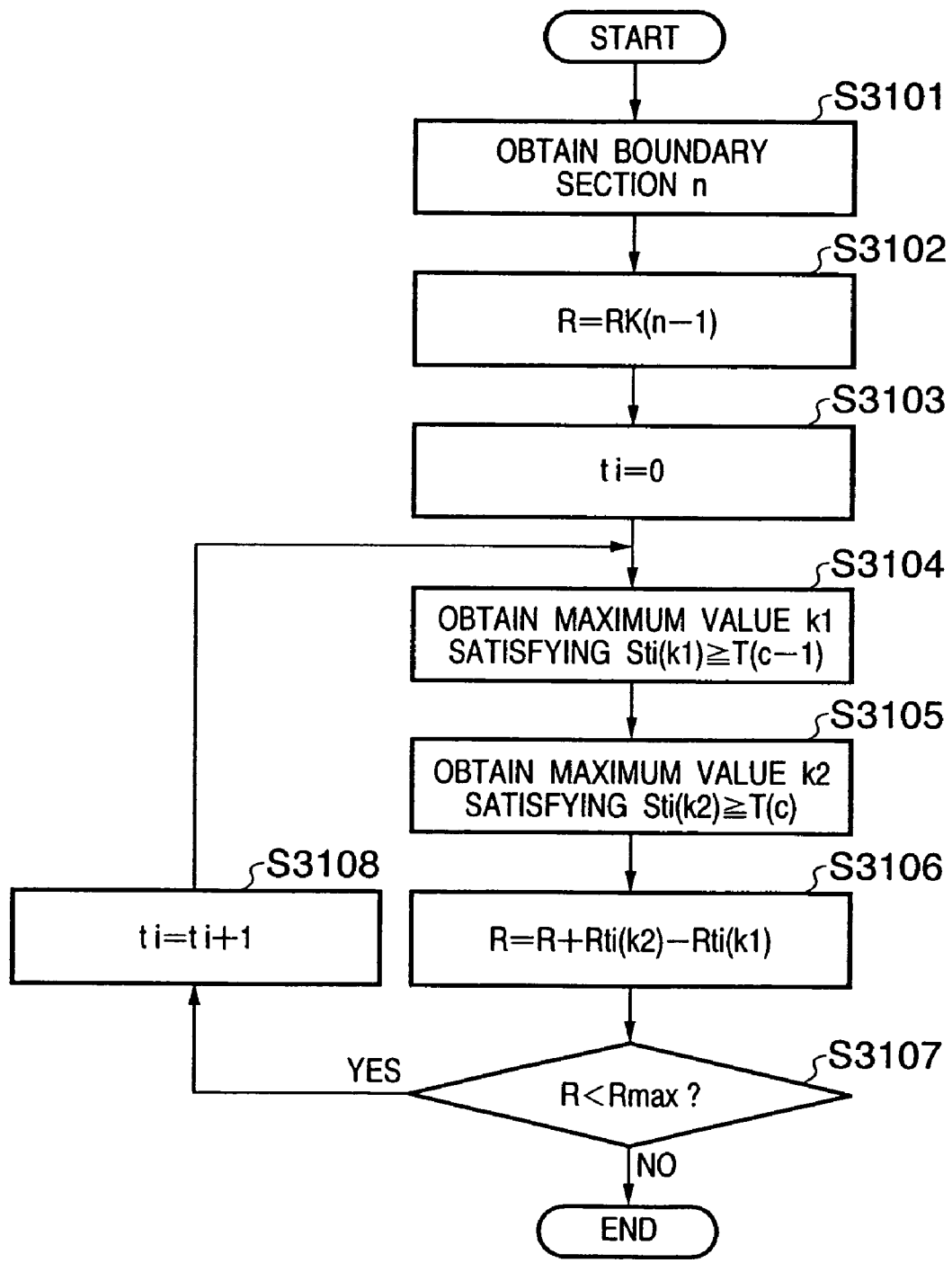
FIG. 31 is a flowchart for explaining the flow of determination processing for a code block number threshold ti which is executed by a code sequence forming unit 2102 of an image coding apparatus according to the fifth embodiment.

FIG. 31 is a flowchart for explaining the flow of the processing of determining a code block number threshold ti which is executed by the code sequence forming unit 2102 of the image coding apparatus according to the fifth embodiment. First of all, a boundary section n is obtained (step S3101). The processing in step S3101 is the same as that in step S3001 (FIG. 30) described in the threshold determination processing by the code sequence forming unit 2102 in the third embodiment.

A cumulative code amount R is set to RK(n−1) (step S3102), and the code block number threshold ti is initialized to 0 (step S3103). A maximum value k1 of code truncation candidate points included in a section n−1 is obtained with respect to a code block ti of interest (step S3104). The maximum value k1 is obtained by sequentially comparing a rate/distortion gradient $Sti(k1)$ with $T(n-1)$ in order of code truncation points and obtaining a maximum value k1 satisfying $Sti(k1) \geq T(n-1)$.

Likewise, a maximum value k2 of the code truncation points included in the section n is obtained (step S3105). $Rti(k2)-Rti(k1)$ is then added to the cumulative code amount R (step S3106). The cumulative code amount R is compared with a target code amount Rmax (step S3107). If $R \leq Rmax$ (Yes), the value of ti is incremented by one (step S3108), and the flow shifts to step S3104 to continue the above code amount accumulation. If $R \geq Rmax$ (No), the processing is terminated, and ti at the end of the processing is set as a code block number threshold.

As described above, the JPEG2000 code sequence obtained by the image coding apparatus according to this embodiment includes code sequences up to the section K(n−1) in all the code blocks and code sequences corresponding to the section K(n) in order of code blocks up to the target code amount. The image coding processing described in this embodiment is slightly lower in efficiency than the image coding processing in the seventh embodiment in terms of rate/distortion optimization, but needs code amount estimation for only a threshold as each section boundary. This embodiment can therefore improve the rate/distortion characteristics more easily.

Sixth Embodiment

The image coding apparatus according to the fourth embodiment described above is designed to simplify rate/distortion optimization processing by segmenting the section between the maximum and minimum values of rate/distortion gradient into N sections, and searching for a threshold inside a section (boundary section) including a target code amount. In threshold search processing inside a boundary section, a search for a threshold corresponding to a target code amount must be made while a threshold is changed little by little. In contrast to this, the sixth embodiment will exemplify a case wherein a threshold search is made more efficiently by estimating a threshold λ from the information of each section.

The image coding apparatus according to this embodiment differs from the image coding apparatus shown in the block diagram of FIG. 21 used to describe the fourth embodiment only in the processing performed by code sequence forming unit 2102, and the remaining arrangement is the same as that of the fourth embodiment. The processing performed by a code sequence forming unit 2102 of the image coding apparatus according to the sixth embodiment will be described below. Note that image coding data to be coded by the image coding apparatus according to this embodiment is 512×512 monochrome image data with each pixel consisting of eight bits as in the case of the prior art and seventh and eighth embodiments. In addition, coding conditions such as execution/non-execution of tiling, the size of a code block, and selection of a wavelet transform filter are the same as those in the prior art and seventh and eighth embodiments.

When a code block coding unit 204 completes coding all the code blocks and section segmentation and a section segmenting unit 2101 completes section information creation processing, the code sequence forming unit 2102 searches for a maximum value λ with which total code amount R=Rmax or R≈Rmax by referring to the information of each section which is stored in the section segmenting unit 2101 and the code truncation point information of each code block which is stored in a code block information storage unit 207, forms a JPEG2000 code sequence by collecting codes of a portion satisfying Si(k)>λ from a code sequence storage unit 206, and outputs the code sequence to a code output unit 208.

Figure 32:
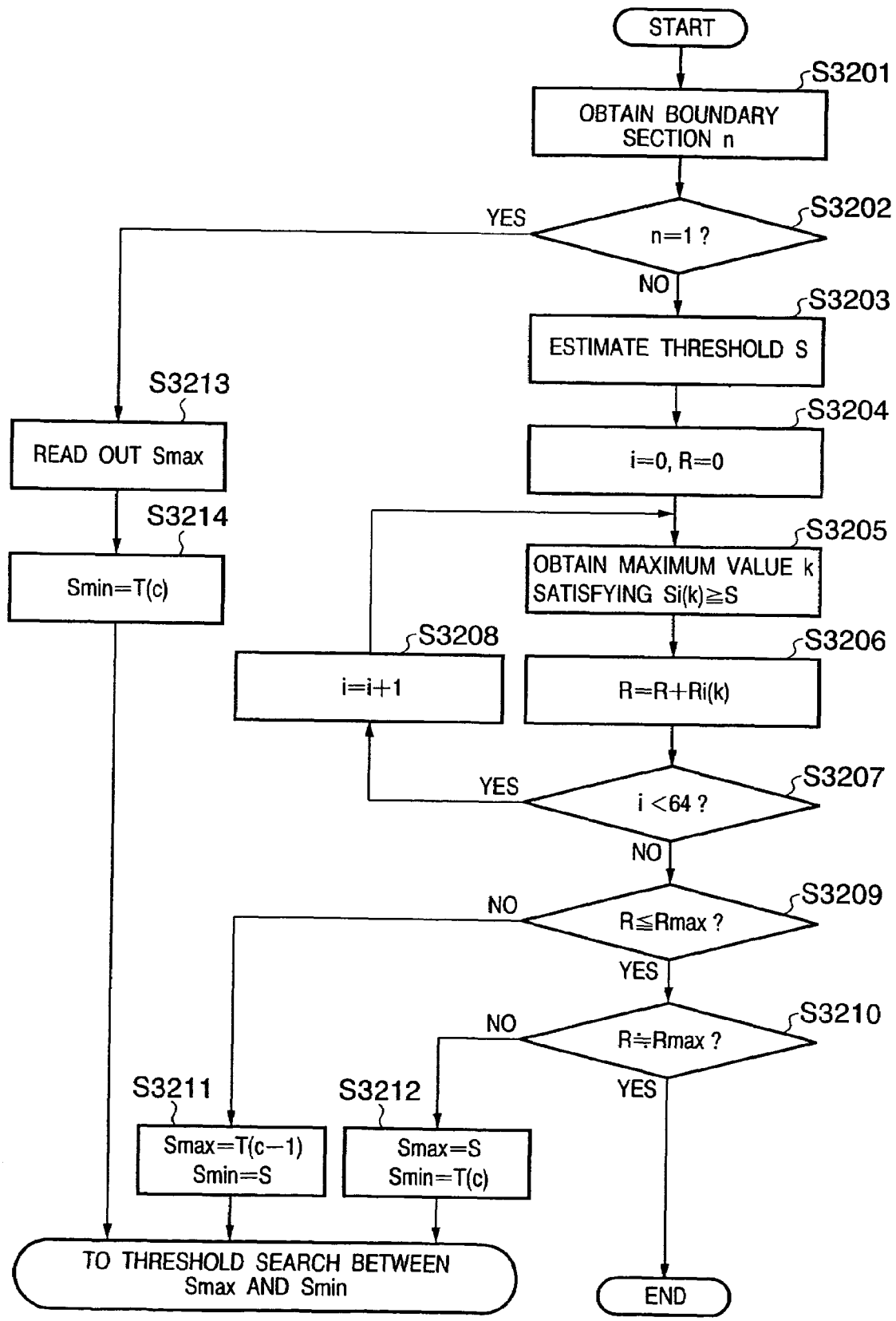
FIG. 32 is a flowchart for explaining the flow of threshold determination processing in a code sequence forming unit 2102 of an image coding apparatus according to the sixth embodiment.

FIG. 32 is a flowchart for explaining the flow of threshold determination processing in the code sequence forming unit 2102 of the image coding apparatus according to the sixth embodiment. First of all, a boundary section number n is obtained (step S3201). More specifically, cumulative code amounts RK(n) are sequentially added from a section K(1) to a section K(N) to obtain a minimum value n which satisfies ΣRK(n)>Rmax.

It is then checked whether the value of n is 1 (step S3202). If n=1 (Yes), the flow shifts to step S3213. Otherwise (No), the flow advances to step S3203. In step S3213, a maximum value Smax of the rate/distortion gradients obtained by the processing by the section segmenting unit 2101 is read out. Subsequently, a minimum value Smin is set to T(n) (step S3214), and the flow shifts to the processing of searching for a threshold between Smax and Smin, which will be described later.

Figure 33:
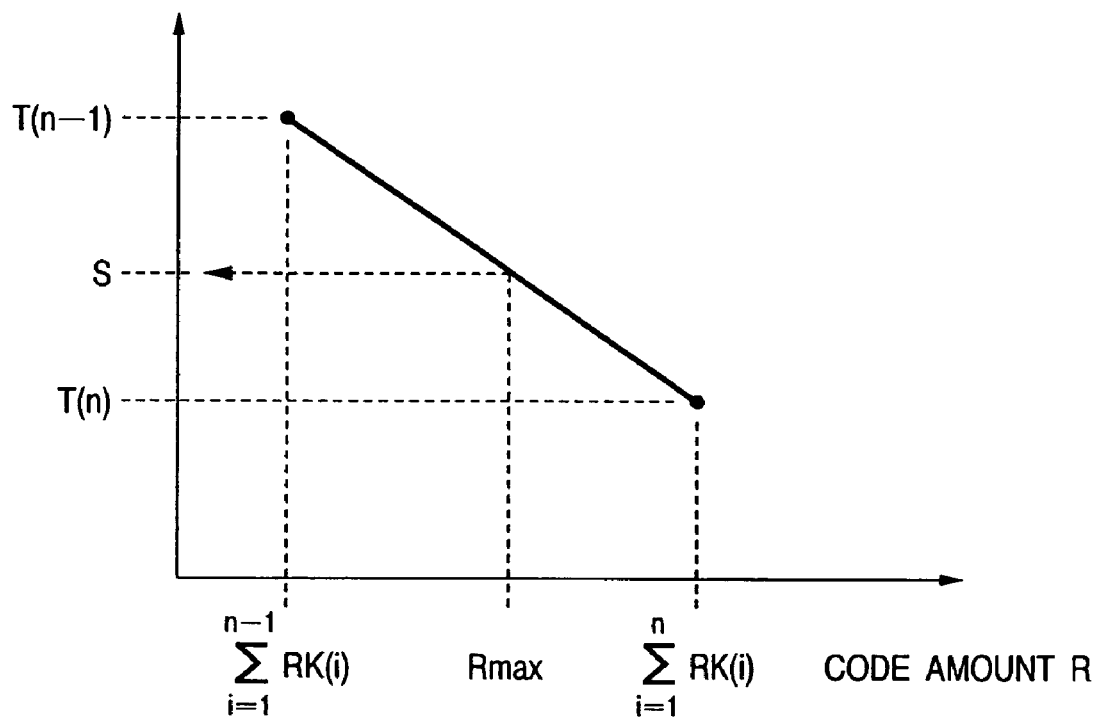
FIG. 33 is a graph for explaining how a threshold S corresponding to Rmax is estimated from the information of a boundary section K(n) and section K(n−1)

If it is determined in step S3202 that the boundary section n is not 1 (No), a rate/distortion gradient threshold S corresponding to a target code amount Rmax is calculated (estimated) in consideration of a line segment connecting the cumulative code amount up to the section K(n−1) immediately preceding the boundary section K(n) (i.e., this section is one step higher in order than the boundary section), a rate/distortion gradient threshold T(n−1), the cumulative code amount up to the boundary section K(n), and rate/distortion gradient threshold T(n), as shown in FIG. 33 (step S3203). In this case, FIG. 33 is a graph for explaining how the threshold S corresponding to Rmax is estimated from the information of the boundary section K(n) and section K(n−1). The threshold S is calculated by $$S = \frac{T(n) - T(n-1)}{\sum_{i=1}^{n} RK(i) - \sum_{i=1}^{n-1} RK(i)} \left( R\max - \sum_{i=1}^{n-1} RK(i) \right) + T(n-1)$$

$$= \frac{T(n) - T(n-1)}{RK(n)} \left( R\max - \sum_{i=1}^{n-1} RK(i) \right) + T(n-1)$$

In step S3204, a variable i representing a code block number is set to 0, and a cumulative code amount R is set to 0. A maximum value k satisfying Si(k)≧S is obtained with respect to the code block i of interest (step S3205). Ri(k) is then added to the cumulative code amount R (step S3206). The code block number i is compared with 64 (step S3207). If i<64 (Yes), i is incremented by one (step S3208), and the flow returns to step S3205. If it is determined that i is not larger than 64 (No), the flow shifts to step S3209.

In step S3209, the cumulative code amount R is compared with Rmax. If R≦Rmax (Yes), the flow advances to step S3210. If R>Rmax (No), the flow branches to step S3211.

If R>Rmax, a maximum value Smax of gradient is set to T(n−1), and a minimum value Smin is set to S (step S3211). The flow then shifts to the processing of searching for a threshold between Smax and Smin, which will be described later.

If R≦Rmax, it is checked whether R is sufficiently near to Rmax (R≈Rmax) (step S3210). If R is sufficiently near Rmax (Yes), the processing is terminated. Otherwise (No), Smax is set to S, and Smin is set to T(n). The flow then shifts to the processing of searching for a threshold between Smax and Smin (step S3212).

Note that the processing of searching for threshold between Smax and Smin is equivalent to threshold search processing in the code sequence forming unit 205 described in the prior art (FIG. 14) from which the first search processing for Smax and Smin (step S1401) is omitted.

As described above, a threshold search within a boundary section can be performed more efficiently by segmenting the section between the maximum and minimum values of rate/distortion gradient into N sections and estimating a threshold corresponding to a target code amount from the information of cumulative code amounts corresponding to sections around a section (boundary section) including the target code amount and thresholds.

Seventh Embodiment

Figure 36:
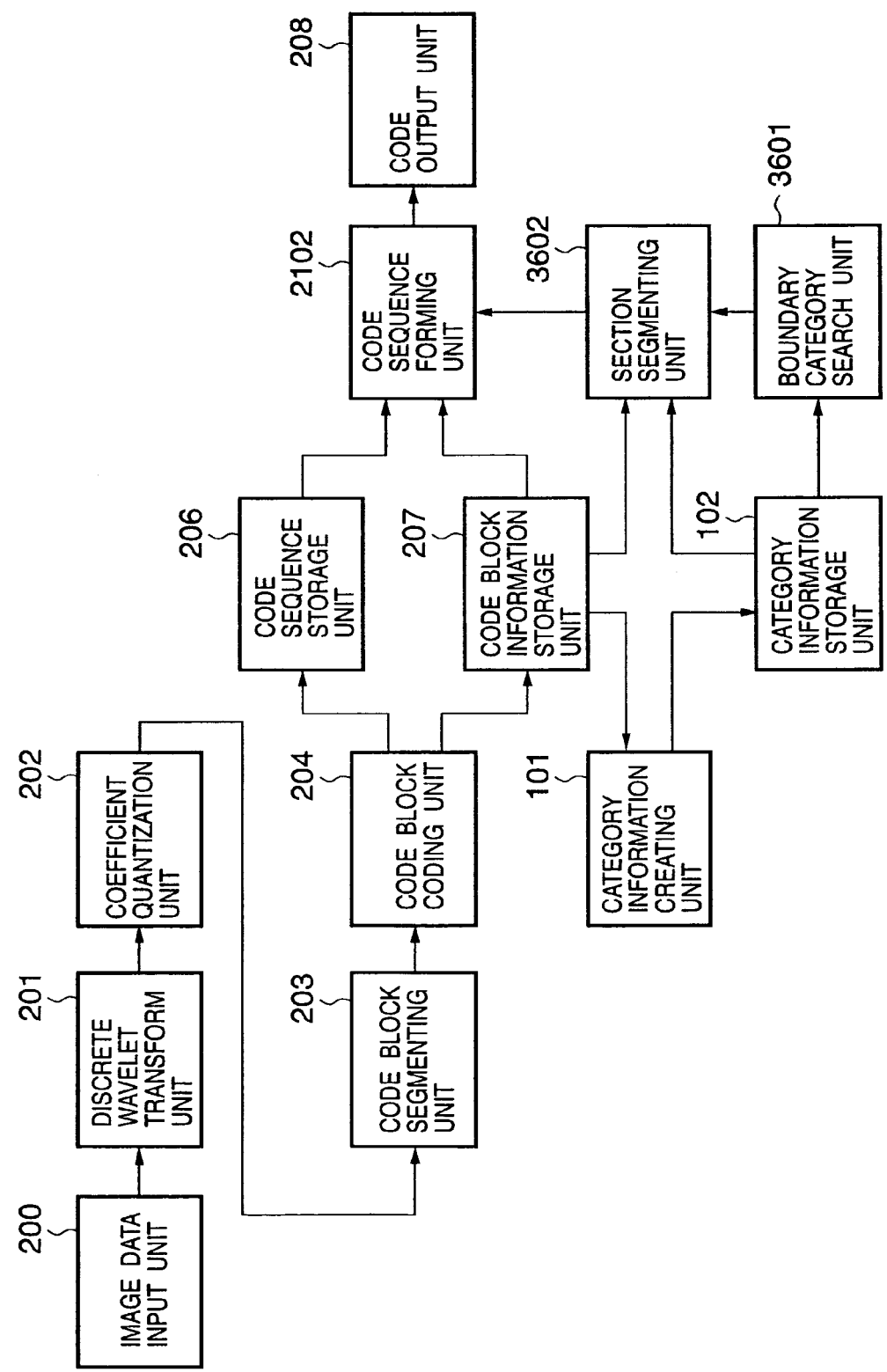
FIG. 36 is a block diagram showing the arrangement of an image coding apparatus according to the seventh embodiment of the present invention.

FIG. 36 is a block diagram showing the arrangement of an image coding apparatus according to the seventh embodiment of the present invention. The same reference numerals as in FIG. 36 denote the same blocks common to the prior art and first to sixth embodiments, and a description thereof will be omitted. The operation of the image coding apparatus according to this embodiment will be described below. Note that image coding data to be coded by the image coding apparatus according to this embodiment is 512×512 monochrome image data with each pixel consisting of eight bits as in the prior art and first to sixth embodiments described above. In addition, coding conditions such as execution/non-execution of tiling, the size of a code block, and selection of a wavelet transform filter are the same as those in the prior art and first to sixth embodiments.

When a code block coding unit 204 completes coding all the code blocks and a category information creating unit 101 completes category information update processing for the final code block, a boundary category search unit 3601 obtains a boundary category C(c) including a target code amount R by referring to the information of each category which is stored in a category information storage unit 102, and outputs the boundary category number to a section segmenting unit 3602.

The section segmenting unit 3602 reads out thresholds T(c−1) and T(c) for the boundary category C(c) from the category information storage unit 102, segments the section between the thresholds into N sections, obtains a code amount at each section segmentation point, forms a table like the one shown in FIG. 20, and stores it in an internal buffer (not shown). Referring to FIG. 20, the N sections are sequentially assigned numbers from 1 in order of decreasing rate/distortion gradient and expressed in the form of K(n) like K(1), K(2), ..., K(N). In addition, a rate/distortion gradient threshold corresponding to a boundary between a section K(n) and a section K(n+1) is represented by T(n), and a cumulative code amount included in the section K(n) is represented by RK(n).

The flow of section segmentation and section information creation processing in the section segmenting unit 3602 is the same as the processing in the section segmenting unit 2101 of the image coding apparatus according to the seventh embodiment described above except for step S1901. The section segmenting unit 2101 described above searches for a maximum value Smax and minimum value Smin of rate/distortion gradient from the code truncation candidate points of all the code blocks in step S1901. In contrast to this, a section segmenting unit 2802 reads out T(c−1) and T(c) from the category information storage unit 102 on the basis of the boundary category number c designated by the boundary category search unit 3601, and performs subsequent processing upon setting T(c−1) as Smax and T(c) as Smin. If, however, c=1, the section segmenting unit 2802 searches for a maximum value from the code truncation points of all the code blocks and sets it as Smin.

As described above, in this embodiment, rate/distortion gradient category segmentation is performed, and a category (boundary category) including a target code amount is obtained. In addition, the interval of the boundary category is segmented into N sections to obtain a boundary section, and a threshold corresponding to the target code amount within the boundary section is estimated. This makes it possible to search for a threshold within the boundary category more efficiently.

Eighth Embodiment

The present invention is not limited to the embodiments described above. For example, the first to seventh embodiments have exemplified the formation of a code sequence on one layer under the following conditions: no tiling, two times of discrete wavelet transform, use of a 9×7 lossy filter (9-7 irreversible filter), and a code block size of 64×64. However, the present invention can be applied to a case wherein the conditions for JPEG2000 coding are changed. For example, when layers are formed by using a plurality of bit rates, the present invention can be applied by setting the target code amount Rmax for each layer. Obviously, in addition, the filter for discrete wavelet transform, the number of times of application, and the like can be changed.

The present invention can be suitably practiced by using JPEG2000, but can also be applied to another coding scheme of segmenting coding data into small sections and obtaining a code amount and distortion index value for each section.

In the above embodiments, blocks are defined in accordance with purposes, like the code block information storage unit and code sequence storage unit. However, a single storage unit (storage area) may be prepared to be selectively used.

In addition, in the above embodiments, blocks are defined in accordance with purposes, like the code block information storage unit, category information storage unit, and code sequence storage unit. However, a single storage unit (storage area) may be prepared to be selectively used.

In the above embodiments, 512×512 monochrome data witch each pixel consisting of eight bits has been described as a coding target image. However, the present invention may be applied to other kinds of image data, e.g., an image having a different size and bit depth and a color image with each pixel expressed by a plurality of color components. Furthermore, the present invention may be applied to each frame, field, or the like of a moving image.

Ninth Embodiment

In the ninth embodiment, high-speed moving image coding processing using a category segmentation method will be described.

[Category Segmentation Metho]

The arrangement of an image coding apparatus according to this embodiment is the same as that of the image coding apparatus shown in the block diagram of FIG. 1 described in the first embodiment, and hence a description of the same functions will be omitted.

The operation sequence of the image coding apparatus according to the ninth embodiment will be described below with reference to FIG. 1.

Referring to FIG. 1, a coding target image is input from an image data input unit 200 as in the image coding apparatus according to the first embodiment, and is segmented into code blocks to be coded on a code block basis by processing up to a code block coding unit 204 in the same manner as in JPEG2000 coding by the general image coding apparatus described above.

When coding of one code block Bi is performed by the code block coding unit 204 and monotonous reduction processing of a rate/distortion gradient is performed, a category information creating unit 101 updates the total code amount for each category held in a category information storage unit 102 by referring to the truncation candidate point information of the code block Bi which is stored in a code block information storage unit 207. Note that the flow of code amount update processing for each category in the category information creating unit 101 is the same as that shown in the flowchart of FIG. 13.

When the code block coding unit 204 completes coding all the code blocks and the category information creating unit 101 completes category information update processing for the last code block, a code sequence forming unit 103 selects a category C(x) having a target code amount (target rate), and searches for a threshold between Smax and Smin with an upper limit value T(x−1) and lower limit value T(x) of the category being respectively set as Smax and Smin.

FIG. 17 is a flowchart for explaining the flow of threshold determination processing executed by the code sequence forming unit 103 of the image coding apparatus. As shown in FIG. 17, a category c having a target code amount is selected (step S1701). It is then checked whether the category c is 1 (step S1702). If the category c is 1 (Yes), Smax is searched out (step S1713), and Smin is set to T(c) (step S1714). A search is then made for a threshold between set Smax and Smin.

If it is determined in step S1702 that c≠1 (No), a threshold S is estimated (step S1703). FIG. 18 is a graph showing how the threshold S corresponding Rmax is estimated from the information of the boundary category c and a category c−1. With i=0 and R=0 (step S1704), a maximum value k satisfying $Si(k) \geq S$ is obtained (step S1705). Subsequently, with R=R+Ri(k) (step S1706), it is checked whether i<64 (step S1707). If i<64 (Yes), i is incremented (step S1708), and the processing in step S1705 and the subsequent steps is executed again.

If it is determined in step S1707 that i≧64 (No), it is checked whether R≧Rmax (step S1709). If R>Rmax (No), Smax=T(c−1) and Smin=S are set (step S1711), and a search is made for a threshold between the set values Smax and Smin. If R≦Rmax (Yes), it is further checked whether R≈Rmax (step S1710). If R is not approximately equal to Rmax (No), Smax=S and Smin=T(c) are set (step S1712), and a search is made for a threshold between the set values Smax and Smin. If R≈Rmax (Yes), this processing is terminated. With the above sequence, the category segmentation method can reduce the processing amount for rate/distortion optimization.

[Moving Image Coding Using Category Segmentation Method]

An increase in processing speed which is achieved when the category segmentation method is used for coding of moving images will be described next.

According to the category segmentation method, as a category is segmented finely, the category information to be created increases, but the processing amount for a threshold search decreases. In contrast, as a category is segmented coarsely, the category information to be created decreases, but the processing amount for a threshold search increases. Therefore, when the category segmentation method is used for rate/distortion optimization processing, it can be thought that even if the category size and segmentation count change, the processing amount does not change as a whole.

If, however, a gradient $\lambda$ corresponding to the target rate Rmax can be estimated, the processing of creating category information and threshold search processing can be reduced by performing fine category segmentation for S around $\lambda$.

In general, it is thought that similar images appear in frames of a moving image having few scene changes, and hence such frames are similar in the relationship between S and R. That is, it is thought that in frames having few scene changes, $\lambda$ takes similar values. In this embodiment, therefore, when a given frame of a moving image is subjected to rate/distortion optimization by the category segmentation method, $\lambda$ in the preceding frame is used as the predictive value of $\lambda$ for the frame of interest on the basis of the above relationship associated with $\lambda$, thereby reducing the processing.

Figure 22:
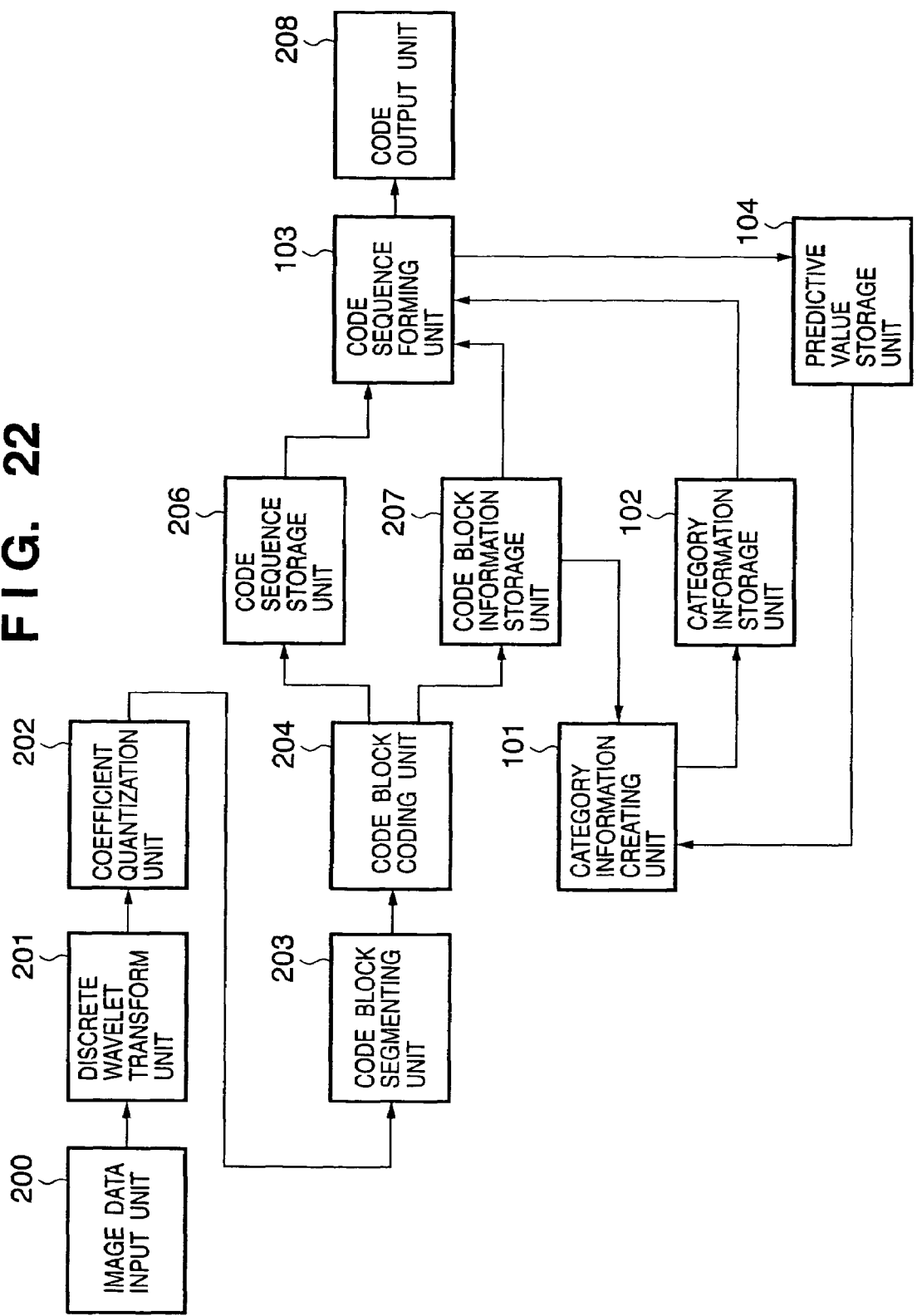
FIG. 22 is a block diagram showing the arrangement of an image coding apparatus according to the ninth embodiment of the present invention.

FIG. 22 is a block diagram showing the arrangement of the image coding apparatus according to the ninth embodiment of the present invention. As shown in FIG. 22, the image coding apparatus according to the ninth embodiment includes the image data input unit 200, a discrete wavelet transform unit 201, a coefficient quantization unit 202, a code block segmenting unit 203, the code block coding unit 204, the code sequence forming unit 103, the code block information storage unit 207, a code sequence storage unit 206, the category information creating unit 101, the category information storage unit 102, and a predictive value storage unit 104. The same reference numerals as in FIG. 22 denote the constituent elements common to the general image coding apparatus shown in FIG. 1, and a description thereof will be omitted.

The operation sequence of the image coding apparatus according to this embodiment will be described below with reference to FIG. 22.

In the image coding apparatus according to the ninth embodiment, frames constituting a moving image are input to the image data input unit 200. Note that each input frame is 512×512 monochrome image data with each pixel consisting of eight bits as in the case of the above image coding apparatus. In addition, coding conditions such as execution/non-execution of tiling, the size of a code block, and selection of a wavelet transform filter are the same as described above.

Figure 23:
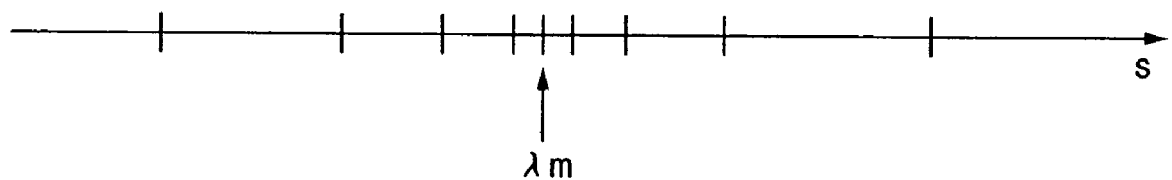
FIG. 23 is a conceptual view of category segmentation in the ninth embodiment.

In the image coding apparatus according to this embodiment, first of all, the rate/distortion gradient of a frame of interest is classified into m categories, as described above. In the image coding apparatus according to this embodiment, the threshold $\lambda$ associated with the frame preceding the frame of interest is stored in the predictive value storage unit 104. The category information creating unit 101 acquires the threshold $\lambda$ for the preceding frame as a predictive value $\lambda'$ for the frame of interest from the predictive value storage unit 104. A category including the acquired predictive value $\lambda'$ is further segmented. FIG. 23 is a conceptual view showing category segmentation in the ninth embodiment. For example, the category including the predictive value $\lambda'$ for the frame of interest is classified into n categories.

A code amount is then calculated for each of the n categories in the category including the predictive value $\lambda'$ in accordance with the sequence shown in FIG. 13. At this time, no code amount is calculated for any category of the m categories in which the predictive value $\lambda'$ is not included. This makes it possible to reduce the processing amount as compared with a case wherein rate/distortion optimization processing is performed for all the categories. The code sequence forming unit 103 then selects the category Cn(x) having the target code amount (target rate). A code sequence is formed by using the threshold $\lambda$.

The upper limit value Tn(x−1) and lower limit value Tn(x) of the category are set as Smax and Smin, respectively, and a search is made for a threshold between Smax and Smin in accordance with the sequence shown in FIG. 14. As a consequence, S at the end of the processing is selected as the threshold $\lambda$. In this embodiment, the obtained threshold $\lambda$ is stored in the predictive value storage unit 104 and is read out when the next frame is to be coded.

When, for example, the above processing is to be performed by using a plurality of frames, e.g., the first and second preceding frames, the processing can be realized in the same manner by setting n segmented categories as categories including predictive values $\lambda1$ and $\lambda2$ for the respective frames. If the category Cn(x) having a target code amount (target rate) cannot be selected, a category in which the predictive value $\lambda'$ is not included may be segmented into smaller categories, and processing similar to that based on the above sequence may be performed.

As described above, the image coding apparatus according to this embodiment differs from the conventional image coding apparatus in that processing is performed upon further segmenting only a category including the threshold $\lambda'$ for the preceding frame into small categories, and in that the code sequence forming unit 103 stores the threshold $\lambda$ in the predictive value storage unit 104. As described above, in the ninth embodiment, when rate/distortion optimization processing using the category segmentation method is performed for a frame of interest in a moving image, $\lambda$ for the preceding frame is used as the predictive value of $\lambda$ for the frame of interest, and a value near the predictive value is segmented into small categories, thereby reducing the processing.

10th Embodiment

In the 10th embodiment, high-speed moving image coding processing using an N segmentation method will be described.

[N Segmentation Method]

The N segmentation method will be described first. FIG. 21 is a block diagram showing the arrangement of a general image coding apparatus which executes the N segmentation method. As shown in FIG. 21, the image coding apparatus includes an image data input unit 200, discrete wavelet transform unit 201, coefficient quantization unit 202, code block segmenting unit 203, code block coding unit 204, code sequence forming unit 2102, code block information storage unit 207, code sequence storage unit 206, and section segmenting unit 2101.

The operation sequence of the general image coding apparatus using the N segmentation method will be described below with reference to FIG. 21. Note that image coding data to be coded by the image coding apparatus shown in FIG. 21 is 512×512 monochrome image data with each pixel consisting of eight bits as in the case of the above image coding apparatus shown in FIG. 2 which is designed to perform general JPEG2000 coding. In addition, coding conditions such as execution/non-execution of tiling, the size of a code block, and selection of a wavelet transform filter are the same as those in the case of the image coding apparatus shown in FIG. 2.

Referring to FIG. 21, a coding target image is input from the image data input unit 200. This image is then segmented into code blocks and coded on a code block basis by the processing from the image data input unit 200 to the code block coding unit 204 in the same manner as in the prior art. When the code block coding unit 204 codes all the code blocks, the section segmenting unit 2101 obtains the maximum and minimum values of rate/distortion gradient by referring to the truncation candidate point information of a code block Bi which is stored in the code block information storage unit 207, and segments the section into N sections.

A threshold and code amount at each section segmentation point are obtained to form a table like the one shown in FIG. 20, and the table is stored in an internal buffer (not shown). FIG. 20 is a view showing the section information held in the section segmenting unit 2101. As shown in FIG. 20, the N sections are sequentially assigned numbers from 1 in order of decreasing rate/distortion gradient and expressed in the form of K(n) like K(1), K(2), . . . , K(N). In addition, a rate/distortion gradient threshold corresponding to a boundary between a section K(n) and a section K(n+1) is represented by T(n), and a cumulative code amount included in the section K(n) is represented by RK(n).

FIG. 19 is a flowchart for explaining the flow of section segmentation and section information creation processing in the section segmenting unit 2101. The flow of processing by the section segmenting unit 2101 will be described below with reference to FIG. 19.

Figure 25:
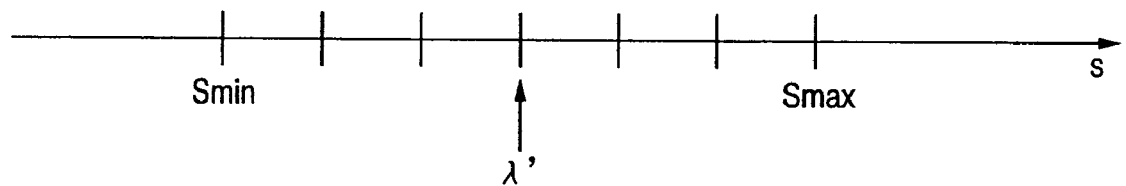
FIG. 25 is a view for explaining an outline of section segmentation in an N segmentation method.

When the code block coding unit 204 completes coding all the code blocks, the section segmenting unit 2101 obtains a maximum value Smax and minimum value Smin of rate/distortion gradient by referring to the truncation candidate point information of all the code blocks which is stored in the code block information storage unit 207 (step S1901). The section between Smax and Smin is then segmented into N sections, and a threshold T(n) for each section is set (step S1902). In this case, as shown in FIG. 25, the section between Smax and Smin is equally segmented into sections. FIG. 25 is a view for explaining an outline of section segmentation in the N segmentation method. The threshold T(n) is obtained by $$T(n) = S\max - \left(\frac{S\max - S\min}{N}\right) \times n$$

When the threshold T(n) for a section is set, the flow shifts to the processing of obtaining a code amount K(n) in the section from each code block.

A variable i representing a code block number is initialized to 0 (step S1903). It is then determined to which section the code block Bi of interest belongs for each code truncation point, and the code amount RK(n) in the section to which the block belongs is updated (step S1904). The detailed processing in step S1904 will be described later. The variable i is incremented by one (step S1905), and i is compared with 64 (step S1906). If i=64 (Yes), the processing is terminated. If i≠(No), the flow returns to step S1904 to continue the processing.

Figure 27:
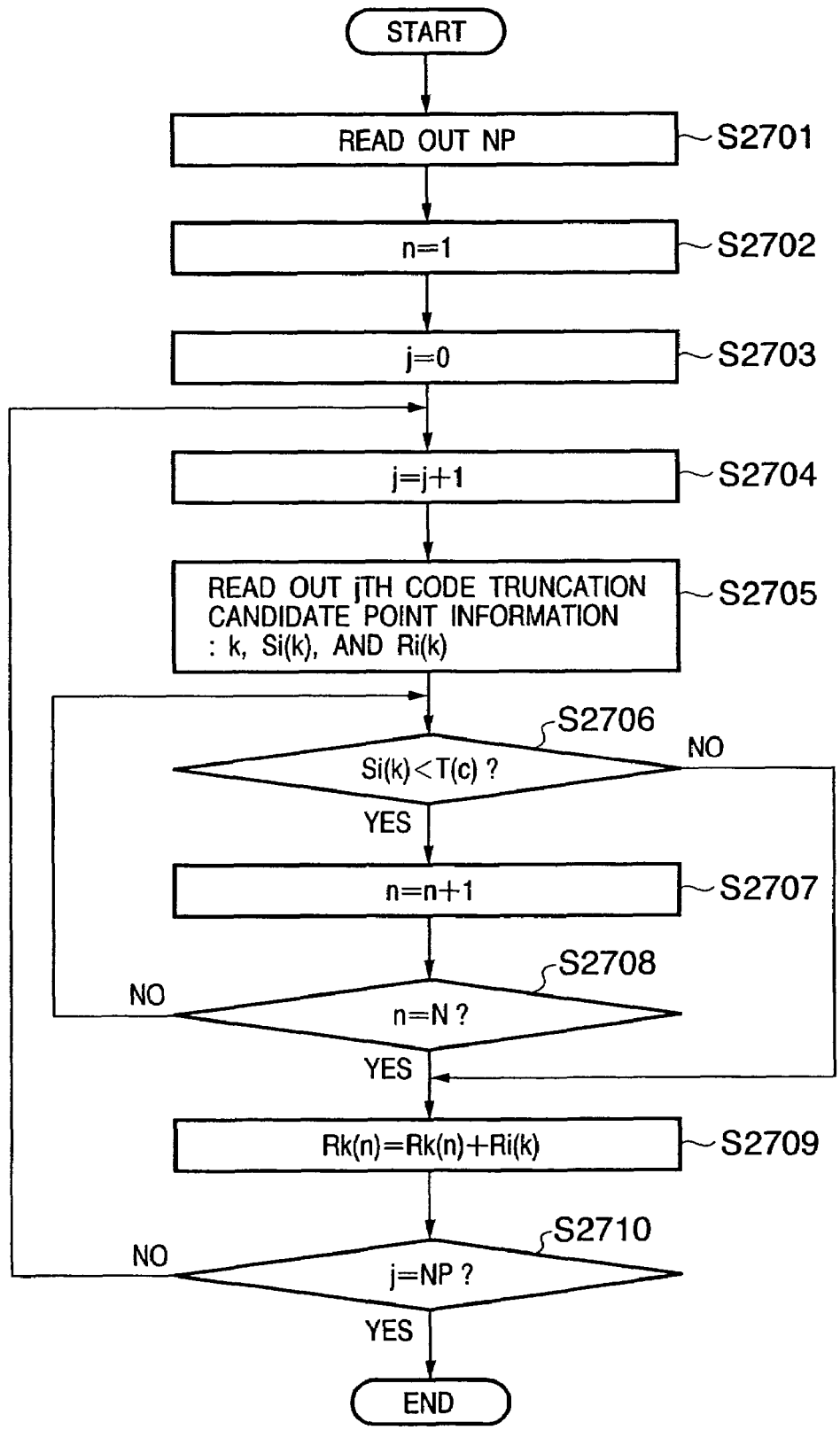
FIG. 27 is a flowchart for explaining the flow of code amount update processing for each section segmented by the N segmentation method.

The processing in step S1904 will be described in detail below. FIG. 27 is a flowchart for explaining the flow of code amount update processing for sections segmented by the N segmentation method. First of all, an element count NP of a set Ni of truncation candidate points is read out from the information of the code block Bi stored in the format shown in FIG. 9 described above in the code block information storage unit 207 (step S2701). A variable n representing a section number is set to 1 (step S2702), and a variable j representing a truncation candidate point number is set to 0 (step S2703). The variable j is then incremented by one (step S2704).

The information of the jth truncation candidate point is read out from the code block information storage unit 207 (step S2705). In this case, the information of the truncation candidate point includes a truncation coding pass number k, rate/distortion gradient Si(k), and code amount Ri(k). Thereafter, the rate/distortion gradient Si(k) is compared with the threshold T(n) for the section K(n) (step S2706). If Si(k)≧T(n) (No), it is determined that the coding pass of interest is included in the section K(n), and the flow shifts to step S2709. If Si(k)<T(n) (Yes), the variable n representing a section number is incremented by one, and the comparison target is changed to the next section (step S2707).

The variable n is then compared with a section count N (step S2708). If n=N (Yes), it is determined that the coding pass of interest belongs to the section K(n), and the flow shifts to step S2709. If n≠N (No), the flow shifts to step S2706 (step S2708). In step S2709, the cumulative code amount RK(n) in the section is updated by adding a code amount Ri(k) of the pass of interest thereto. Thereafter, the variable j representing a truncation candidate point number is compared with NP (step S2710). If j≠NP (No), the flow returns to step S2704 to perform the processing in steps S2705 to S2709 with respect to the next candidate point in the same manner as described above. If j=NP (Yes), the processing for the code block Bi of interest is terminated.

With the above processing, a table in the format shown in FIG. 20 can be formed in a buffer (not shown) in the section segmenting unit 2101.

When the code block coding unit 204 completes coding all the code blocks and section segmentation and the section segmenting unit 2101 completes section information creation processing, the code sequence forming unit 2102 searches for a maximum value n satisfying RK(n)≧Rmax, and makes a search for a threshold between Smax and Smin with T(n−1) and T(n−1) being set as Smax and Smin, respectively. In this manner, in the N segmentation method, the processing amount for rate/distortion optimization processing can be reduced.

[Moving Image Coding Using N Segmentation Method]

An increase in processing speed which is achieved when the N segmentation method is used for coding of moving images will be described next.

According to the N segmentation method, as the section between Smin and Smax is segmented finely, the section information to be created increases, but the processing amount for a threshold search decreases. In contrast, as the section between Smin and Smax is segmented coarsely, the section information to be created decreases, but the processing amount for a threshold search increases. Therefore, when the N segmentation method is used for rate/distortion optimization processing, it can be thought that even if the section size and segmentation count change, the processing amount does not change as a whole.

If, however, a rate/distortion gradient λ corresponding to the target rate Rmax can be estimated, the processing of creating section information and threshold search processing can be performed with high precision and a small processing amount by finely segmenting only S around λ.

In general, it is thought that similar images appear in frames of a moving image having few scene changes, and hence such frames are similar in the relationship between S and R. That is, it is thought that in frames having few scene changes, λ takes similar values. In this embodiment, therefore, when a given frame of a moving image is subjected to rate/distortion optimization by the N segmentation method, λ in the preceding frame is used as the predictive value of λ for the frame of interest on the basis of the above relationship associated with λ, thereby reducing the processing.

Figure 24:
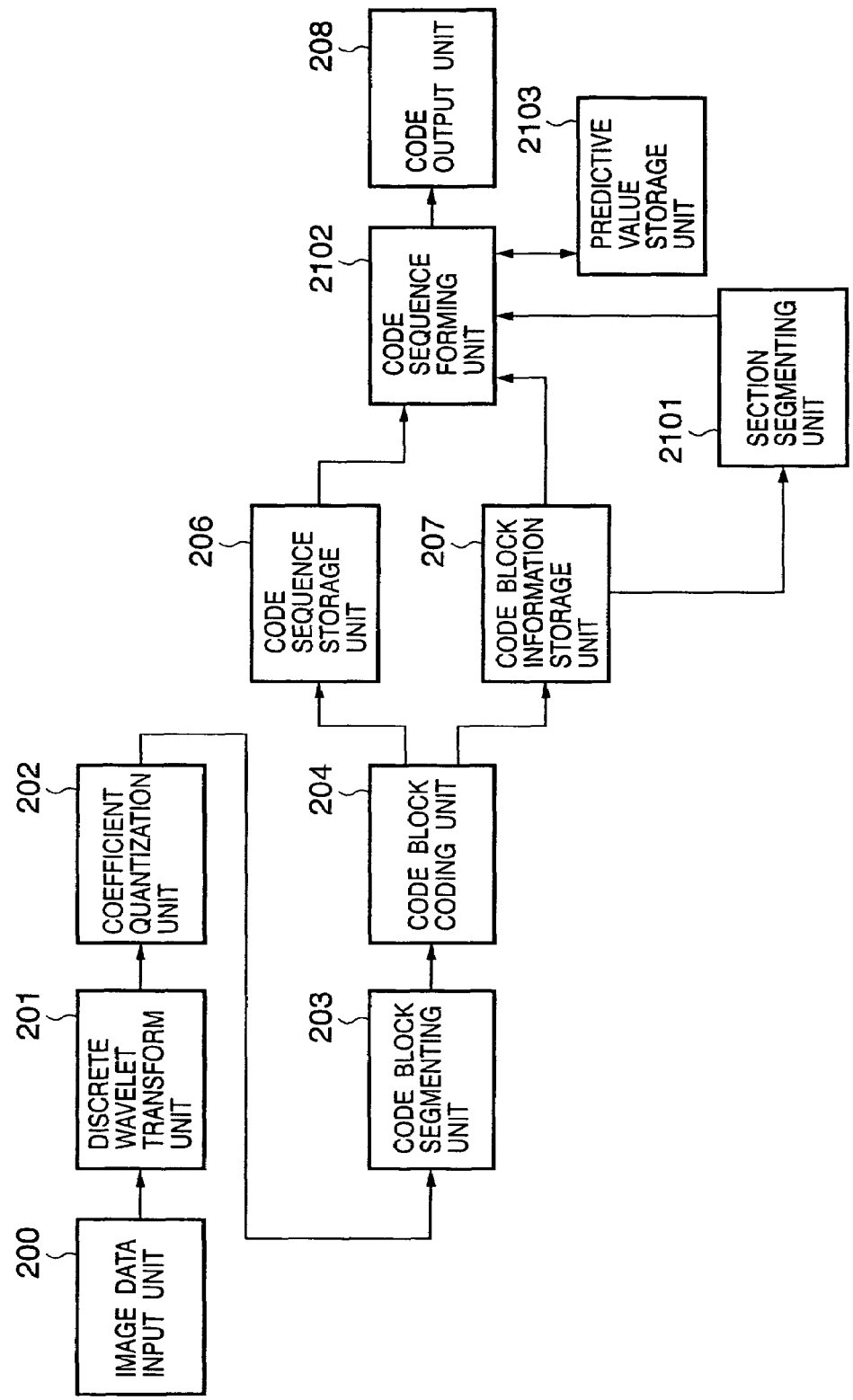
FIG. 24 is a block diagram showing the arrangement of an image coding apparatus according to the 10th embodiment of the present invention.

FIG. 24 is a block diagram showing the arrangement of the image coding apparatus according to the 10th embodiment of the present invention. As shown in FIG. 24, the image coding apparatus according to the 10th embodiment includes an image data input unit 200, discrete wavelet transform unit 201, coefficient quantization unit 202, code block segmenting unit 203, code block coding unit 204, code sequence forming unit 2102, code block information storage unit 207, code sequence storage unit 206, section segmenting unit 2101, and predictive value storage unit 2103. The same reference numerals as in FIG. 24 denote constituent elements common to the general image coding apparatus shown in FIG. 21, and a description thereof will be omitted.

The operation sequence of the image coding apparatus according to this embodiment will be described below with reference to FIG. 24.

In the image coding apparatus according to the 10th embodiment, frames constituting a moving image are input to the image data input unit 200. Note that each input frame is 512×512 monochrome image data with each pixel consisting of eight bits as in the case of the above general image coding apparatus. In addition, coding conditions such as execution/non-execution of tiling, the size of a code block, and selection of a wavelet transform filter are the same as described above.

In the image coding apparatus according to this embodiment, first of all, the maximum value Smax and minimum value Smin of rate/distortion gradient of a frame of interest are obtained by referring to the information stored in the code block information storage unit 207, and the section between the maximum and minimum values is segmented into a plurality of sections. In this case, in the image coding apparatus according to this embodiment, the threshold λ associated with the frame preceding the frame of interest is stored in the predictive value storage unit 2103. The code sequence forming unit 2102 acquires the threshold λ for the preceding frame as a predictive value λ' for the frame of interest from the predictive value storage unit 2103. A section including the acquired predictive value λ' is further segmented. For example, the section including the predictive value λ' for the frame of interest is classified into N small sections.

A code amount is then calculated for each of the N small sections of the section including the predictive value λ' in accordance with the sequence shown in FIG. 27. At this time, no code amount is calculated for any section in which the predictive value λ' is not included. This makes it possible to reduce the processing amount as compared with a case wherein rate/distortion optimization processing is performed for all the sections. The code sequence forming unit 2102 then selects the section having the target code amount (target rate).

The upper limit and lower limit value of the section are set as Smax and Smin, respectively, and a search is made for a threshold between Smax and Smin in accordance with the sequence shown in FIG. 14. As a consequence, S at the end of the processing is selected as the threshold λ. In this embodiment, the obtained threshold λ is stored in the predictive value storage unit 104 and is read out when the next frame is to be coded.

When, for example, the above processing is to be performed by using a plurality of frames, e.g., the first and second preceding frames, the processing can be realized in the same manner by segmenting sections including predictive values λ1 and λ2 into small sections. If the section having a target code amount (target rate) cannot be selected, a section in which the predictive value λ' is not included may be segmented into smaller sections, and processing similar to that based on the above sequence may be performed.

As described above, the image coding apparatus according to this embodiment differs from the conventional image coding apparatus in that processing is performed upon further segmenting only a section including the threshold λ' for the preceding frame into small sections, and in that the code sequence forming unit 2102 stores the obtained threshold λ in the predictive value storage unit 104. As described above, in the 10th embodiment, when rate/distortion optimization processing using the N segmentation method is performed for a frame of interest in a moving image, λ for the preceding frame is used as the predictive value of λ for the frame of interest, and a value near the predictive value is segmented into small N sections, thereby reducing the processing.

11th Embodiment

In the 11th embodiment, high-speed moving image coding processing using a function interpolation approximation method will be described.

[Function Interpolation Approximation Method]

The function interpolation approximation method will be described first. The function interpolation approximation method includes the following processes: (1) obtaining S (S1, S2, S3) corresponding to predetermined R (R1, R2, R3; R1<R2<R3), (2) assuming a graph of SR (slope to rate), (3) obtaining Sdummy corresponding to a rate Rmax to be obtained, (4) calculating a code amount Rdummy obtained from Sdummy, and (5) terminating the processing if the difference between Rdummy and Rmax is larger than a predetermined value e, setting Rdummy to R2 if the difference between Rdummy and Rmax is smaller than the predetermined value e, and repeating the above processes from (1) upon setting values near R2 to R1 and R2. The function interpolation approximation method will be described in detail below.

Figure 15:
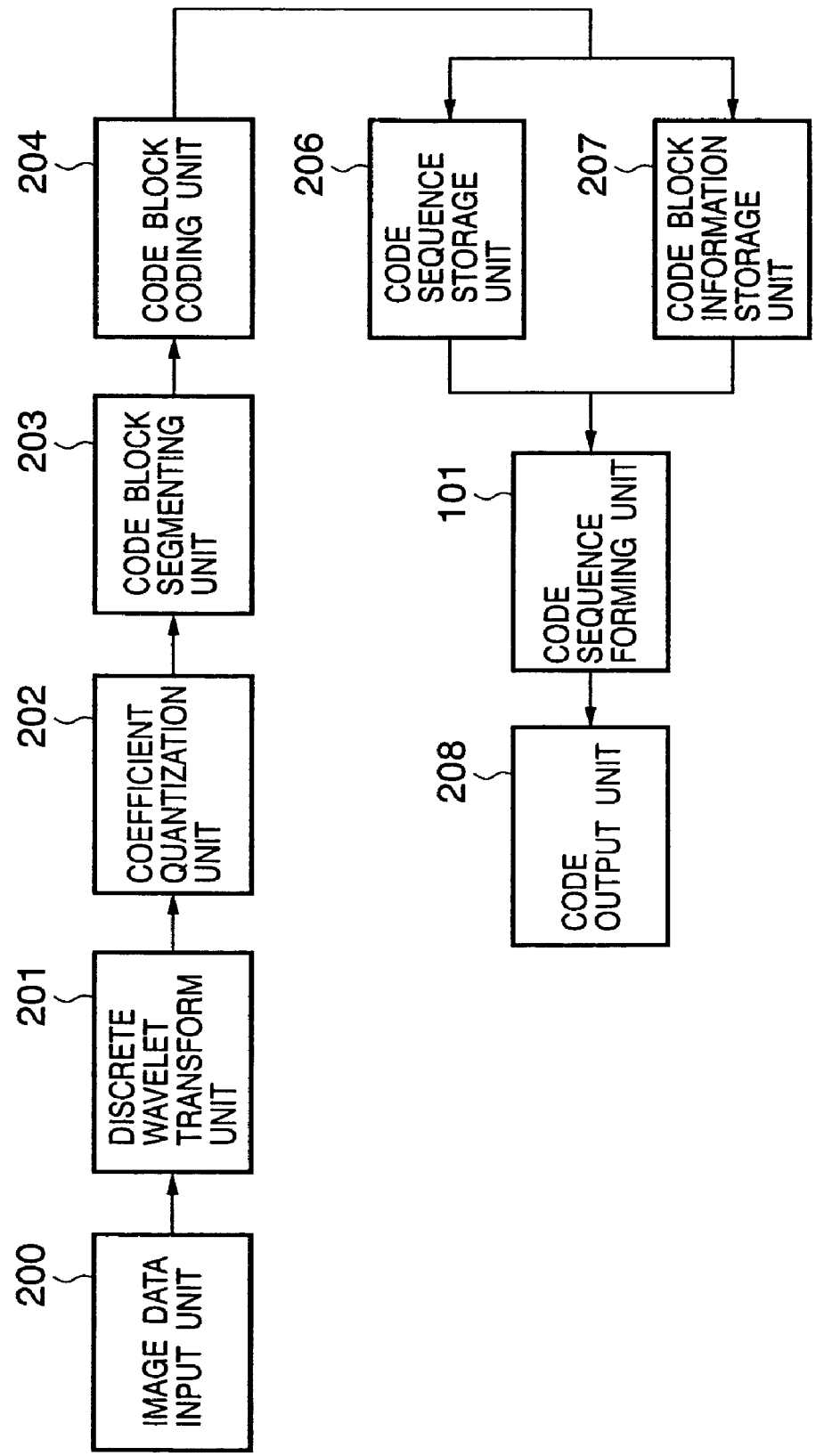
FIG. 15 is a block diagram showing the arrangement of a general image coding apparatus which executes a function interpolation approximation method.

FIG. 15 is a block diagram showing the arrangement of a general image coding apparatus which executes the function interpolation approximation method. As shown in FIG. 15, the image coding apparatus includes an image data input unit 200, discrete wavelet transform unit 201, coefficient quantization unit 202, code block segmenting unit 203, code block coding unit 204, code sequence forming unit 101, code block information storage unit 207, code sequence storage unit 206, and code output unit 208.

The operation sequence of the general image coding apparatus using the function interpolation approximation method will be described below with reference to FIG. 15. Note that image coding data to be coded by the image coding apparatus shown in FIG. 15 is 512×512 monochrome image data with each pixel consisting of eight bits as in the case of the above general image coding apparatus shown in FIG. 2 which is designed to perform JPEG2000 coding. In addition, coding conditions such as execution/non-execution of tiling, the size of a code block, and selection of a wavelet transform filter are the same as those described in the above case.

[Processing by Code Sequence Forming Unit 101]

Figure 16:
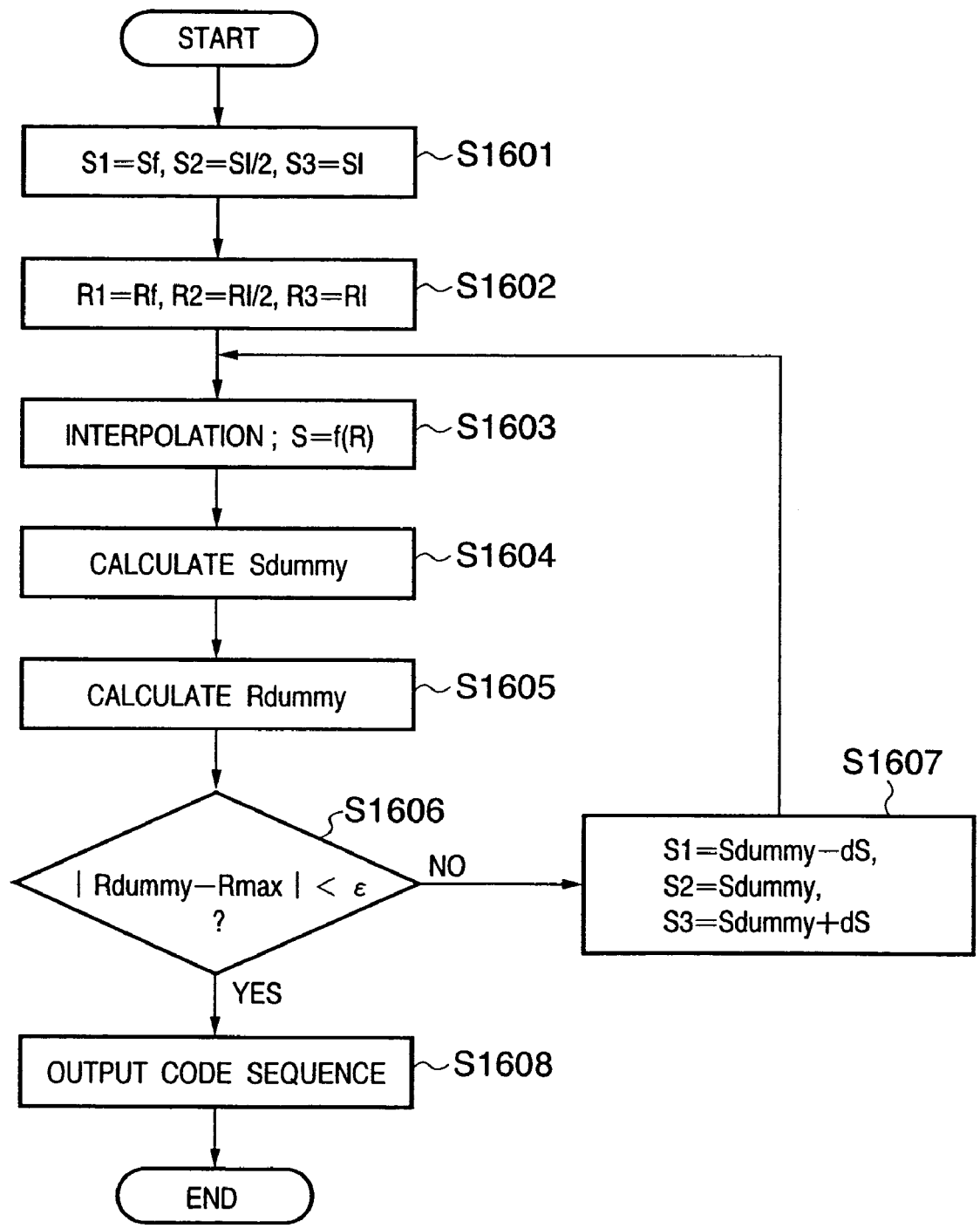
FIG. 16 is a flowchart for explaining the processing performed by the code sequence forming unit 101.

FIG. 16 is a flowchart for explaining the processing performed by the code sequence forming unit 101. First of all, as the initial values of S, S1=Sf, S2=S1/2, and S3=S1 (where Sf is the maximum value of S among all the passes, and S1 is the minimum value of S) are set (step S1601). The code sequence forming unit 101 then obtains the sum totals of code amounts of passes having S equal to or more than the S value by referring to the code block information stored in the code block information storage unit 207, and substitutes each obtained value in R corresponding to each S (step S1602). In this case, this operation is expressed as R1=Rf, R2=R1/2, and R3=R1. Note that Rf represents the code amount of a pass assumed to be located at the first position of the code sequence, and R1 represents the total code amount of the code sequence.

Interpolation formula R=f(s) is obtained from {S1, S2, S3} and {R1, R2, R3} (step S1603). S (=Sdummy) corresponding to a target code amount Rmax in this function is then obtained (step S1604). The code sequence forming unit 101 calculates a code amount Rdummy of a pass having an S value larger than Sdummy by referring to the code block information stored in the code block information storage unit 207 (step S1605). It is checked whether |Rdummy−Rmax|<e (step S1606). In this case, e is a constant by which the degree of convergence of Rdummy is determined.

If |Rdummy−Rmax|<e holds (Yes), the code sequence forming unit 101 forms a code sequence by collecting passes having R larger than Rdummy, and outputs the obtained code sequence from the code output unit 208 (step S1608). If |Rdummy−Rmax|<e does not hold (No), the code sequence forming unit 101 sets {S1, S2, S3} by setting S1=Sdummy−dS, S2=Sdummy, and S3=Sdummy+dS (step S1607). The flow then returns to step S1603.

As described above, according to the function interpolation approximation method, a rate/distortion gradient corresponding to a target rate is efficiently searched out while a relational expression between a rate and a rate/distortion gradient is assumed by three-point interpolation.

[Moving Image Coding Using Function Interpolation Approximation Method]

An increase in processing speed which is achieved when the function interpolation approximation method is used for coding a moving image will be described next. According to the general method described above, a large processing amount is required for the repetitive processing for converging to Smax. This problem, however, can be solved by giving an S value near Smax as the initial value of S2. This embodiment therefore uses the method of assuming a value near Smax as the initial value of S2.

Figure 26:
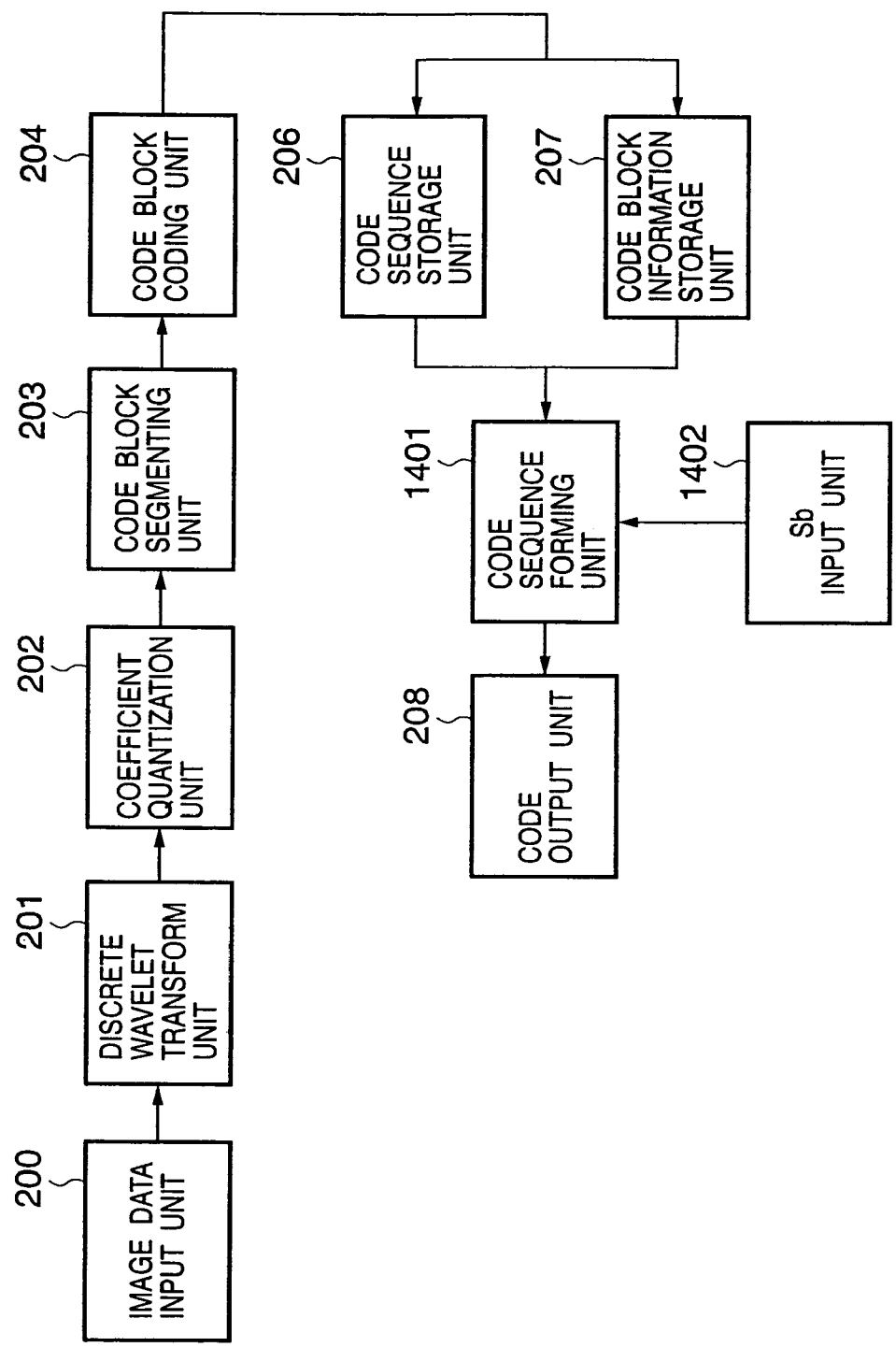
FIG. 26 is a block diagram showing the arrangement of an image coding apparatus according to the 11th embodiment of the present invention.

FIG. 26 is a block diagram showing the arrangement of an image coding apparatus according to the 11th embodiment of the present invention. The same reference numerals as in FIG. 26 denote blocks common to the image coding apparatus shown in FIG. 15, and a description thereof will be omitted. As shown in FIG. 26, the image coding apparatus according to the 11th embodiment includes an image data input unit 200, discrete wavelet transform unit 201, coefficient quantization unit 202, code block segmenting unit 203, code block coding unit 204, code sequence forming unit 1401, code block information storage unit 207, code sequence storage unit 206, code output unit 208, and Sb input unit 1402. In this case, Sb represents Smax of a frame immediately preceding a frame of interest, and the Sb input unit 1402 inputs the Sb value to the code sequence forming unit 1401.

In the image coding apparatus according to the 11th embodiment, frames constituting a moving image are input to the image data input unit 200. Note that each frame to be input is 512×512 monochrome image data with each pixel consisting of eight bits as in the above general case. In addition, coding conditions such as execution/non-execution of tiling, the size of a code block, and selection of a wavelet transform filter are the same as those described above.

In forming a code sequence, the code sequence forming unit 1401 acquires Sb from the Sb input unit 1402, sets Sb to S2, and provides S1=Sb−dS and S3=Sb+dS. Thereafter, the code sequence forming unit 1401 converges to Smax while forming an interpolation formula in the same manner as in the above general case, and then forms a code sequence.

As in step S1602 described above, the code sequence forming unit 1401 obtains the sum totals of code amounts of passes having S equal to or more than the S value by referring to the code block information stored in the code block information storage unit 207, and substitutes each obtained value to R corresponding to each S. As in step S1303 described above, interpolation formula R=f(S) is obtained from {S1, S2, S3} and {R1, R2, R3}. S (=Sdummy) corresponding to the target code amount Rmax in this function is obtained. This value is estimated as a threshold λ.

Subsequently, the code sequence forming unit 1401 calculates the code amount Rdummy of a pass having an S value larger than Sdummy by referring to the code block information stored in the code block information storage unit 207. It is checked whether |Rdummy−Rmax|<e. If |Rdummy−Rmax|<e holds, the code sequence forming unit 1401 forms a code sequence by collecting passes having R larger than Rdummy, and outputs the obtained code sequence from the code output unit 208. If |Rdummy−Rmax|<e does not hold, the code sequence forming unit 1401 sets {S1, S2, S3} by setting S1=Sdummy−dS, S2 =Sdummy, and S3=Sdummy+dS. The above processing is repeated again.

The code sequence forming unit 1401 writes newly obtained Smax in the Sb input unit 1402 upon erasing Sb written in the Sb input unit 1402.

The image coding apparatus according to this embodiment segments each frame image constituting a moving image into a plurality of small regions, and performing coding for each region upon performing code amount/distortion optimization processing in each region. For this purpose, the apparatus acquires a code amount/distortion gradient λ to be used for coding of each small region of a frame image of interest, selects a predetermined code amount/distortion gradient S on the basis of the acquired code amount/distortion gradient λ, and assumes function R=f(S) of a code amount corresponding to the code amount/distortion gradient by using the selected code amount/distortion gradient S and the code amount R based on the acquired code amount/gradient λ. The apparatus searches for a threshold at the time when a small region has a predetermined code amount by using assumed function R=f (S), and forms a code sequence of the small region by using coding data equal to or more than the searched-out threshold.

As described above, in this embodiment, the processing of converging Smax in a frame of interest can be reduced by using Smax of a preceding frame.

The present invention is not limited to the embodiments described above. For example, the ninth to 11th embodiments have exemplified the formation of a code sequence on one layer under the following conditions: no tiling, two times of discrete wavelet transform, use of a 9×7 lossy filter (9-7 irreversible filter), and a code block size of 64×64. However, the present invention can be applied to a case wherein the conditions for JPEG2000 coding are changed. For example, when layers are formed by using a plurality of bit rates, the present invention can be applied by setting the target code amount Rmax for each layer. Obviously, in addition, the filter for discrete wavelet transform, the number of times of application, and the like can be changed.

The present invention can be suitably practiced by using JPEG2000, but can also be applied to another coding scheme of segmenting coding data into small sections and obtaining a code amount and distortion index value for each section.

In addition, in the above embodiments, blocks are defined in accordance with purposes, like the code block information storage unit, category information storage unit, and code sequence storage unit. However, a single storage unit may be prepared to be selectively used.

According to the category segmentation method in the above embodiments, category segmentation processing is performed only once. Obviously, however, the present invention also incorporates a method of executing category segmentation a plurality of number of times, e.g., segmenting a selected category into categories again.

According to the N segmentation method in the above embodiments, section segmentation processing is performed only once. Obviously, however, the present invention also incorporates a method of executing section segmentation a plurality of number of times, e.g., segmenting a selected section into sections again.

According to the function interpolation approximation method in the above embodiments, function interpolation approximation is performed a plurality of number of times. Obviously, however, the present invention also incorporates executing the function interpolation approximation method once.

In addition, the present invention also incorporates an embodiment based on a proper combination of the category segmentation method, N segmentation method, function interpolation approximation method, and threshold search method.

In the above embodiments, 512×512 monochrome image data with each pixel consisting of eight bits has been described as a coding target image. However, the present invention may be applied to other kinds of image data, e.g., an image having a different size and bit depth and a color image with each pixel expressed by a plurality of color components. Furthermore, the present invention may be applied to each frame, field, or the like of a moving image.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As has been described above, according to the present invention, the computation cost required for rate/distortion optimization processing in image coding at the time of moving image compression can be properly reduced.

The present invention is not limited to the above embodiments and various changes and modifications can be made within the spirit and scope of the present invention. Therefore, to apprise the public of the scope of the present invention, the following claims are made.

Claim of Priority

This application claims priority from Japanese Patent Applications Nos. 2003-200478 filed on Jul. 23, 2003 and 2003-332392 filed on Sep. 24, 2003, which are hereby incorporated by references herein.

What is claimed is:

1. An image coding apparatus for segmenting image data into a plurality of small regions and generating code data of the plurality of small regions upon performing code amount/distortion optimization processing, comprising:
  an encoder operable to encode image data and generate code data, for each small region, the code data being represented by a plurality of partial code data corresponding respectively to a plurality of layers, where partial code data at a higher layer is dominant for the quality of the corresponding small region;
  a classification unit configured to divide the code data of each small region into a plurality of predetermined M(M>2) groups to classify the code data generated by said encoder, where each group includes partial code data of at least one layer and the plurality of groups are arranged in order of a group including a top layer to a group including a bottom layer;

a first determiner configured to, calculate a minimum value "i" satisfying $\Sigma G(i) > R$ max, and determining an i-th group specified by the determined "i" as a boundary group, where G(i) is the total code amount of layers included in i-th groups in all of small regions of the image data to be encoded and Rmax is a target code amount of the image data to be encoded;

a selector configured to select all of the partial code data of layers included in first to (i−1)-th groups, excepting i-th to M-th groups, as basic code data for the image data to be encoded;

a second determiner configured to determine a boundary layer corresponding to a plurality of layers included in the i-th group in a small region of interest, and to select, among the partial code data of the plurality of layers included in the i-th group, partial code data of a higher layer than the determined boundary layer, as additional code data for the small region of interest; and a code sequence forming unit configured to form a code sequence by combining the basic code data selected by said selector and each of the additional code data determined by said second determiner, as encoded data for the image data to be encoded.

2. The apparatus according to claim 1, wherein when said classification unit classifies a code amount/distortion gradient of the small region into a plurality of sections, and the code amount/distortion gradient of adjacent sections do not show a monotonous reduction, said classification unit integrates the two sections into one section and performs group classification of a plurality of sections after integration.

3. The apparatus according to claim 1, wherein a small region is a code block defined in a JPEG2000 coding scheme.

4. The apparatus according to claim 1, wherein the small region is a region obtained by segmenting a coefficient of a subband, obtained by frequency-transforming the image data, into a plurality of rectangular regions, and said code sequence forming unit forms an independent code sequence for each of the small regions.

5. An image coding method for segmenting image data into a plurality of small regions and generating code data of the small regions upon performing code amount/distortion optimization processing, using a computer to perform:

an encoding step of encoding image data and generating code data, for each small region, the code data being represented by a plurality of partial code data corresponding to a plurality of layers, where partial code data at a higher layer is dominant for the quality of the corresponding small region;

a classification step of dividing the code data of a small region into a plurality of predetermined M(M>2) groups to classify the code data generated in said encoding step, where each of the plurality of groups includes partial code data of at least one layer and the plurality of groups are arranged in order of a group including a top layer to a group including a bottom layer;

a first determining step of calculating a minimum value "i" satisfying $\Sigma G(i) > R$ max, and determining an i-th group specified by the determined "i" as a boundary group, where G(i) is the total code amount of layers included in i-th groups in all of small regions of the image data to be encoded and Rmax is a target code amount of the image data to be encoded;

a selecting step of selecting all of partial code data of layers included in first to (i−1)-th groups, excepting i-th to M-th groups, as basic code data for the image data to be encoded;

a second determining step of determining a boundary layer corresponding to layers included in the i-th group in a small region of interest, and selecting, among the partial code data of layers included in the i-th group, partial code data of a higher layer than the determined boundary layer, as additional code data for the small region of interest; and a code sequence forming step of forming a code sequence by combining the basic code data selected in said selecting step and each of additional code data determined in said second determining step, as encoded data for the image data to be encoded.

6. A computer-readable storage medium storing a program, in executable form, for causing a computer to segment image data into a plurality of small regions and generate code data of the small regions upon performing code amount/distortion optimization processing, the program comprising:

an encoding procedure of encoding image data and generating code data, for each small region, the code data being represented by a plurality of partial code data corresponding to a plurality of layers, where partial code data at a higher layer is dominant for the quality of the corresponding small region;

a classification procedure for dividing the code data of a small region into a plurality of predetermined M(M>2) groups to classify the code data generated in said encoding procedure, where each of the plurality of groups includes partial code data of at least one layer and the plurality of groups are arranged in order of a group including a top layer to a group including a bottom layer;

a first determining procedure of calculating a minimum value "i" satisfying $\Sigma G(i) > R$ max, and determining an i-th group specified by the determined "i" as a boundary group, where G(i) is the total code amount of layers included in i-th groups in all of small regions of the image data to be encoded and Rmax is a target code amount of the image data to be encoded;

a selecting procedure of selecting all of partial code data of layers included in first to (i−1)-th groups, excepting i-th to M-th groups, as basic code data for the image data to be encoded:

a second determining procedure of determining a boundary layer corresponding to layers included in the i-th group in a small region of interest, and selecting, among the partial code data of layers included in the i-th group, partial code data of a higher layer than the determined boundary layer, as additional code data for the small region of interest; and a code sequence forming procedure for forming a code sequence by combining the basic code data selected in said selecting procedure and each of the additional code data determined in said second determining procedure, as encoded data for the image data to be encoded.

* * * * *